United States Patent [19]
Hara et al.

[11] Patent Number: 5,699,871
[45] Date of Patent: Dec. 23, 1997

[54] DRIVING FORCE TRANSFER APPARATUS FOR FOUR-WHEEL DRIVE VEHICLE

[75] Inventors: Tomoyuki Hara, Isehara; Kenichi Tobita, Zama; Tsutomu Niimi; Izumi Amemiya, both of Isehara; Toshiharu Takasaki, Sagamihara, all of Japan

[73] Assignee: Nissan Motor Co., Ltd., Yokohama, Japan

[21] Appl. No.: 527,695

[22] Filed: Sep. 13, 1995

[30] Foreign Application Priority Data

| | | | |
|---|---|---|---|
| Sep. 21, 1994 | [JP] | Japan | 6-226464 |
| Sep. 21, 1994 | [JP] | Japan | 6-226465 |
| Sep. 21, 1994 | [JP] | Japan | 6-226467 |
| Sep. 21, 1994 | [JP] | Japan | 6-226475 |

[51] Int. Cl.$^6$ ............................................. B60K 23/08
[52] U.S. Cl. ..................... 180/247; 192/69.83; 192/108
[58] Field of Search ............................ 180/233, 247; 192/69.8, 69.81, 69.82, 69.83, 108

[56] References Cited

U.S. PATENT DOCUMENTS

| | | | |
|---|---|---|---|
| 2,398,570 | 4/1946 | Wildhaber | 192/108 |
| 2,950,797 | 8/1960 | Zieher | 192/108 |
| 4,060,007 | 11/1977 | Levesque | 192/69.8 X |
| 4,586,592 | 5/1986 | Mori | 192/49 |
| 4,711,332 | 12/1987 | Schuster | 192/48.92 |
| 4,727,968 | 3/1988 | Chana | 192/114 T X |
| 4,854,413 | 8/1989 | Kameda et al. | 180/247 |
| 4,959,026 | 9/1990 | Stritzel | 192/108 X |
| 4,977,989 | 12/1990 | Ashikawa et al. | 192/69.8 X |
| 5,035,310 | 7/1991 | Meyerle | 192/108 X |
| 5,038,884 | 8/1991 | Hamada et al. | 192/69.8 X |
| 5,282,518 | 2/1994 | Yamasaki et al. | 180/233 |
| 5,335,762 | 8/1994 | Raue | 192/108 X |
| 5,380,255 | 1/1995 | Brissenden et al. | 180/247 X |
| 5,522,777 | 6/1996 | Baxter et al. | 180/247 X |

FOREIGN PATENT DOCUMENTS

| | | |
|---|---|---|
| 34 24 779 | 1/1985 | Germany . |
| 36 15 826 | 11/1986 | Germany . |
| 5-213086 | 8/1993 | Japan . |

*Primary Examiner*—Kevin Hurley
*Attorney, Agent, or Firm*—Foley & Lardner

[57] ABSTRACT

In a driving force transfer apparatus for a part-time four-wheel driving vechicle, a dog clutch structure is provided at both sides of first and second output axles, the first output axle being connected toward driven road wheels such as rear road wheels and the second output axle being connected toward non-driven road wheels such as front wheels. The dog clutch structure serves to connect the first output axle to the second output axle so that the four road wheels are forced into a four-wheel drive state during a low-speed gear range position switched through a sub transmission mechanism lever. In a first embodiment, a play in each tooth space structure constituting the dog clutch structure is provided so as to make a smooth mesh of the clutch structure, thus an operating force applied to a lever of the sub transmission mechanism can be lowered.

17 Claims, 31 Drawing Sheets

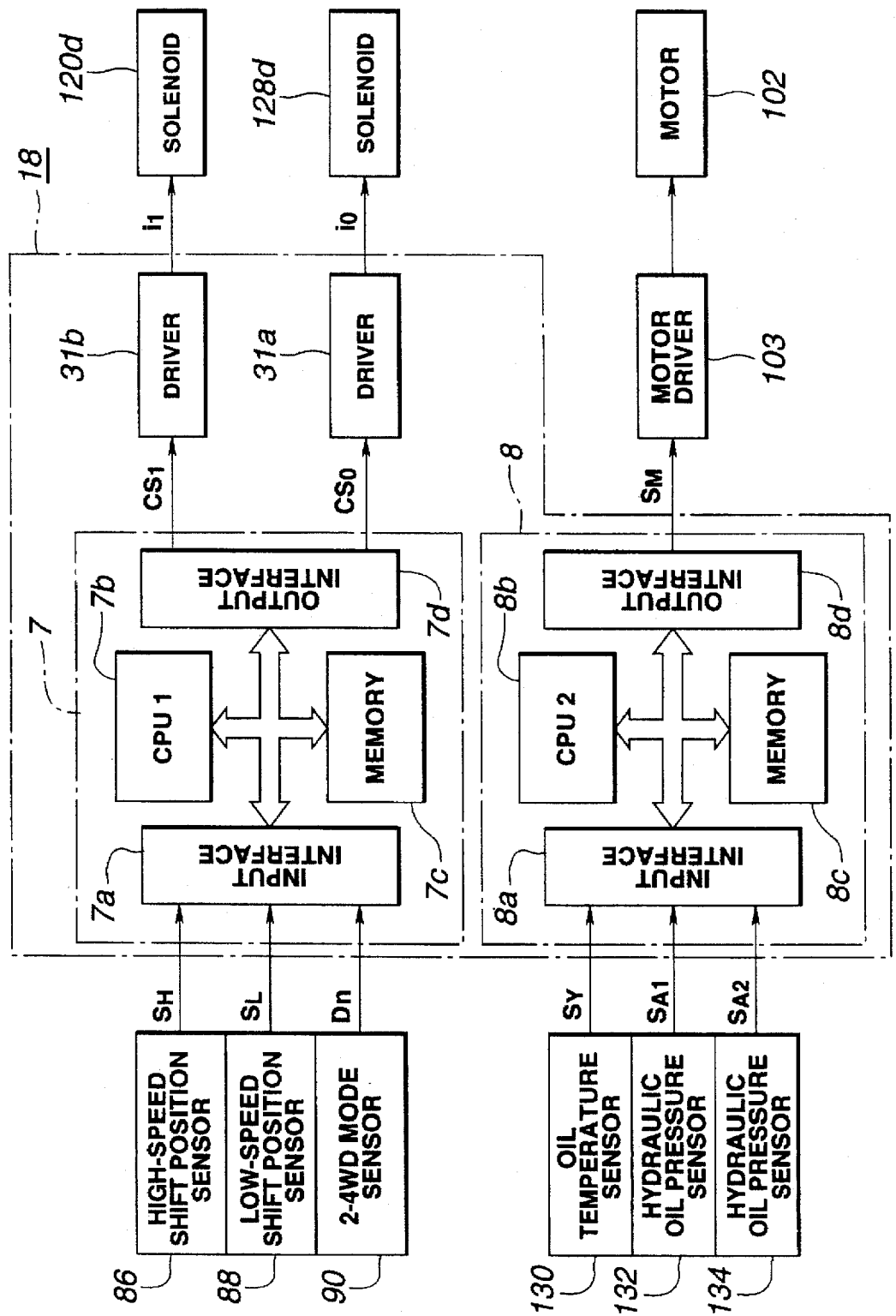

DRIVING FORCE TRANSFER APPARATUS FOR FOUR-WHEEL DRIVE VEHICLE

BACKGROUND OF THE INVENTION

The present invention relates to a driving force transfer apparatus applicable to a four-wheel drive vehicle and having dog clutches which are so arranged and constructed as to interconnect a first output axle and a second output axle to force a drive state of the vehicle into a four-wheel drive state.

A Japanese Patent Application First Publication No. Heisei 5-213086 (published on Aug. 24, 1993) exemplifies a previously proposed vehicular transfer apparatus.

The previously proposed vehicular transfer apparatus includes: a sub transmission which is so arranged and constructed as to perform a switching of a driving force transmitted from a main transmission (power transmission) to an input axle of the transfer apparatus between a high-speed gear range and a low-speed gear range (shift) positions by means of a mesh-type clutch, thus the driving force being always transmitted to a first output axle (rear road wheel connected output axle); and a frictional clutch (variable torque clutch) which is so arranged and constructed as to vary a clutch engaging force (clutching force) by supplying a control fluid under a required pressure, the frictional clutch being used in a two-wheel-and-four-wheel drive mechanism appropriately coupling the second output axle (front road wheel connected output axle) to the first output axle. Then, usually, since it is not necessary to perform the two-wheel drive at the low-speed gear range position of the sub transmission, a dog clutch is disposed in the sub transmission and is so arranged and constructed as to forcefully mesh between the first output axle and second output axle, thus the vehicle being forcefully set to the four-wheel drive state.

FIGS. 1 and 2 show explanatory view of dog tooth of a coupling sleeve (shift sleeve) and of a clutch gear, the dog tooth thereof constituting a dog clutch.

In a case where the sub transmission is placed at the high-speed gear range position, the dog tooth 1 of the coupling sleeve revolved together with the first output axle in an arrow-marked direction does not mesh with the dog tooth 2 of the clutch gear revolved together with the second output axle in another arrow-marked direction, as shown in FIG. 1.

Then, in order to force the transfer apparatus into the four-wheel drive state (low-speed gear range position) through the sub transmission, the dog tooth 1 of the coupling sleeve needs forcefully to be meshed with the dog tooth 2 of the clutch gear revolving together with the second output axle.

In the previously proposed vehicular driving force transfer apparatus, when the sub transmission is switched from the high-speed gear range position to the low-speed gear range position, each tip of the dog tooth 1 of the coupling sleeve is faced against each tip of the dog tooth 2 of the clutch gear as shown in FIG. 3. In this situation, the dog tooth 1 of the coupling sleeve 1 needs to plow through each of the dog tooth 2 of the clutch gear.

However, since the above-described switch of the sub transmission from the high-speed gear range position to the low-speed gear range position is carried out with the vehicle stopped, both of the dog tooth 1 and 2 of the coupling sleeve and clutch gear cannot freely be revolved. Hence, an operating force applied to the coupling sleeve is increased so that both dog tooth 1 and 2 cannot easily be meshed with each other. Then, a shift change of the driving state into the four-wheel drive state cannot smoothly be achieved.

Next, FIG. 4 shows a part of an internal structure of the transfer apparatus described in the above-identified Japanese Patent Application First Publication.

In a transfer casing 1, an input axle 2 and an output axle 3 are disposed so as to face with each other and so as to be relatively revolvable with each other and the sub transmission 5 is so arranged and constructed so as to transmit the driving force transmitted to the input axle 2 via a transmission axle 4 from a main transmission (not shown).

The sub transmission 5 includes: a) a planetary gear mechanism 6; and a shift sleeve 7 coaxially disposed with respect to the planetary gear mechanism 6. When the sub transmission 5 is selected at the high-speed gear range position, the shift sleeve 7 is moved in an upper side position as viewed from FIG. 4 so that a high-speed gear range shifting gear 2a installed on the input axle 2 is meshed with inner tooth 7a of the shift sleeve 7. Thus, the revolving drive force applied to the input axle 2 is transmitted to the output axle 3 as a high speed revolving drive force (a high speed torque).

In addition, when the sub transmission is switched from the high-speed gear range position to the low-speed gear range position, the shift sleeve 7 is once moved toward a right-handed side as viewed from FIG. 4 so that the inner tooth 7a and the outer tooth 7b are not meshed to other tooth (this moved state is called a neutral position). When the shift sleeve 7 is further moved toward a right-handed side, the outer tooth 7b of the shift sleeve 7 is meshed with a low-speed shifting gear 6a of the planetary gear mechanism 6, a speed-reduced revolution of the planetary gear mechanism 5 causes the revolving drive force (or a torque) of the input axle 2 is transmitted to the output axle 3 as a low-speed revolving driving force (refer to a lower position of FIG. 4).

In a case where a fluid coupling type automatic power transmission using, for example, a torque converter is used as the main transmission disposed so as to transmit the revolving driving force (torque) to the input axle 2, a sound generated due to a mutual mesh between the tooth may possibly occur in the sub transmission 5 of the transfer apparatus shown in FIG. 4.

That is to say, if the automatic power transmission mounted in the vehicle as the main transmission is selected to be in a neutral range (N), a slight revolving force (torque)(hereinafter, referred to as a creepy (creep) revolving force) to a degree such that the output axle 3 is not revolved is usually transmitted to the transmission axle 4.

The the high-speed gear range shift position and low-speed gear range shift position switching operations are usually carried at the sub transmission 5 when the automatic transmission is selected at the neutral range. At a point of time when the shift sleeve 7 is moved at the neutral position during the gear range shifting operation, the input axle 2 under a non-load state is revolved due to the transmission of the creepy driving force from the transmission axle 4 thereto and, at the same time, the planetary gear mechanism 6 is also revolved. Thereafter, at a point of time when the shift sleeve 7 is moved from the neutral position to the low-speed gear range position, the inner tooth 7a or outer tooth 7b is impinged on the revolving low-speed gear range shifting gear 6a so that the sound generated at the mutual gear meshing occurs.

In addition, the high-speed and low-speed gear range position switching mechanism is installed in the transfer apparatus described above. When the high-speed and low-speed gear range position switching mechanism is operated to the low-speed position and the vehicle is turned circularly with the sleeve meshed with a low-speed shifting gear and a four-wheel driving gear, an enclosed torque is generated in a meshed part between the four-wheel drive gear and sleeve. A frictional force between the tooth surfaces of the meshed part between the four-wheel driving gear and sleeve is increased so that the shift change operation from the low-speed position to the high-speed position may not easily be carried out.

SUMMARY OF THE INVENTION

It is, therefore, a main object of the present invention to provide a vehicular driving force transfer apparatus for a part-time, four-wheel drive vehicle which has solved inconveniences such as unpleasant sound such as dog clutch meshing sound generated during the vehicular run in the shifting operation during the two-wheel drive state transfer to the four-wheel drive state and which can achieve a good operativeness of the transfer apparatus such as a smooth mutual mesh of the dog clutch tooth.

The above-described object can be achieved by providing a driving force transfer apparatus for a four-wheel drive vehicle, comprising: a) an input axle connected to an output axle of a vehicular power transmission; b) a first output axle connected toward mainly driven road wheels; c) a second output axle connected toward secondarily driven road wheels; d) a sub transmission mechanism, having mesh clutching means for operatively switching at least between a relatively high-speed gear range position and a relatively low-speed gear range position, said sub transmission mechanism being so arranged and constructed as to transmit a driving force from said power transmission via said input axle to said first output axle according to the switched position set through said mesh clutching means; e) a two-wheel-and-four-wheel drive switching mechanism having frictional clutching means and working fluid pressure varying means, a clutching force of said frictional clutching means being varied according to a working fluid pressure applied thereto from said working fluid pressure varying means so that the driving force transmitted to said first output axle is distributed to the second output axle at a torque distribution ratio determined according to the clutching force of the frictional clutching means; f) detecting means for detecting a running condition of the vehicle; g) controlling means for outputting a control signal to said working fluid pressure varying means so as to vary the working fluid pressure applied to the frictional clutching means on the basis of a result of the detection of the vehicle running condition; h) dog clutch means, provided at both sides of said first and second output axles, for connecting the first output axle to the second output axle so that the four road wheels are forced into a four-wheel drive state during the low-speed gear range position switched through the sub transmission mechanism; and i) smoothly meshing means for achieving a smooth mesh of one of said dog clutch means into the other dog clutch means so that a probability of impinging each tip of one of said dog clutch means to any one of the tips of the other of said dog tooth is lowered.

The above-described object can also be achieved by providing a driving force transfer apparatus for a four-wheel drive vehicle, comprising: a) an input axle connected to an output axle of a vehicular power transmission; b) a first output axle connected toward mainly driven road wheels; c) a second output axle connected toward secondarily driven road wheels; d) a sub transmission mechanism, having mesh clutching means for operatively switching at least between a relatively high-speed gear range position and a relatively low-speed gear range position, said sub transmission mechanism being so arranged and constructed as to transmit a driving force from said power transmission via said input axle to said first output axle according to the switched position set through said mesh clutching means; e) a two-wheel-and-four-wheel drive switching mechanism having frictional clutching means and working fluid pressure varying means, a clutching force of said frictional clutching means being varied according to a working fluid pressure applied thereto from said working fluid pressure varying means so that the driving force transmitted to said first output axle is distributed to the second output axle at a torque distribution ratio determined according to the clutching force of the frictional clutching means; f) detecting means for detecting a running condition of the vehicle; g) controlling means for outputting a control signal to said working fluid pressure varying means so as to vary the working fluid pressure applied to the frictional clutching means on the basis of a result of the detection of the vehicle running condition; h) dog clutch means, provided at both sides of said first and second output axles, for connecting the first output axle to the second output axle so that the four road wheels are forced into a four-wheel drive state during the low-speed gear range position switched through the sub transmission mechanism; and i) smoothly meshing means for achieving a smooth mesh of one of said dog clutch means into the other dog clutch means so that a probability of impinging each tip of one of said dog clutch means to any one of the tips of the other of said dog tooth is lowered, wherein said mesh clutching means of said sub transmission mechanism comprises: j) a high-speed shifting gear formed on the input axle; k) a low-speed shifting gear which is so arranged and constructed as to transmit the driving force with a revolution of said input axle reduced through a speed reduction mechanism of the sub transmission which is interlocked with said input axle; l) a four-wheel driving gear which is so arranged and constructed as to forcefully set the four road wheels into a four-wheel drive state; and n) a shift sleeve which is coupled to said first output axle in a spline coupling form so as to mesh with the high-speed shifting gear at the high-speed gear range position and so as to mesh with the low-speed shifting gear and with the four-wheel driving gear at the low-speed gear range position so that the vehicle is forced into the four-wheel drive state and wherein when said sub transmission mechanism is switched from the high-speed gear range position to the low-speed gear range position through said mesh clutching means, said shift sleeve is meshed with the low-speed shifting gear and, thereafter, is meshed with the four-wheel driving gear.

The above-described object can also be achieved by providing a driving force transfer apparatus for a four-wheel drive vehicle, comprising: a) a power transmission associated with a vehicular engine; b) an input axle connected to an output axle of said power transmission; c) a first output axle connected toward maily driven road wheels of the vehicle; d) a second output axle connected toward secondarily driven road wheels of the vehicle; e) a sub transmission having a low-speed gear range position and high-speed gear range position switching mechanism and which is so arranged and constructed as to transmit a driving force transmitted from said power transmission to said first output axle through mesh clutching means provided in the low-speed gear range position and high-speed gear range position switching mechanism; and f) a two-wheel-and-four-wheel drive switching mechanism having a frictional clutch and which is so arranged and constructed as to provide a suitable clutching for said frictional clutch so that said second output axle is coupled to said first output axle at a required torque distribution ratio, wherein said sub transmission further includes: g) a high-speed shifting gear formed on said input axle; h) a low-speed shifting gear which is so arranged and constructed as to transmit a speed-reduced revolution of said input axle through a speed reduction-mechanism interlocked with said input axle; i) a shift sleeve spline coupled to said first output axle, which is meshed with the high-speed shifting gear when moved to a predetermined high-speed gear range position, which is meshed with said low-speed shifting gear when moved to a predetermined low-speed gear range position, and which is meshed with a four-wheel driving gear when moved to said predetermined low-speed gear range position so that the vehicle is forced into a four-wheel drive state and wherein, when said shift sleeve is moved from the high-speed gear range position to the low-speed gear range position through said low-speed gear range position and high-speed position switching mechanism, said shift sleeve is meshed with said four-wheel driving gear after said shift sleeve has meshed with the low-speed shifting gear.

BRIEF DESCRIPTION OF THE DRAWINGS

FIG. 35 is a circuit block diagram of the controller in the case of the fourth embodiment.

BEST MODE FOR CARRYING OUT THE INVENTION

Reference will hereinafter be made to the drawings in order to facilitate a better understanding of the present invention.

FIGS. 1 through 4 have already been explained in the BACKGROUND OF THE INVENTION.

(First Embodiment)

Figure 1:
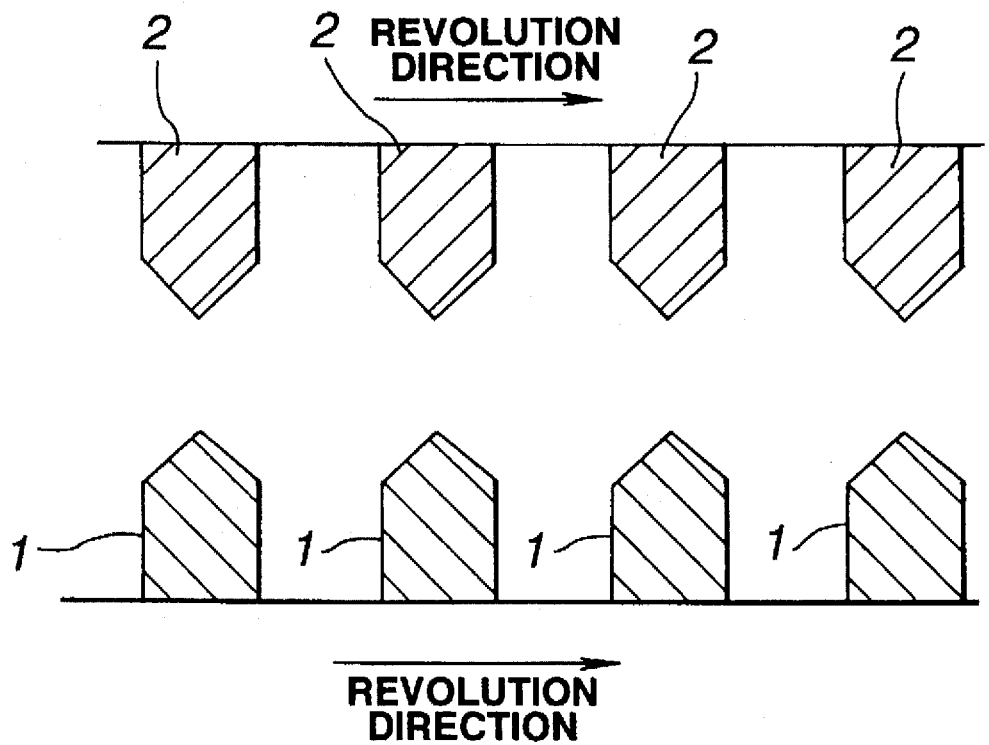
FIG. 1 is an explanatory view for explaining dog tooth facing against each other and mutually revolving when a sub transmission is switched to a low-speed gear range position as described in the BACKGROUND OF THE INVENTION.
Figure 2:
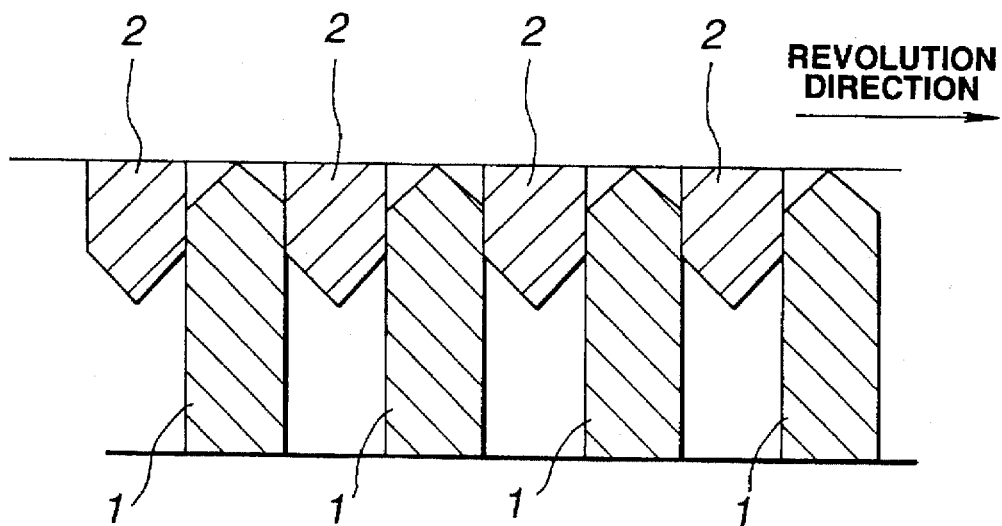
FIG. 2 is an explanatory view for explaining the dog tooth mutually meshed with each other when the sub transmission is switched to a high-speed gear range position as described in the BACKGROUND OF THE INVENTION.
Figure 3:
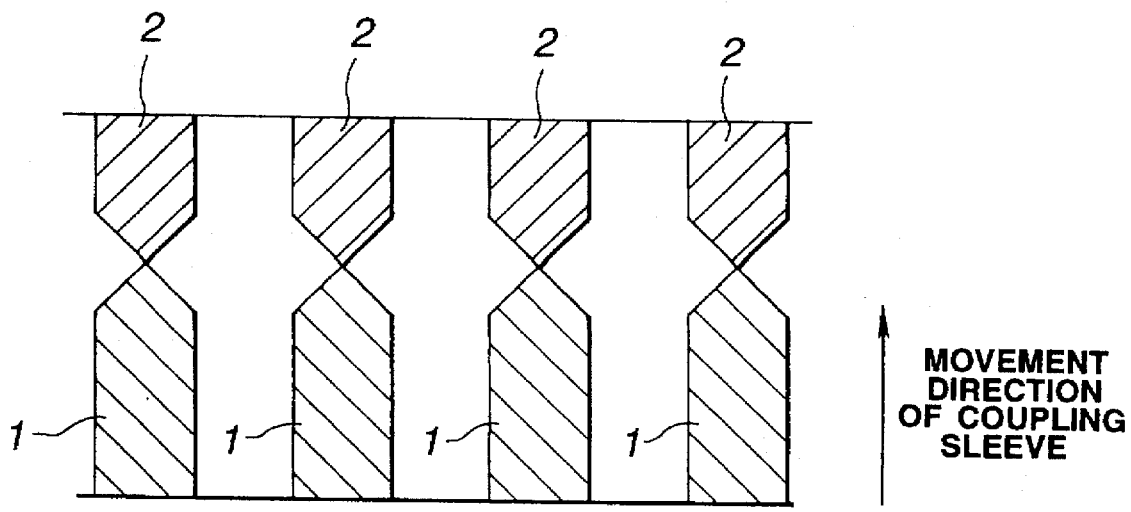
FIG. 3 is an explanatory view for explaining a state in which one of the dog tooth plows through the other dog tooth as described in the BACKGROUND OF THE INVENTION.
Figure 4:
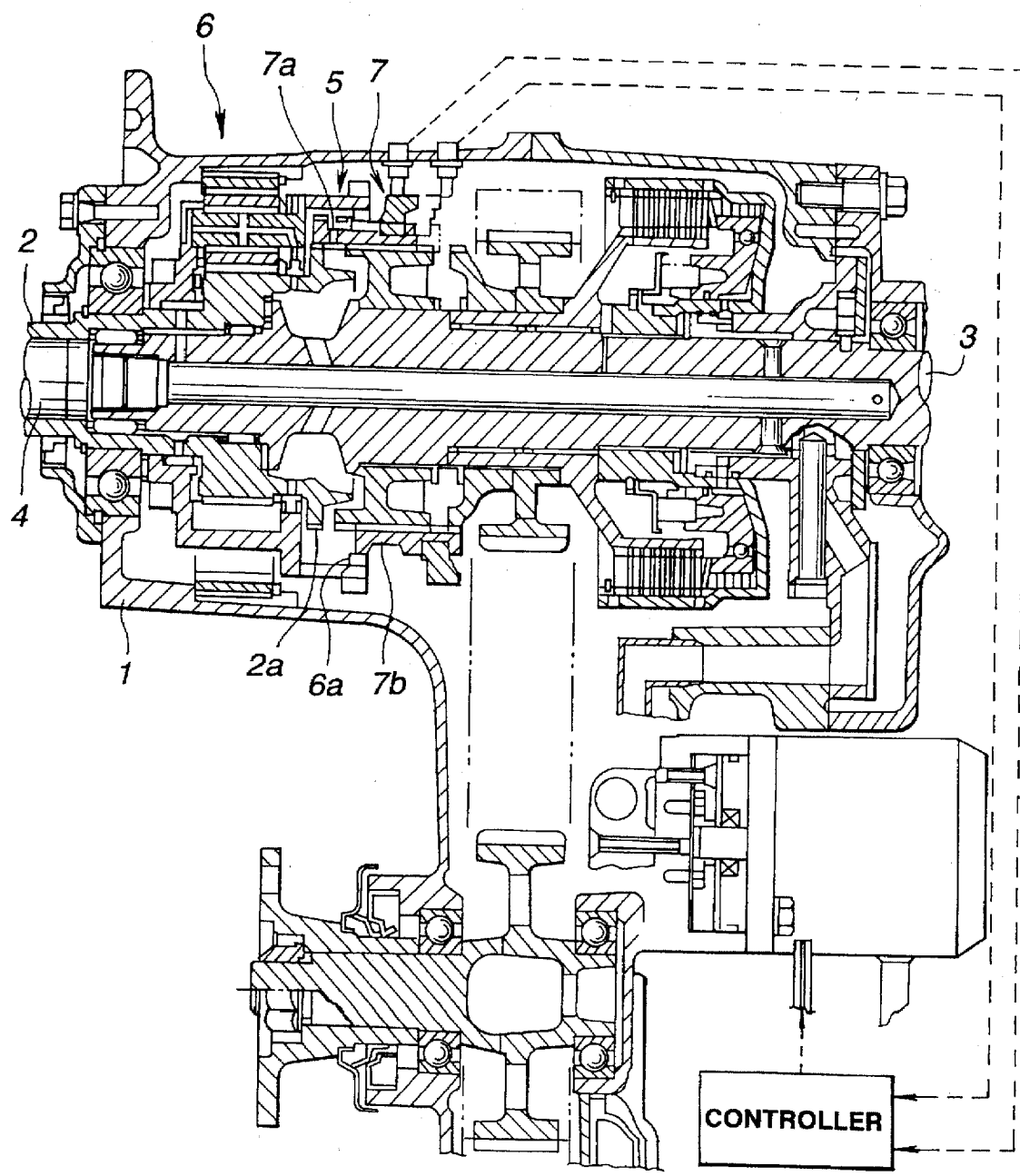
FIG. 4 is an explanatory view for explaining a structure of a vehicular driving force transfer apparatus as described in the BACKGROUND OF THE INVENTION.
Figure 5:
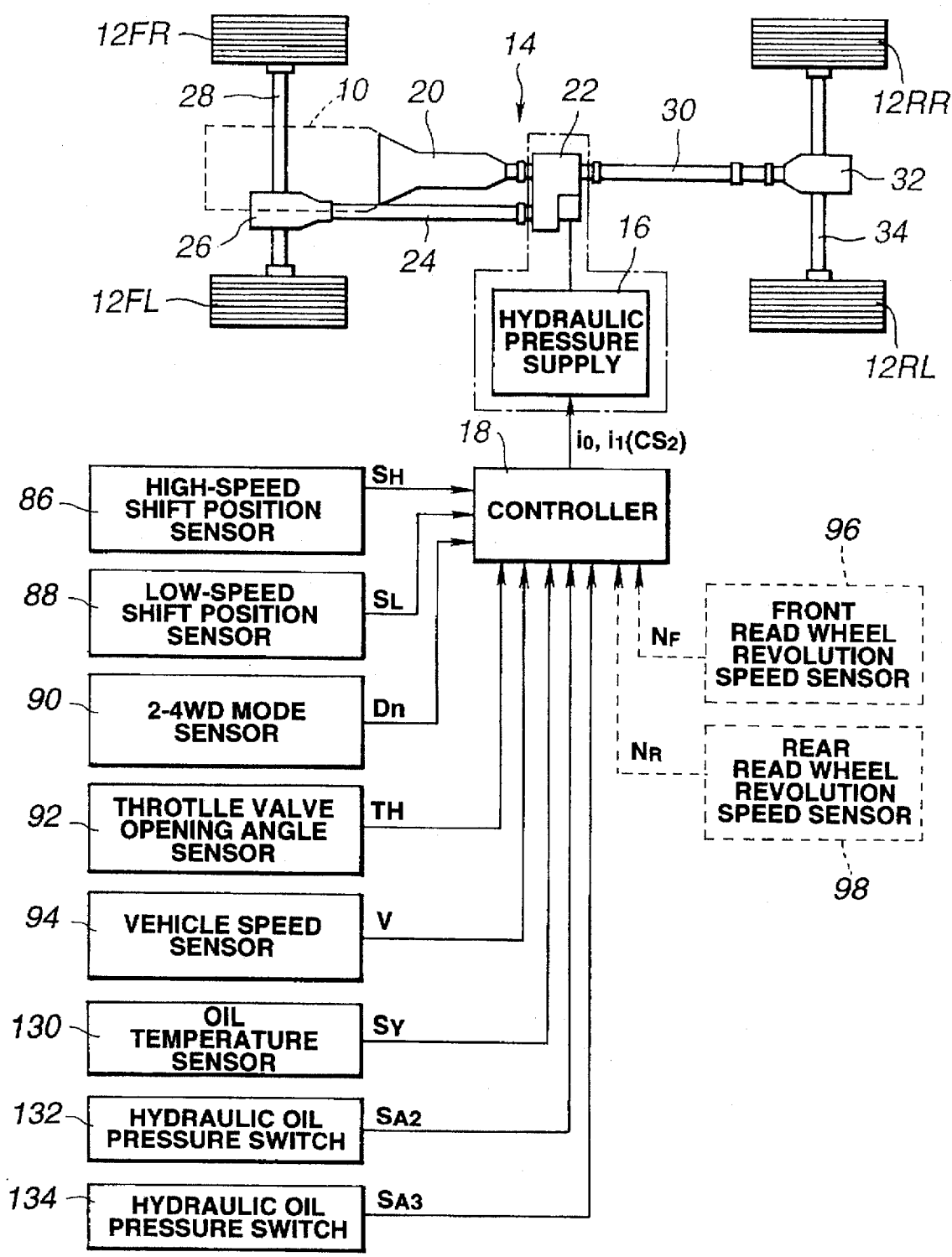
FIG. 5 is a schematic circuit block diagram of a vehicular driving force transfer apparatus in a first preferred embodiment according to the present invention applicable to a four-wheel drive vehicle.

FIG. 5 shows a part-time four-wheel drive vehicle based on an FR (Front Engine, Rear Drive) type to which a vehicular driving force transfer apparatus according to the present invention is applicable. The vehicle shown in FIG. 5 includes: an engine (internal combustion engine) 10 as a driving source, front left, front right, rear left, and rear right road wheels 12FL through 12RR; a driving force transfer system 14 into which a driving force is transmitted from the engine 10 and by which the transmitted driving force is variably distributed to the four road wheels by a variable torque (driving force) distribution ratio; a hydraulic oil pressure supply 16 which supplies a hydraulic (oil) pressure so as to control the driving force distribution by means of the driving force transfer system 14; and a controller 18 which controls the hydraulic pressure supply 16.

The driving force transfer system 14 includes: a power transmission 20, associated with the engine 10, which shifts the driving force by a selected gear ratio; and a transfer 22 which serves to distribute the driving force transmitted from the power transmission to the front road wheels 12FL and 12FR (usually, non-driven wheels, in other words, secondarily driven wheels) and rear road wheels 12RL and 12RR (so-called, always driven wheels (mainly driven wheels) in this type of the four-wheel vehicle shown in FIG. 5). In the driving force transfer system 14, a front road wheel driving force distributed by the transfer 22 is transmitted to the front left and right road wheels 12FL and 12FR via a front road wheel connected output axle 24, a front differential gear 26, and a front road wheel side drive shaft 28. On the other hand, a rear road wheel driving force from the transfer 22 is transmitted to the rear left and right road wheels 12RL and 12RR via a propeller shaft (rear road wheel connected output axle) 30, a rear differential gear 32, and a drive shaft 34. The controller 18 will be described later.

Figure 6:
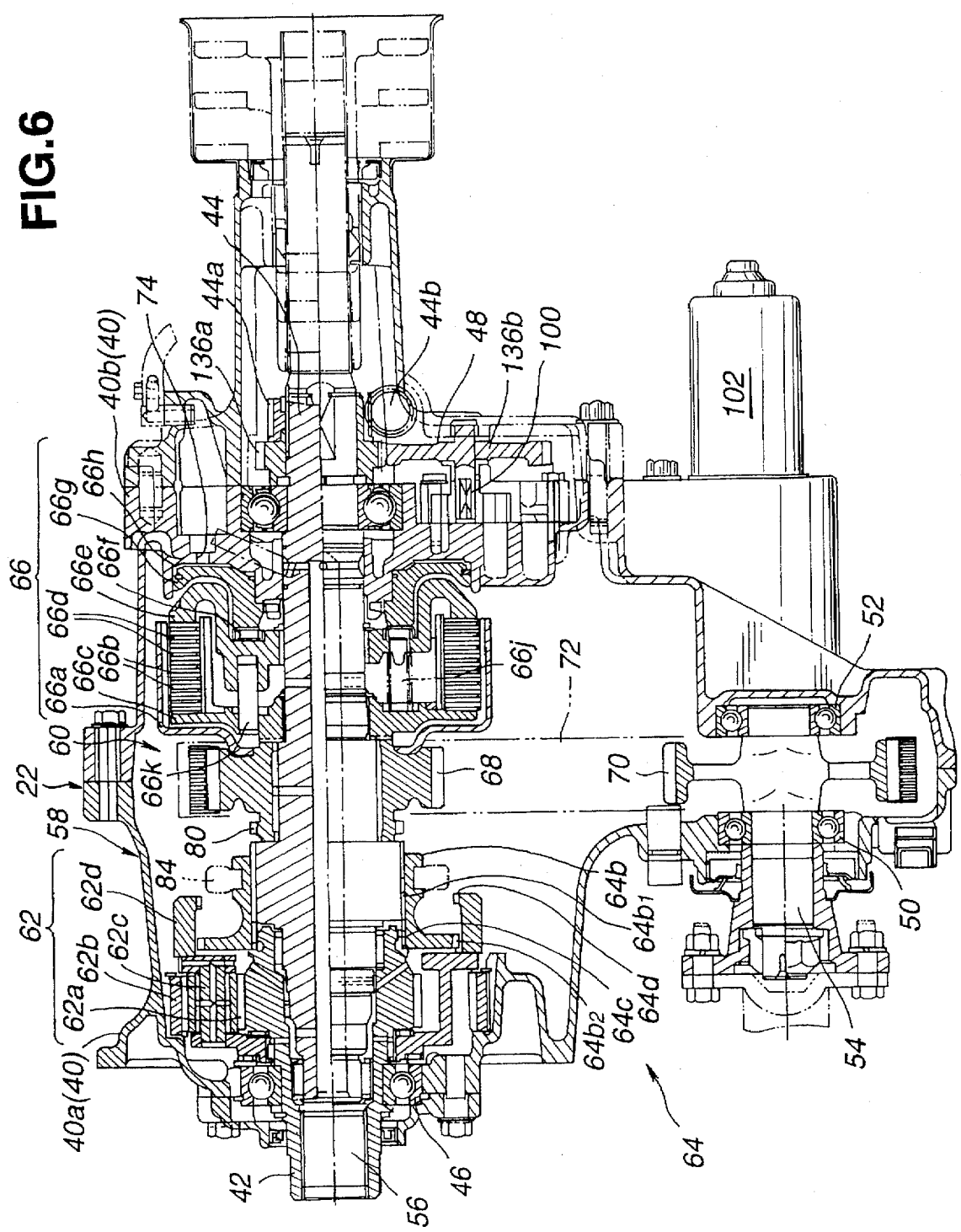
FIG. 6 is an explanatory view for explaining an internal structure of the transfer apparatus in the first embodiment shown in FIG. 5.

FIG. 6 shows an internal structure of the transfer (to which the transfer apparatus in a first embodiment is applicable) 22.

In a transfer casing 40, an input axle 42 is coaxially disposed therein with a first output axle 44. One end of the input axle 42 is faced with a corresponding end of the first output axle 44. The input axle 42 is rotatably supported by a front casing 40a via a radial bearing 46. The first output axle 44 is rotatably supported by a rear casing 40b via a radial bearing 48 so that both of the input axle 42 and first output axle 44 are relatively revolvable.

Referring to FIG. 6, in parallel to these input axle 42 and first output axle 44, a second output axle 54 is rotatably supported via respective bearings 50 and 52 disposed within the front casing 40a and the rear casing 40b. It is noted that the input axle 42 is coupled to an output axle 56 of the transmission 20, the first output axle 44 is coupled to the rear road wheel connected output axle 30, and the second output axle 54 is coupled to the front road wheel connected output axle 24, respectively.

Referring again to FIG. 6, a sub transmission (mechanism) 58 is disposed between the input axle 42 and the first output axle 44. A two-wheel-and-four-wheel drive switching mechanism is disposed between the first output axle 44 and second output axle 54.

The sub transmission (mechanism) 58 includes: a planetary gear mechanism 62; and a high-speed (gear range) position and a low-speed (gear range) position switching mechanism 64 of a clutch meshing type coaxially disposed on the planetary gear mechanism 62.

The planetary gear mechanism 62 includes: a sun gear 62a formed on an outer periphery of the input axle 42; an internal gear 62b fixed into an inside of the front casing 40a; a pinion gear 62c meshed with these sun gear 62a and internal gear 62b; and a pinion carrier 62d rotatably supporting the pinion gear 62c.

The high-speed gear range position and low-speed gear range position switching mechanism 64 includes: a shift sleeve 64b which is slidable in an axial direction of the first output axle 44 by means of a spline coupling of its inner tooth $64b_1$ to a plurality of key grooves installed on an outer periphery of the first output axle 44 and having outer tooth $64b_2$ on its outer periphery; a high-speed shifting gear (high-speed gear means) 64c formed on a position of the outer periphery of the input axle 42 and which is to be enabled to mesh with the inner tooth $64b_1$ of the shift sleeve 64b; and a low-speed shifting gear 64d formed on an inner peripheral part of the pinion carrier 62d of the planetary gear mechanism 62 and which is to be enabled to mesh with the inner tooth $64b_1$ of the shift sleeve 64b.

Figure 7:
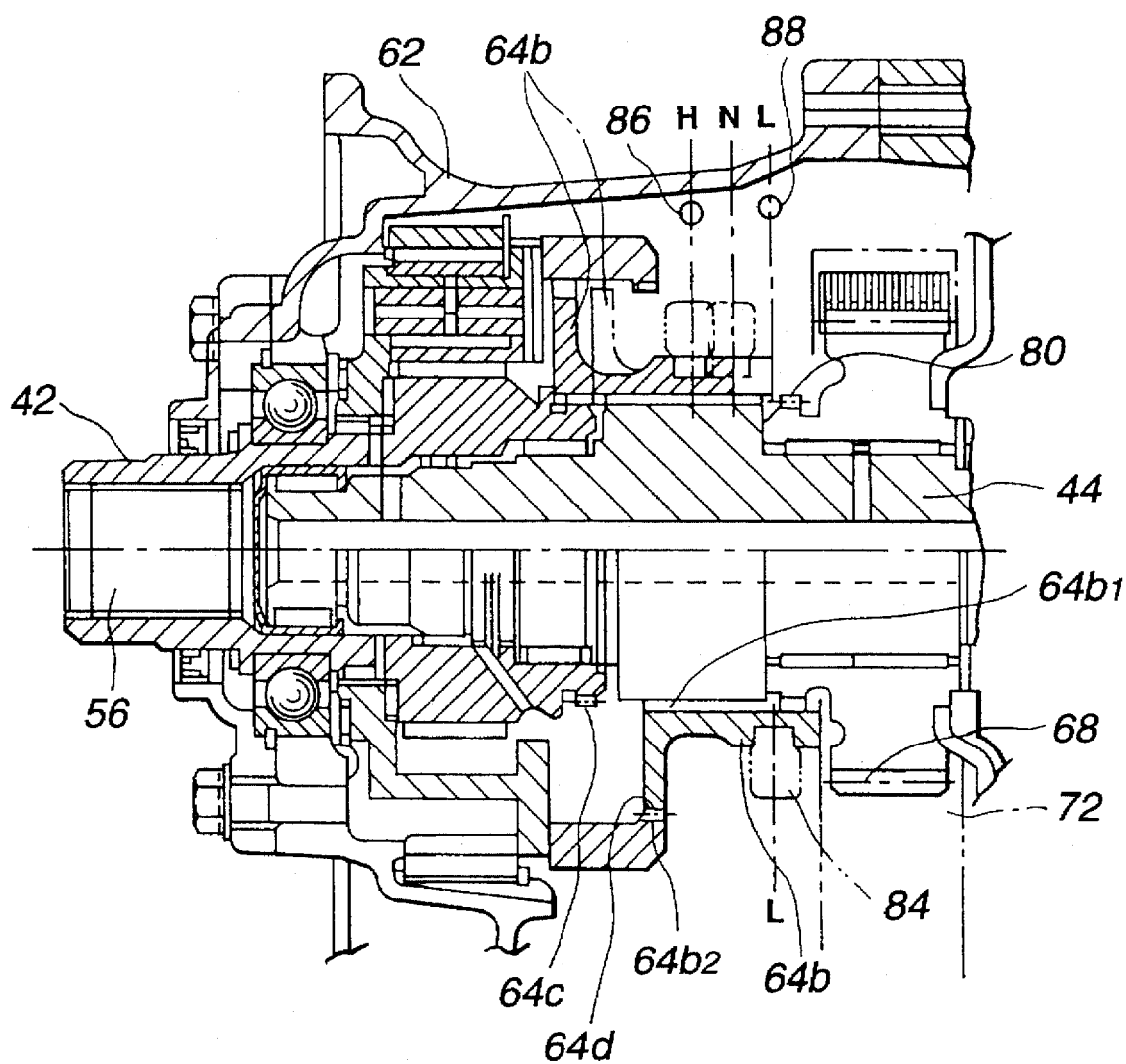
FIG. 7 is an explanatory view for explaining a slide motion of a shift sleeve in a sub transmission mechanism in the transfer apparatus in the first embodiment shown in FIGS. 5 and 6.

FIG. 7 shows a detailed internal structure of the front casing 40 of the transfer 22 shown in FIG. 6.

Referring to FIG. 7, when the shift sleeve 64b which is denoted by a solid line at an upper disposed position of FIG. 7 is slided up to a high-speed gear range (shift) position denoted by a symbol of H, the high-speed (shifting) gear 64c is meshed with the inner tooth $64b_1$.

In addition, when the shift sleeve 64b which is denoted by the solid line at a lower disposed position of FIG. 7 is slided up to a low-speed gear range (shift) position denoted by a symbol of L, the low-speed shifting gear 64d is meshed with the outer tooth $64b_2$. Furthermore, when the shift sleeve 64b in a phantom line drawn at the upper disposed position of FIG. 7 is slided up to a neutral position denoted by a symbol of N, both of the inner tooth $64b_1$ and the outer tooth $64b_2$ do not mesh with any one of the shifting gears of the high-speed gear range position and low-speed gear range position switching mechanism 64.

Referring back to FIG. 6, the two-wheel-and-four-wheel drive switching mechanism 60 includes: a wet-type multiplate frictional clutch (hereinafter, abbreviated as a frictional clutch) which modifies a driving force (torque) distribution ratio of the front road wheels 12FL and 12FR to the rear road wheels 12RL and 12RR (as will be described later); a first sprocket 68 which is rotatably disposed on the first output axle 44; a second sprocket 70 which is coaxially coupled to the second output axle 54; and a chain 72 wound between the first and second sprockets 68 and 70.

The frictional clutch 66 includes: a clutch drum 66a coupled with the first sprocket 68; friction plates 66b which are spline coupled to the clutch drum 66a; a clutch hub 66c which is spline coupled to an outer periphery of the first output axle 44; friction discs 66d disposed between the mutually facing friction plates, integrally coupled to the clutch hub 66c; a rotary member 66e disposed on an outer periphery of the first output axle 44 so as to bring the friction plates 66b and friction discs 66d into contact with one another according to an axial movement thereof toward the clutch drum 66a; a pin 66k integrally coupled to the clutch hub 66c so as to engage the clutch hub 66c with the rotary member 66e; a clutch piston 66g installed on an inner wall of the rear casing 40b so as to be movable in the axial direction thereof; a thrust bearing 66f which transmits the axial movement of the clutch piston 66g to the rotary member 66e; a cylinder chamber 66h formed on the inner wall between the clutch piston 66g and the rear casing 40b; and a return spring 66j which provides a biasing force thereof for the rotary member 66e toward the clutch piston 66g.

Then, when a clutch pressure $P_c$ is supplied from the hydraulic (oil) pressure supply 16 (a detailed circuit structure thereof will be described later) to an input port 74 formed on the rear casing 40b communicated with the cylinder chamber 66h, the clutch piston 66g is moved toward a left-handed direction as viewed from FIG. 6 due to a generation of pressure within the cylinder chamber 66h so that the movement of the clutch piston 66g is transmitted to the rotary member 66e via the thrust bearing 66f. Thus, the friction plates 66b and the friction discs 66d mutually spaced apart are brought in close contact with one another and an engaging force (or clutching force) due to frictional forces is given to the frictional clutch 66 according to a value of the clutch pressure $P_c$. Therefore, the driving force of the first output axle 44 is transmitted to the second output axle 54 via the first sprocket 68, the chain 72, and the second sprocket 70 at a required torque (driving force) distribution ratio which accords with the clutching force exerted by he frictional clutch 66.

In addition, when the supplied clutch pressure $P_c$ is reduced so that the biasing force of the return spring 66j causes the rotary member 66e and the clutch piston 66g to move toward a right-handed direction as viewed from FIG. 6 and, therefore, both of the friction plates 66b and friction discs 66d are mutually spaced apart, the driving force of the first output axle 44 is not transmitted to the second output axle 54.

It is noted that a four-wheel driving gear 80 is disposed on the first sprocket 68 faced toward the outer periphery of the shift sleeve 64b. As described above, when the shift sleeve 64d is moved up to the low-speed shifting position L shown in FIG. 7, together with the meshing between the outer tooth $64b_2$ and the low-speed shifting gear 64d, the four-wheel driving gear 80 is also meshed with the inner tooth $64b_1$ of the shift sleeve 64d. Thus, the shift sleeve 64d and the four-wheel driving gear 80 constitute a dog clutch which forcefully couples the first output axle 44 and the second output axle 54 at the low-speed gear range position L.

Figure 8:
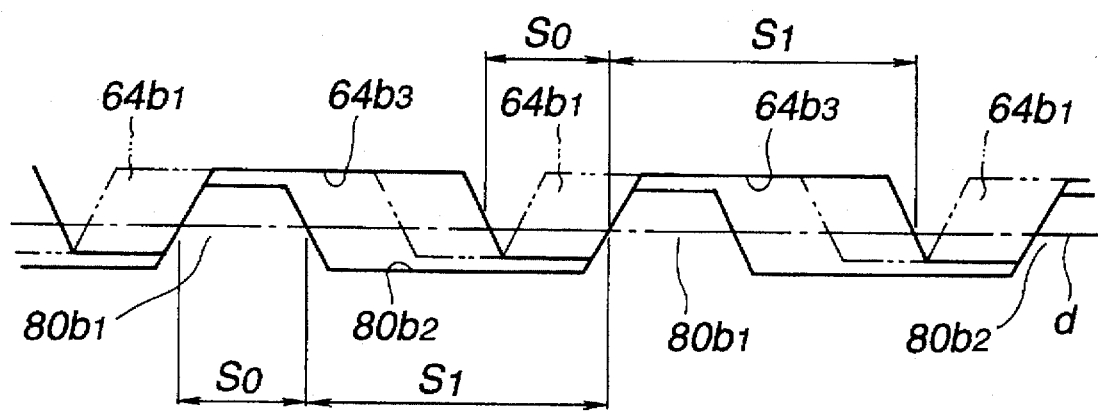
FIG. 8 is an explanatory view for explaining dog tooth in the transfer apparatus in the first embodiment shown in FIGS. 5 through 7.

FIG. 8 shows a meshed state between the inner tooth $64b_1$ and the four-wheel driving gear 80.

As shown in FIG. 8, a plurality of inner tooth $64b_1$ of the shift sleeve 64b—formed on a predetermined pitch circle d are set such that each tooth space $64b_3$ between the mutually adjacent inner tooth $64b_1$ has a width $S_1$ corresponding to a plurality of tooth thickness of a thickness $S_0$ of the individual inner tooth $64b_1$ so that the number of tooth in the inner tooth $64b_1$ are reduced. On the other hand, a plurality of outer tooth $80b_1$—of the four-wheel driving gear 80 formed on the predetermined pitch circle d in the same way as those inner tooth of the shift sleeve 64b are set such that each tooth space $80b_2$ between the mutually adjacent inner tooth $80b_1$ has the width $S_1$ corresponding to a plurality of tooth thickness of a thickness $S_0$ of the individual outer tooth $80b_1$ so that the number of tooth in the outer tooth $80b_1$ are reduced.

In this way, when the shift sleeve 64b is moved up to the low-speed gear range Shift position L, the inner tooth $64b_1$ are inserted into the opposing wide tooth spaces $80b_2$ and, at the same time, the outer tooth $80b_1$ are inserted into the opposing wide tooth spaces $64b_3$. Consequently, a possibility (probability) of opposing directly against each other of the inner tooth $64b_1$ and the outer tooth $80b_1$ is lowered in the first embodiment. Thus, a smooth meshing between the four-wheel driving gear 80 and inner tooth $64b_1$ of the shift sleeve 64b can be achieved.

Then, the shift sleeve 64b of the high-speed range position and low-speed range position switching mechanism 64 of the clutch meshing type is slided from the high-speed gear range shift position (high-speed position) H to the neutral position N, or low-speed range shift position L or vice versa via a fork (whose tip position 84 is shown in FIG. 6 as denoted by a phantom line) by means of a manual operation by a vehicular driver on a sub transmission mechanism lever (not shown).

It is noted that a high-speed (gear range shift) position sensor 86 which detects that the shift sleeve 64b has slided to the high-speed gear range shift position H and a low-speed gear range shift position sensor 88 which detects that the shift sleeve 64b has slided to the low-speed gear range shift position L are disposed within the front casing 40a as shown in FIG. 7 Then, detection signals indicating that the shift sleeve 64b has slided to the high-speed gear range shift position H and that the shift sleeve 64b has slided to the low-speed gear range shift position L from the respective high-speed and low-speed position sensors 86 and 88 are input to the controller 18 as will be described later.

Figure 9A:
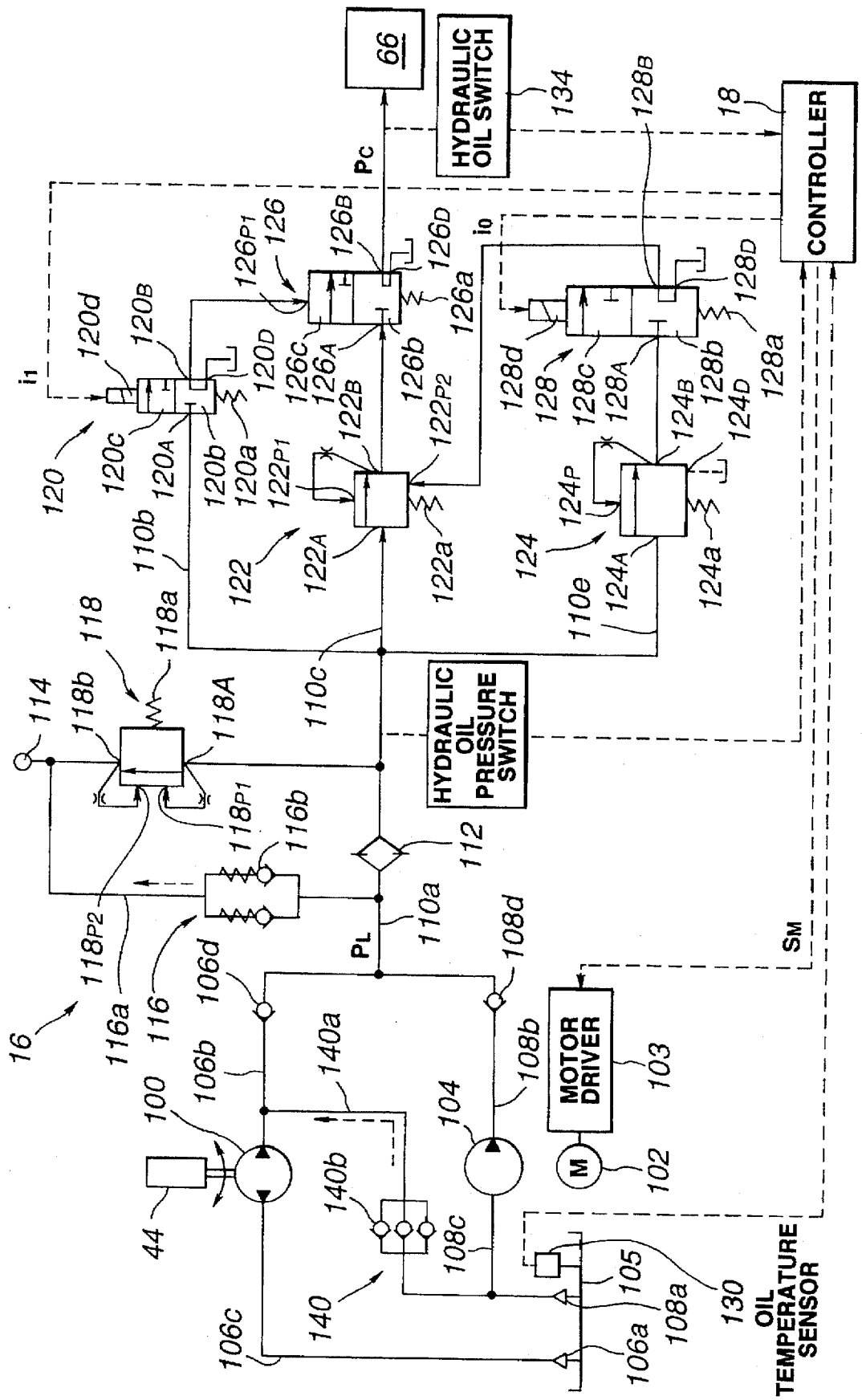
FIGS. 9A and 9B are a hydraulic oil pressure supply (circuit) of the transfer apparatus in the first embodiment shown in FIGS. 5 through 8 and the same in a third embodiment to be shown in FIG. 24, respectively.

Next, FIG. 9A shows a hydraulic and electric circuit block diagram of the hydraulic (oil) pressure supply (circuit) 16 shown in FIG. 5.

As described above, the hydraulic (oil) pressure supply 16 serves to supply the required clutch pressure $P_c$ to the input port 74 of the transfer 22.

The hydraulic (oil) pressure supply 16 includes a hydraulic (oil) pressure source having a reversibly rotatable main pump 100 which is directly coupled to the first output axle 44 so as to be driven to rotate with the first output axle 44 and a normal direction (non-reversible) rotating type sub pump 104, disposed in parallel to the main pump 100 so as to be driven to rotate with an electric motor (sub motor) 102 as a power source.

These main pump 100 and sub pump 104 suck in a working fluid (oil) reserved within an oil tank 105 and drain it to pipes 106b and 108b at drain sides of these pumps 100 and 104. A converging pipe 110a converging the pipes 106b and 108b is connected with an oil element 112. One end of a relief passage 116 is connected to an upstream side (toward the main pump 100 and sub pump 104) of the oil element 112. The other end of the relief passage 116 is connected to a lubricating system 114. A line pressure regulating valve 118 is connected to a downstream side of the oil element 112. Input sides of an electromagnetic open/closure (on-off switching) valve 120, a clutch pressure regulating valve 122, and a pressure reducing valve 124 are connected, respectively, to a pipe 110b, a pipe 110c, and a pipe 110e, each pipe 110b, 110c, and 110e being branched from the converging pipe 110a. In addition, an output end of the clutch pressure regulating valve 122 is connected to an input end of a pilot switching valve 126. The pilot switching valve 126 serves to finally supply the clutch pressure $P_c$ to the transfer 22 via the input port 74 when a pilot pressure is supplied from the electromagnetic on-off switching valve 120. An output end of the pressure reducing valve 124 is connected to an input side of a duty ratio control electromagnetic valve 128. It is noted that a temperature sensor 130 is disposed which detects a temperature of the working oil within the oil tank 105. A hydraulic oil pressure switch 132 is disposed on the pipe located at the downstream of the oil element 112 to detect working oil pressure reduced by means of the line pressure regulating valve 118. In addition, another (hydraulic) oil pressure switch 134 is disposed on a pipe in which the clutch pressure Pc is derived from the pilot switching valve 126. These detection signals of the three temperature and pressure switches 130, 132, and 134 are supplied to the controller 18.

Figure 9B:
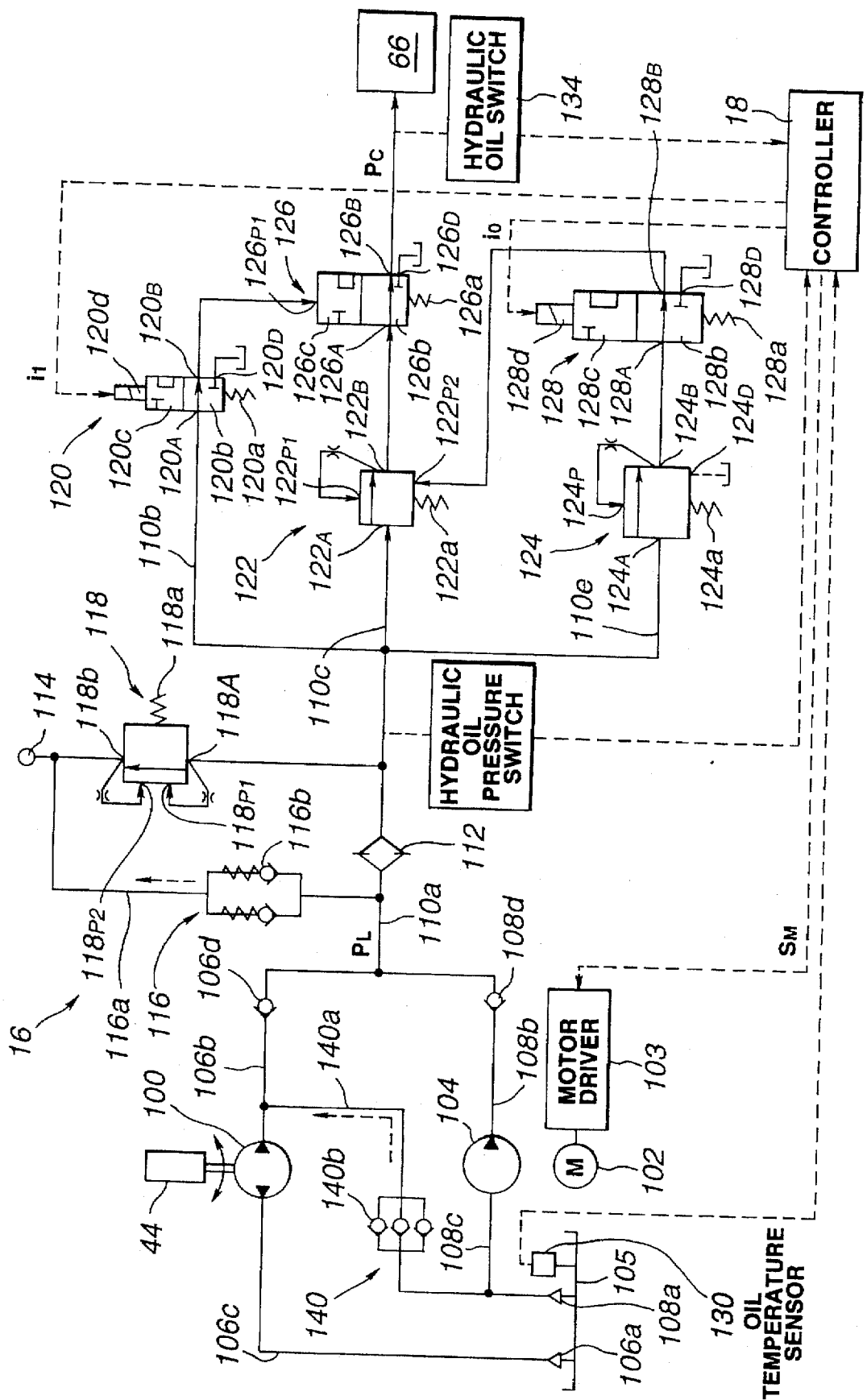

The hydraulic oil pressure supply 16 shown in FIG. 9 is, in the actual vehicle, disposed within the transfer 22. The main pump 100 which sucks the working oil from the oil tank 105 is linked to the first output axle 44 via a first gear 136a and a second gear 136b as shown in FIG. 6. The sub pump 104 is linked to the electric motor 102 externally mounted on the rear casing 40b of the transfer 22.

Each component of the hydraulic oil supply 16 will be described in details with reference to FIG. 9A.

The reversible main pump 100 sucks in the working oil from the oil tank 105 via the strainer 106a connected to one end of a sucking pipe 106c. The sub pump 104 sucks in the working oil from the oil tank 105 via the strainer 108a connected to the end of a sucking pipe 108c. Check valves 106d and 108d are interposed in drain pipes 106b and 108b of each pump connected to the converging pipe 110a. A bypass passage 140 is connected between the sucking pipe 106b of the main pump 100 and sucking pipe 108c of the sub pump 104. The bypass passage 140 is constituted by a bypass pipe 140a, three parallel disposed check valves 140b interposed in the bypass pipe 140a. When the drain pipe 106b is under a negative pressure, the check valve 140b is open so as to provide a communication passage such that the working oil streams in a dotted arrow-marked direction.

The relief passage 116 connected to the part of the converging pipe 110a located upstream with respect to the oil element 112 includes: a relief pipe 116a the other end of which is connected to the lubricating system 114; and two-parallel connected spring equipped check valves 116b interposed in the relief pipe 116a. If a clog in a filter constituting the oil element 112 occurs so that the pressure at the upstream side of the oil element 112 indicates a predetermined pressure value or higher, the check valve 116b is open so as to provide a communication passage in which the working oil streams in a dotted arrow-marked direction.

The line pressure regulating valve 118 is constituted by an inner pilot and spring type pressure reducing valve. In details, the line pressure regulating valve 118 includes: a cylindrical valve housing having an input port $118_A$ connected to the converging pipe 110a, an output port 118b connected to the lubricating system 114, and inner pilot ports $118_{p1}$ and $118_{p2}$ to which primary pressure and secondary pressure are supplied via a fixed throttling; a spool slidably disposed within the cylindrical valve housing; and a return spring 118a installed within the cylindrical valve housing and whose biasing force is applied to one end of the spool. A supply pressure $P_L$ boosted by means of the main pump 100 or sub pump 104 is reduced to a predetermined pressure by means of the line pressure regulating valve 118, the reduced pressure by means of the line pressure regulating valve 118 being supplied to the electromagnetic on-off switching valve 120, the clutch pressure regulating valve 122, and the pressure reducing valve 124. It is noted that the working oil streamed out of the output port $118_B$ when the reducing of the pressure is set is returned to the lubricating system.

The clutch pressure regulating valve 122 is constituted by an inner-pilot-and-outer-pilot and spring type pressure regulating valve. The clutch pressure regulating valve 122 includes: a cylindrical valve housing having an input port $122_A$ connected to the pipe 110c, an output port $122_B$ connected to the pilot switching valve 126, an inner pilot port $122_{p1}$ to which the secondary pressure is supplied via a fixed throttling as a pilot pressure, and an outer pilot port $122_{p2}$ to which a controlled pressure is supplied from the duty ratio control electromagnetic valve 128; a spool slidably disposed within the cylindrical valve housing thereof; and a return spring whose biasing force is applied to one end of the spool.

The clutch pressure regulating valve 122 closes the communication passage between the input port $122_A$ and the output port $122_B$ so that the secondary pressure is not output via the output port $122_B$ in a case where the control pressure is not supplied from the duty ratio control electromagnetic valve 128. However, in a case where a pilot control pressure is supplied from the duty ratio control electromagnetic valve 128, the spool is moved under its control so that the secondary pressure which accords with the pilot control pressure is output as the clutch pressure Pc.

The pressure reducing valve 124 is constituted by an inner-pilot and spring-type secondary pressure constant type pressure reducing valve.

The pressure reducing valve 124 includes: a cylindrical valve housing having an input port $124_A$ connected to the pipe 110e, an output port $124_B$ connected to the duty ratio control electromagnetic valve 128, an inner pilot port $124_P$ to which the secondary pressure from the output port $124_B$ is supplied via a fixed throttling as the pilot pressure, and a drain port $124_H$; a spool slidably disposed within the cylindrical valve housing; and a return spring 124a whose biasing force is applied to one end of the spool. Then, when the spool of the pressure reducing valve 124 is moved to a predetermined position by means of the pilot pressure supplied to the inner pilot port $124_P$, the primary pressure supplied from the input port $124_A$ is supplied to the duty ratio control electromagnetic valve 128 as the control pressure whose pressure value is reduced to the predetermined pressure.

The duty ratio control electromagnetic valve 128 is constituted by a three-port, two-position type valve. The duty ratio control electromagnetic valve 128 includes: an input port $128_A$ connected to the pressure reducing valve 124; a drain port $128_R$ connected to its drain end; an output port $128_B$ connected to the outer pilot port $122_{p2}$ of the clutch pressure regulating valve 122; and a return spring 127a. A spool disposed within the valve 128 is controllably moved between a normal position 128b at which the spool serves to communicate the output port $128_B$ and the drain port $128_R$ and an operation position 128c at which the spool serves to communicate the input port $128_A$ and the output port $128_B$.

An energizing (exciting) current $i_0$ having the required duty ratio related thereto is supplied from the controller 18 to the solenoid 128d. At this time, the spool is moved from its normal position to its operation position 128c against the biasing force of the return spring 128a during an interval at which the exciting current $i_0$ is in an on state (active state) so that the pilot control pressure according to the duty ratio related to the exciting current $i_0$ is output to the clutch pressure regulating valve 122. Hence, when the control pressure is supplied from the clutch pressure regulating valve 122 to the outer pilot port $122_{P2}$, the clutch pressure $P_c$ according to the pilot control pressure is drained. Thus, when the engaging (clutching) force of the frictional clutch 66 is controlled according to the clutch pressure Pc, the distribution of the driving torque according to the clutch pressure $P_c$ toward the front road wheels is carried out.

The electromagnetic switching valve 120 of a spring offset type is constituted by a three-port, two-position type. The electromagnetic switching valve 120 includes: an input port $120_A$ to which the line pressure is supplied; an output port $120_B$ to which the outer pilot port $126_{p1}$ of the pilot switching valve 126 is connected; and a drain port $120_D$. The electromagnetic switching valve 120 is provided with a valve housing in which a spool is controllably moved between a normal position 120b at which the spool serves to interrupt the input port $120_A$ and to communicate the output port $120_B$ to the drain port $120_D$ and an operation position 120c at which the spool serves to communicate the input port $120_A$ with the output port 120a and to interrupt the drain port $120_D$. The solenoid 120d in the electromagnetic switching valve 120 receives the exciting current $i_1$ from the controller 18. At this time, during the on state of the exciting current $i_1$, the spool is controllably moved to the operation position 120c against the biasing force of the return spring 120a so that the pilot control pressure is supplied to the external pilot port $126_{p1}$ of the pilot switching valve 126. In addition, when the exciting current $i_1$ from the controller 18 is in the off state, the biasing pressure from the return spring 120a causes the spool to be returned to the normal position 120b. At this time, the pilot control pressure supplied to the external pilot port $126_{p1}$ is eliminated through the drain port $120_D$.

Figure 10:
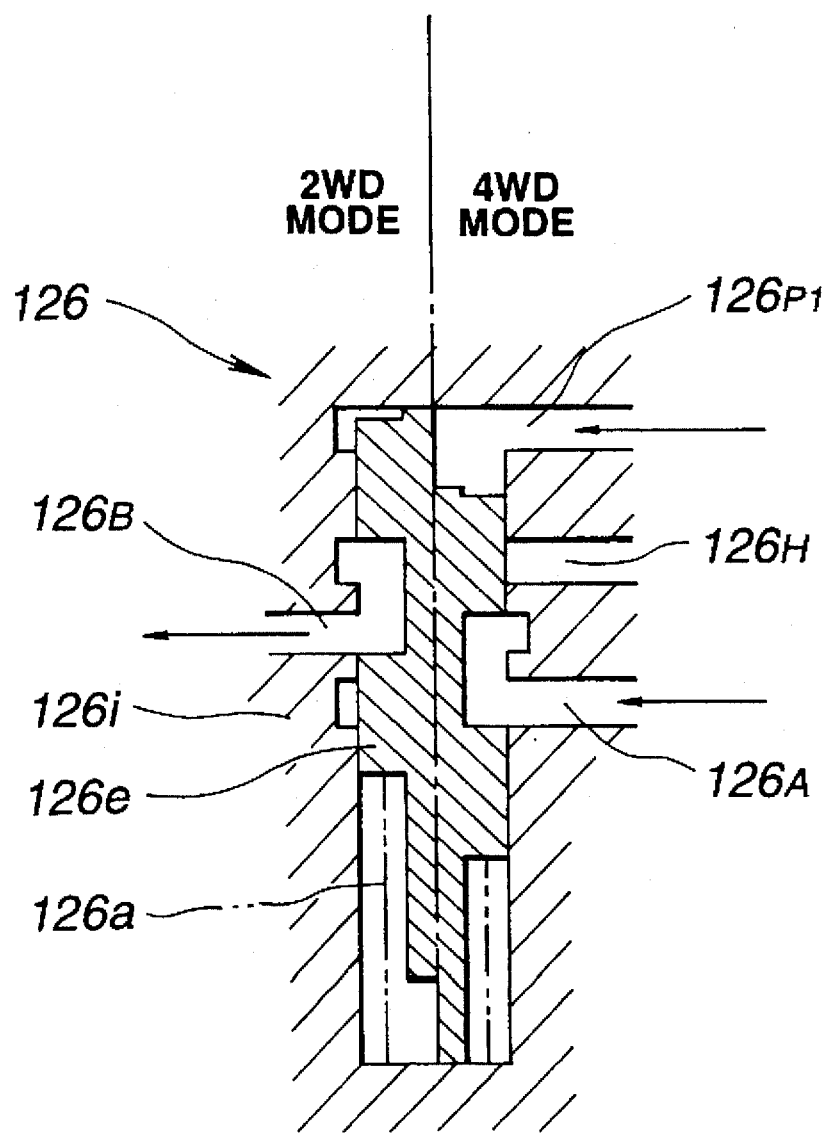
FIG. 10 is an explanatory view for explaining a switching valve (126) used in the hydraulic oil pressure supply (circuit) of the transfer apparatus shown in FIG. 9A.

In addition, as also shown in FIG. 10, the pilot switching valve 126 is a valve including: an input port $126_A$ to which the secondary pressure from the clutch pressure regulating valve 122 is supplied; an output port $126_B$ via which the secondary pressure is supplied to the transfer 22; an external pilot port $126_{p1}$ to which the control pressure is supplied when the solenoid 120d of the electromagnetic switching valve 120 is in a power supplied state; and a drain port $126_H$. A spool 126e is slidably disposed within a cylindrical valve housing 126i of the pilot switching valve 126. A return spring 126a is disposed within the valve housing so that the spool 126e is biased toward one end direction of the spool 126a.

The spool 126e of the pilot switching valve 126 serves to interrupt between both of the input port $126_A$ and output port $126_B$ in a case where the pilot control pressure is not supplied to the external pilot port $126_{p1}$. At the same time, the spool 126e is moved so that the output port $126_B$ is communicated with the drain port $126_D$ in a 2-WD (two (left and right) driven road wheels are in the driven wheels, two-wheel drive) mode position 126b (left half cross sectioned state of FIG. 10).

In addition, when the solenoid 120d of the electromagnetic switching valve 120 is in the on state through the exciting current $i_1$ (energized state), the spool of the electromagnetic switching valve 120 is moved to a second position 120c (refer to FIG. 9A) with the solenoid 120d of the electromagnetic switching valve 120 turned on so that the control pressure is supplied to the external pilot port $126_{p1}$, thereby, both of the input port $126_A$ and output port $126_B$ being communicated with each other (so called, 4-WD (four-wheel drive) mode position 126c (right half cross sectioned state of FIG. 10).

In this way, the pilot control pressure from the electromagnetic on-off switching valve 120 drives the pilot switching valve 126 so that the spool 126e of the pilot switching valve 126 can be driven to move under the highly pressurized pilot control pressure. Thus, if dust, chip, or so on is adhered onto a sliding passage of the spool 126e so that, even if a slide resistance on the spool 126e is enlarged, the slide motion of the spool 126e can be assured.

On the other hand, referring back to FIG. 5, the controller 18 receives detection signals from the high-speed gear range shift position sensor 86, the low-speed gear range shift position sensor 88, the two-wheel drive (2 WD) to four-wheel (4 WD) mode sensor 90, a throttle valve opening angle sensor 92, and a vehicle speed sensor 94 and outputs the exciting currents $i_0$ and $i_1$ to the hydraulic oil pressure supply 16 on the basis of the above-described detection signals.

In the first embodiment, the same controller 18 performs the control to enable a maintenance of a required hydraulic pressure in the hydraulic (oil) pressure supply 16. Therefore, the required oil temperature sensor 130 and hydraulic oil switches 132 and 134 are installed. A control signal $CS_2$ based on the detection signals of the above-described sensors is output from the controller 18 to the hydraulic (oil) pressure supply 16.

Figure 11:
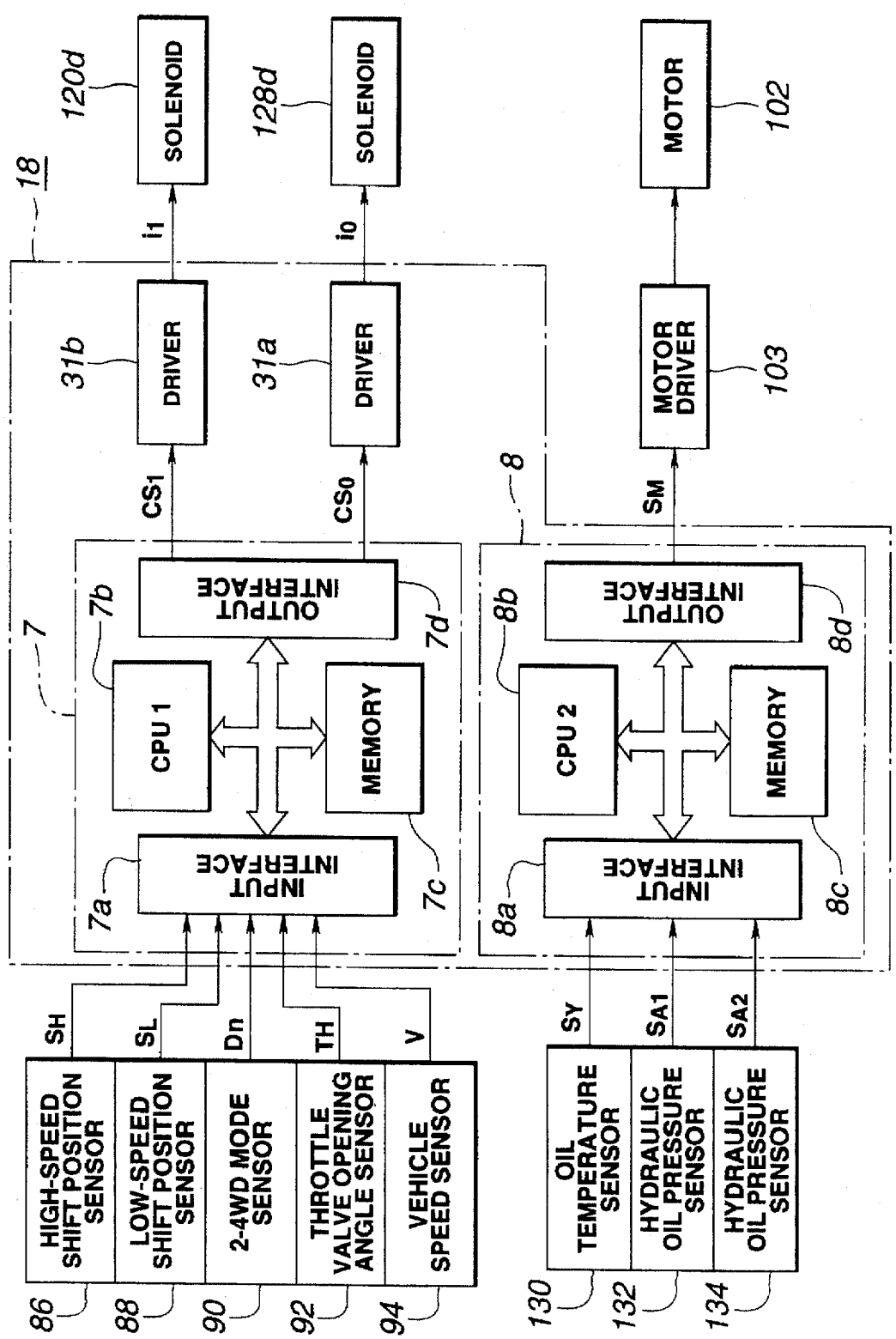
FIG. 11 is a circuit block diagram of a controller in the transfer apparatus in the first embodiment shown in FIG. 5.

The controller 18, as shown in FIG. 11, includes: a) a microcomputer 7 to perform mainly the driving force distribution control; b) a microcomputer 8 to perform mainly the above-described predetermined hydraulic pressure maintenance control; c) a driver 31a which supplies the exciting current $i_0$ having the required duty ratio related thereto to the solenoid 128d of the duty ratio control electromagnetic valve 128 in the hydraulic (oil) pressure supply 16 in response to the control signal $CS_0$ from the microcomputer 7; a driver 31b which supplies the exciting current $i_1$ to the solenoid 120d of the electromagnetic switching valve 120 in the hydraulic oil pressure supply 16 in response to the control signal $CS_1$ from the microcomputer 7, the exciting current $i_1$ being turned on and off depending on the content of the control signal $CS_1$ from the microcomputer 7; and a motor driver 103 which performs a chopper control for the sub motor 102 according to the motor control signal $S_M$ from the microcomputer 8 and performs a speed control of the sub motor 102 whose revolution speed is in accordance with the motor control signal $S_M$.

The microcomputer 7 includes: an input interface 7a having an analog-to-digital conversion function to read the detection signals from each sensor 86, 88, 90, 92, and 94 as respectively detected values; an arithmetic processing unit (so-called, CPU 1 (first Central Processing Unit) 7b to perform the arithmetic, logic, and control processing so as to perform the driving force distribution control (refer to FIG. 14) in accordance with a predetermined program; a memory 7c having a ROM (Read Only Memory) and a RAM (Random Access Memory); and an output interface 7d which outputs the control signal $CS_0$ having the duty ratio D instructing the clutch pressure Pc determining the front road wheel torque distribution ratio to the front road wheels derived by the CPU 1 and outputs the control signal $CS_1$ determining whether the clutch pressure Pc should be output.

In addition, the microcomputer 8 includes: an input interface 8a having an analog-to-digital conversion function to read the detection signals from the respective sensors 130, 132, and 134 as respective detection values; an arithmetic, logic processing unit (so-called, CPU 2) 8b; a memory 8c such as the ROM and RAM; and an output interface 8d having a digital-to-analog conversion function to output a sub motor revolution speed instruction value derived from the CPU 2 8b in the form of, for example, an analog voltage signal $S_M$.

The microcomputer 7 sets a front road wheel side torque (driving force) distribution ratio instruction value $T_2$ on the basis of the detection signals, namely, a mode signal Dn from the 2–4 WD mode sensor 90, a high-speed gear range shift position detection signal $S_H$ from the high-speed gear range shift position sensor 86, a low-speed gear range shift position signal $S_L$ from the low-speed gear range shift position sensor 88, a throttle opening angle signal TH from the throttle valve opening angle sensor 92, and a vehicle speed signal V from the vehicle speed sensor 94, calculates a duty ratio D instructing the clutch pressure Pc corresponding to the set front road wheel side torque distribution ratio instruction value $T_2$, outputs a control signal $CS_0$ corresponding to the instruction value of the duty ratio D, sets the control signal $CS_1$ in the ON state or in the OFF state, and outputs the control signals $CS_0$ and $CS_1$ to the drivers 31b and 31a, respectively.

The driver 31a includes, for example, a pulse width modulation circuit which outputs the exciting current having the (pulse) duty ratio D corresponding to the instruction value of the control signal $CS_0$ which is an analog voltage value output from the microcomputer 7 to the solenoid 128d of the duty ratio control electromagnetic valve 128.

In addition, the driver 31b converts the control signal $CS_1$ output from the microcomputer 7 into the exciting current $i_1$ having a current value excitable for the solenoid 120d of the electromagnetic on-off switching valve 120, the converted exciting current $i_1$ being output to the solenoid 120d of the electromagnetic switching valve 120.

The arithmetic operation processing carried out in the controller 18 in the first embodiment, namely, the control to enable the hydraulic (oil) pressure supply 16 at the required hydraulic oil pressure will be described below. For example, when the arithmetic calculation processing is carried out and when the hydraulic oil pressure switch 132 detects that the line pressure $P_L$ located at the downstream of the oil element 112 in the converging pipe 110a has reduced to a set value or below the set value, the CPU 2 calculates the control signal $S_M$ representing the revolution speed instruction value set according to the oil temperature detection value $S_V$ from the oil temperature sensor 120, the control signal $S_M$ being supplied to the motor driver 103, thus the revolution speed of the sub motor 102 being controlled. Consequently, the line pressure $P_L$ output from the hydraulic (oil) pressure supply 16 is maintained at a predetermined pressure.

The memory 7c of the microcomputer 7 previously stores a program required to execute the arithmetic processing of the CPU 1 and fixed data. The result of processing is temporarily stored therein.

The fixed data in the memory 7c include memory tables corresponding to the respective control characteristics shown in FIGS. 12 through 15.

Figure 12:
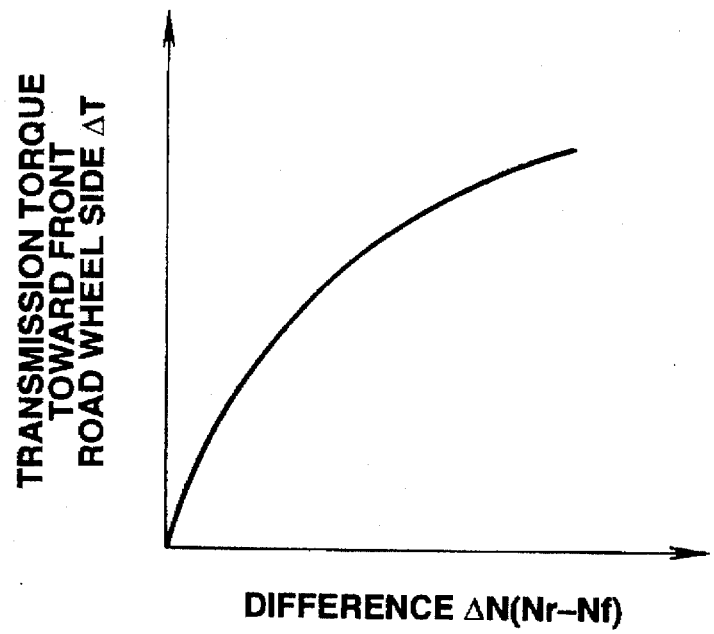
FIG. 12 is a control characteristic graph representing a relationship between a transmission torque toward front road wheels of the vehicle and a difference in a revolution speed between front and rear road wheels.
Figure 13:
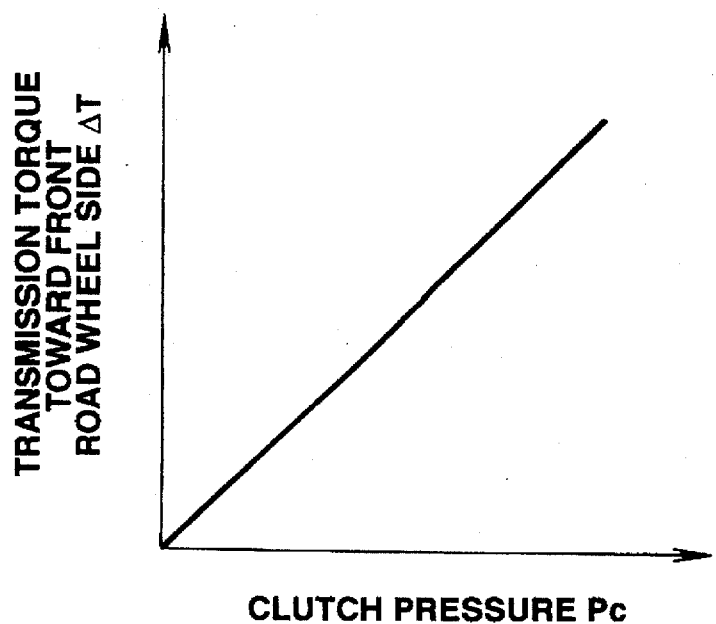
FIG. 13 is a control characteristic graph representing a relationship between a transmission torque toward front road wheels of the vehicle and a clutch pressure supplied from the hydraulic oil pressure supply (circuit) Pc in the first embodiment shown in FIG. 9A.
Figure 23:
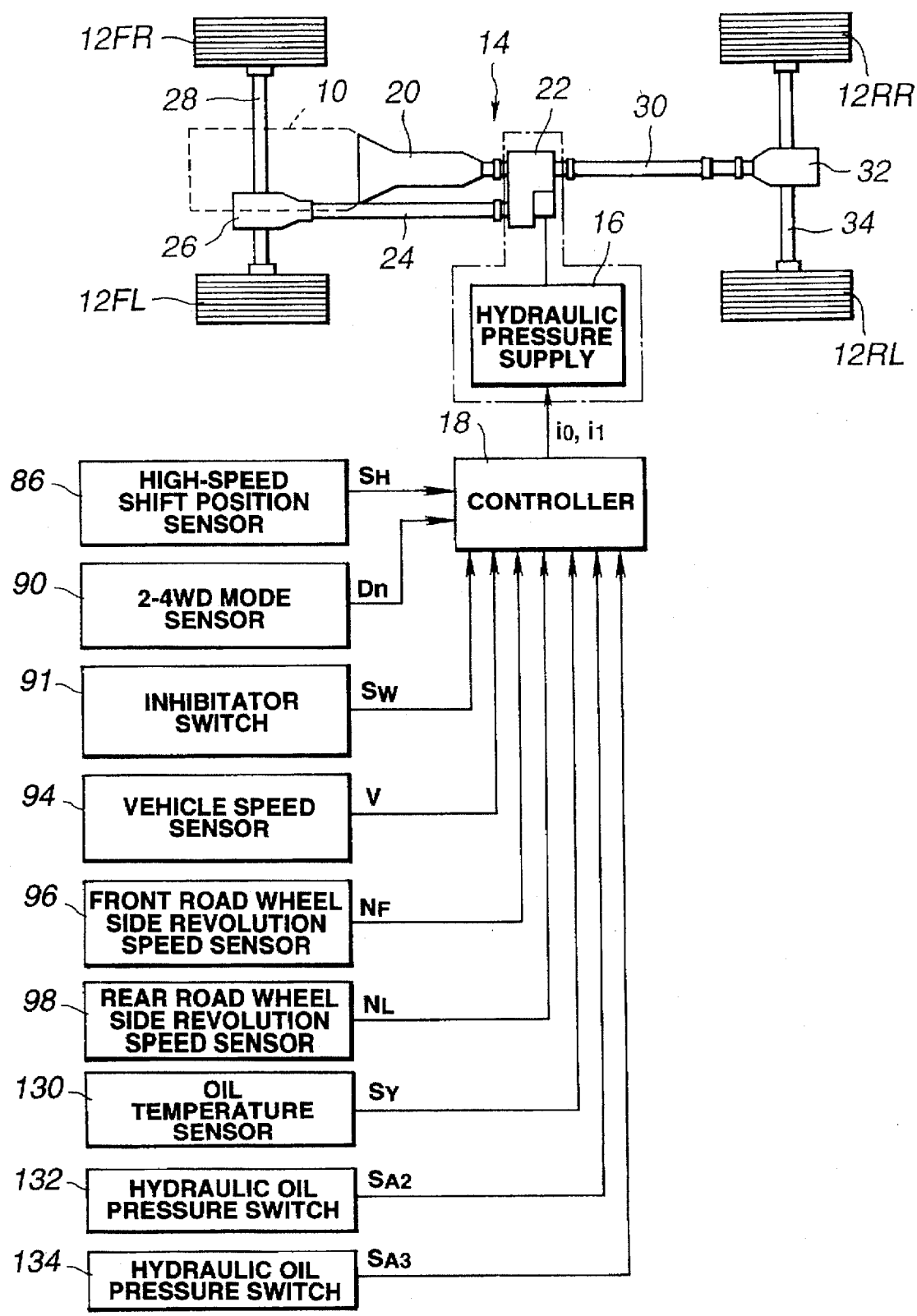
FIG. 23 is a schematic circuit block diagram of a vehicular driving force transfer apparatus in a third preferred embodiment according to the present invention applicable to the four-wheel drive vehicle.

FIG. 12 shows the control characteristic of the transmission torque ΔT with respect to the front-and-rear road wheel side revolution speed difference ΔN (a difference in the revolution speeds between the front road wheels and the rear road wheels). It is noted that the difference ΔN in the revolution speeds between the front road wheels and rear road wheels is derived using front road wheel revolution speed sensor and rear road wheel speed sensor as shown in FIG. 23 (for FIG. 23, the detailed description will be made later). As viewed from FIG. 12, the front road wheel side driving force distribution ΔT is increased nonlinearly according to the increase in the difference ΔN of the revolution speeds. In addition, FIG. 13 shows the value of the transmission torque ΔT to the front wheel side which linearly increases according to the variation in the clutch pressure Pc of the pilot switching valve 126.

Figure 14:
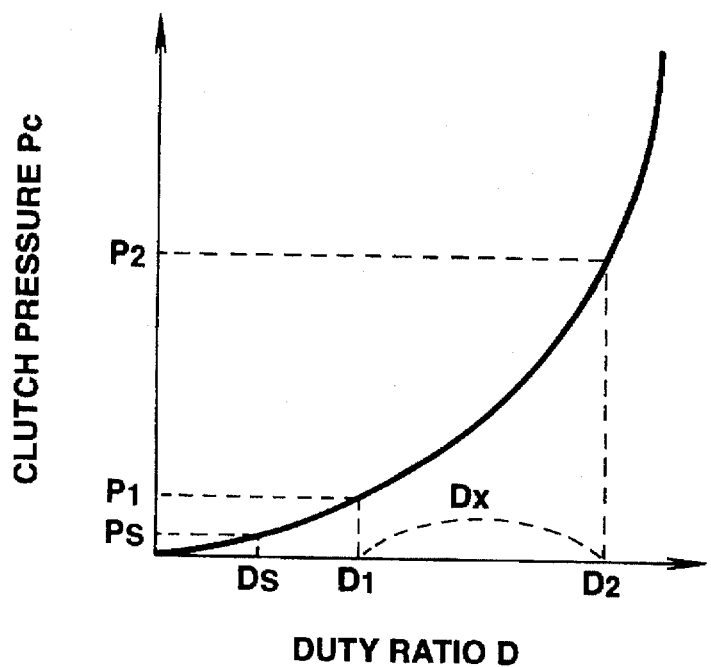
FIG. 14 is a control characteristic graph of a clutch pressure varied according to a duty ratio D in the case of the first embodiment.

FIG. 14 shows values of the clutch pressure Pc of the clutch pressure regulating valve 122 which are nonlinearly increased according to the increase in the duty ratio D of the exciting current $i_0$ supplied to the solenoid 128d of the duty ratio control electromagnetic valve 128.

When the memory table corresponding to FIG. 12 is referred to by the microcomputer 7 on the basis of the difference ΔN between the front and rear road wheel revolution speeds to determine the transmission torque ΔT, the value of the duty ratio D to be output from the controller 18 is calculated in a back calculation method.

When the clutch pressure $P_1$ through $P_2$ corresponding to one of the duty ratio values ranging from $D_1$ to $D_2$ shown in FIG. 14 is supplied to the frictional clutch 66, a predetermined torque distribution ratio which accords with the clutching force of the frictional clutch 66 is continuously varied from rear road wheel distribution percentage: front road wheel distribution percentage =100%:0% to rear road wheel distribution percentage: front road wheel distribution percentage =50%:50%.

The clutch pressure Pc shown in FIG. 14 indicates the pressure such that the torque (driving force) distribution from the first output axle 44 to the second output axle 54 is not carried out and the frictional clutch 66 is in a slight junction (clutched) state (a state in which the friction plates 66b of the frictional clutch and the friction discs 66d thereof are slightly pressurized and junctioned to one another). In this case, a given clutch pressure $P_s$ according to the duty ratio of $D_s$ ($D_s < D_1$) is supplied to the frictional clutch 66.

Figure 15:
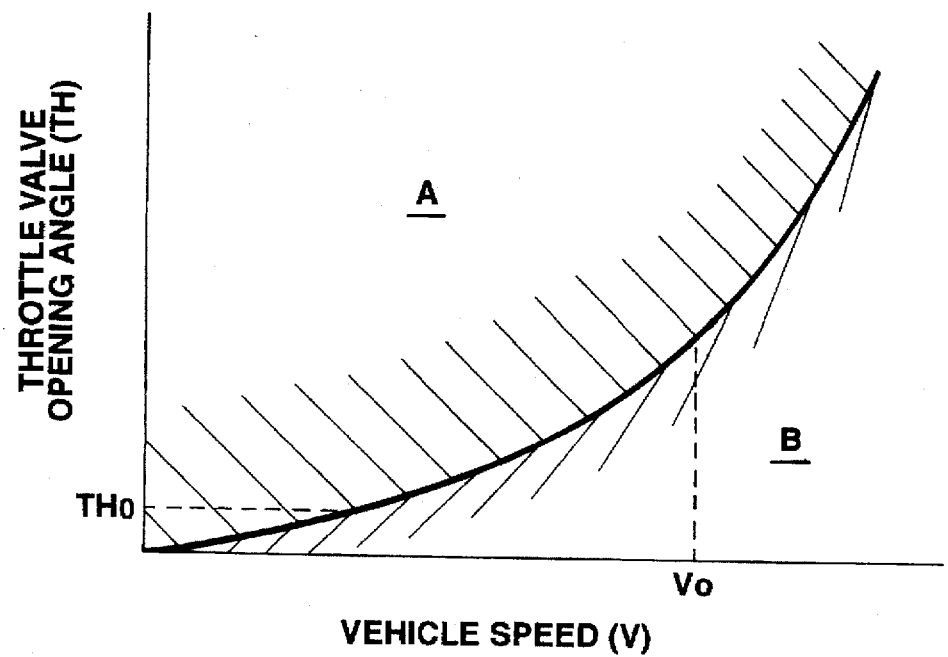
FIG. 15 is a characteristic graph representing a relationship between an opening angle of an engine throttle valve and vehicle speed during a vehicular run.

The memory table shown in FIG. 15 stores reference values to detect a region in which the difference in revolution speeds between the first output axle 44 and the second output axle 54 is easy to occur by comparing electrical signals from the throttle valve opening angle sensor 92 and the vehicle speed sensor 94.

That is to say, FIG. 15 shows a relationship between the opening angle of the throttle valve TH and the vehicle speed V. A region denoted by oblique lines A denotes a state (drive region) in which a depression of the accelerator pedal causes the driving force derived from the engine 1 to be transmitted to the respective road wheels. A region denoted by oblique lines B denotes a state (coast region) in which the vehicle coasts due to an open of the accelerator pedal.

In general, the coast region is dependent upon an engine torque, namely, the engine throttle opening angle. Since the vehicle speed is increased and, simultaneously, the running resistance is increased, the coast region is widened in a higher speed region of the vehicle speed. When the vehicle driving state is transferred from the coast region B to the drive region A, the difference in the revolution speeds between the first output axle 44 and the second output axle 54 is easy to occur. In the memory table shown in FIG. 15, to detect the region in which the revolution speed difference between the first output axle 44 and the second output axle 54 is easy to occur, a reference throttle opening angle $TH_0$ and reference vehicle speed $V_0$ are stored.

Figure 16:
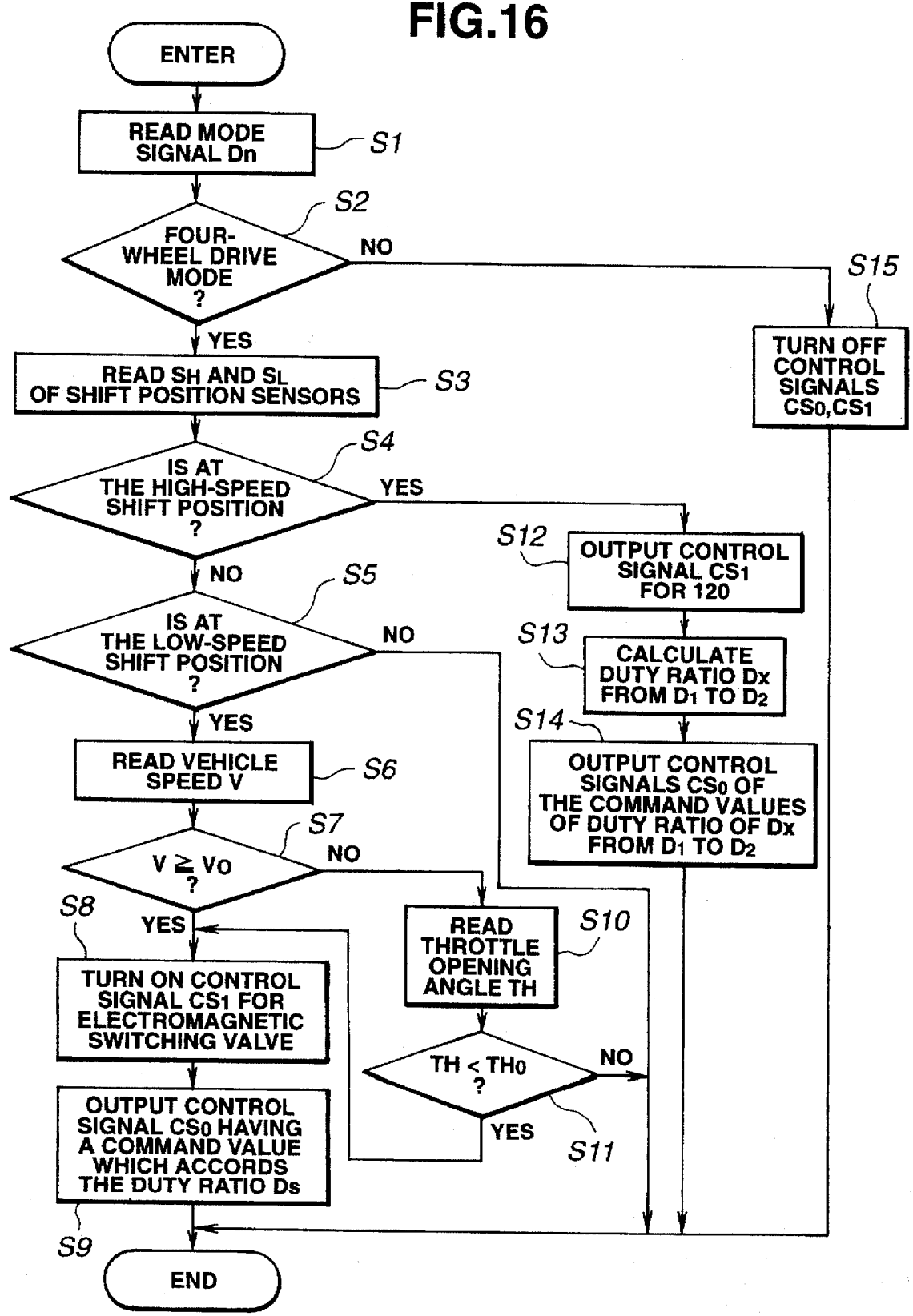
FIG. 16 is an operational flowchart for explaining a hydraulic oil pressure control procedure in the controller shown in FIG. 11.

The hydraulic (oil) pressure control by means of the controller 18 is executed in accordance with a reference arithmetic operation shown in FIG. 16.

The reference arithmetic operation control operation on the hydraulic pressure control will be described below with reference to FIG. 16.

It is noted that the program shown in FIG. 16 is executed as a timer interrupt routine for each predetermined time ($\Delta T$).

At a step S1, the CPU 1 reads the mode signal Dn input from the 2-to-4 WD (Wheel Drive) mode sensor 90.

Then, at a step S2, the CPU 1 determines whether the four-wheel drive mode is selected. If the two-wheel drive mode is selected (Yes) at the step S2, the routine goes to a step S15. At the step S15, the control signal $CS_0$ for the duty ratio control electromagnetic valve 128 is turned off and the control signal $CS_1$ for the electromagnetic (on-off) switching valve 120 is in the off state. Then, the present interrupt routine is ended.

If the four-wheel drive mode is selected at the step S2 (Yes at the step S2), the routine goes to a step S3 in which the CPU 1 reads the detection signals $S_H$ and $S_L$ input from the high-speed gear range, shift position sensor 86 and the low-speed gear range shift position sensor 88.

Next, the present routine goes to a step S4 in which the CPU 1 determines whether the shift sleeve 64b is moved toward the high-speed gear range shift position H. If the shift sleeve 64b is moved to the high-speed gear range shift position H (Yes at the step S4), the routine goes to a step S12. If the shift sleeve 64b is not placed at the high-speed gear range position (No) at the step S4, the routine goes to a step S5.

At the step S12, the CPU 1 commands to turn the control signal $CS_1$ for the electromagnetic one-off switching valve 120 in the on state. Then, the routine goes to a step S13 in which the CPU 1 sequentially refers to the memory tables shown in FIGS. 12 through 14 so as to calculate the front road wheel side torque distribution ratio $\Delta T$ on the basis of the road wheel revolution speed difference $\Delta N$, calculates the clutch pressure Pc of the frictional clutch 66 on the basis of the front road wheel side torque distribution $\Delta T$, and calculates the duty ratio Dx which falls in a range from $D_1$ to $D_2$ corresponding to the clutch pressure Pc, the derived value of Dx being updated and stored in a predetermined memory area of the memory 7c. Then, the routine goes to a step S14 in which the control signal $CS_0$ corresponding to the instruction value of the duty ratio Dx in the range from $D_1$ to $D_2$ is output to the driver 31a. Then, the present routine is ended.

On the other hand, if the CPU 1 determines that the shift sleeve 64b is not moved to the high-speed gear range shift position H (No) at the step S4, the present routine goes to the step S5. Then, at the step S5, the is CPU 1 determines whether the shift sleeve 64b is moved at the low-speed gear range shift position L. If the CPU 1 determines that the shift sleeve 64b is not moved to the low-speed gear range shift position L (No) at the step S5, the CPU 1 determines that the shift sleeve 64b is moved to the neutral position (N) and the present routine is ended.

If the CPU 1 determines that the shift sleeve 64b is moved to the low-speed gear range shift position L (Yes) at the step S5, the routine goes to a step S6. At the step S6, the CPU 1 reads the vehicle speed signal V from the vehicle speed sensor 94. Then, the routine goes to a step S7 in which the CPU 1 compares the value of the vehicle speed signal V with the reference vehicle speed $V_0$ previously stored in the memory 7c. If the vehicle speed V is above or equal to the reference vehicle speed $V_0$, the CPU 1 determines that it is now the region in which the difference in the revolution speed between the first output axle 21 and the second output axle 22 is easy to occur and the routine goes to a step S8. If the vehicle speed is below the reference vehicle speed $V_0$, the routine goes to a step S10.

At the step S8, the CPU 1 commands to turn the control signal $CS_1$ for the electromagnetic (on-off) switching valve 120 in the on state. The present routine goes to a step S9 in which the CPU 1 refers to the memory tables from FIGS. 12 through 14 so that the duty ratio $D_s$ corresponding to the clutch pressure $P_s$ of the frictional clutch 66 (refer to FIG. 14) is determined. The control signal $CS_0$ corresponding to the instruction value of the determined duty ratio $D_s$ is output to the driver 31a and the present routine is ended.

On the other hand, at the step S10, the CPU 1 reads the throttle valve opening value TH input from the throttle valve opening angle sensor 92. Then, the routine goes to a step S11 in which the CPU 1 compares the throttle valve opening angle value TH with the reference throttle valve opening angle $TH_0$. If the CPU 1 determines that the throttle valve opening angle TH is below the reference throttle valve opening angle value $TH_0$ at the step S11, the CPU 1 determines that it is now the region in which the revolution speed difference between the first output axle 44 and the second output axle 54 is easy to occur and the routine goes to the step S8 described above. If the CPU 1 determines that the throttle valve opening angle value TH is above the reference throttle valve opening angle value $TH_0$ (No) at the step S11, the present routine is ended.

Next, the relationship between the range selection of the sub transmission mechanism lever (via the fork 84) and the driving force transmission route in the transfer 22 will be described below.

It is noted that the sub transmission lever (hereinafter, often simply referred to as a lever) can be set to four modes, namely, a rear-road-wheel drive Hi (High) range (hereinafter, abbreviated as 2H range); a four-wheel drive high-speed range (hereinafter, abbreviated as 4H range), neutral range (hereinafter, abbreviated as N range), and four-wheel drive low-speed range (hereinafter, abbreviated as 4L range). Then, when the 4L range or 4H range is selected, the controller 18 receives the four-wheel drive mode signal Dn from the 2-4 WD mode sensor 90.

First, when the N range is selected through the lever, the shift sleeve 64b is slided to the neutral position N as shown the upper position of FIG. 7. In this case, since this shift sleeve 64b mashes with neither the high-speed gear range shifting gear 64c, the low-speed gear range shifting gear 64d, nor the four-wheel driving gear 80 and the transmission route cannot be assured, the all road wheels are not driven.

In addition, with the 2H range selected through the lever, the controller 18 receives the two wheel drive mode signal Dn from the 2-4WD mode sensor 90. The controller 18 does not carry out the hydraulic (oil) pressure control and the clutch pressure Pc does not supply the input port 74 of the transfer 22. Then, the shift sleeve 64b slides up to the high-speed range position H as shown in the upper portion of FIG. 7 and the inner tooth $64b_1$ and the high-speed gear shifting gear 64c are meshed with each other. At this time, the driving force of the input axle 42 is transmitted through the high-speed gear shifting gear 64c, the inner tooth $64b_1$, and the first output axle 44 as the high-speed revolution driving force. The friction plates 66b and the friction discs 66d of the frictional clutch 66 are not engaged so that the transmission route is not secured. Consequently, the vehicle can run in the high-speed gear range two-drive wheel drive state (in this case the two-wheel drive state is for the rear road wheels 12RL and 12RR).

In addition, if the 4H range is selected through the lever, the controller 18 receives the four-wheel drive mode signal Dn from the 2–4 WD mode sensor 90. The controller 18 outputs the control signal $CS_O$ corresponding to the instruction value according to the duty ratio Dx falling the range from $D_1$ through $D_2$ to the solenoid 128d of the duty ratio control electromagnetic valve 128 to control the clutch pressure regulating valve 122. In this way, the secondary pressure in a range from $P_1$ to $P_2$ from the clutch pressure regulating valve 122 is output to the input port 74 (frictional clutch 66) as the clutch pressure Pc via the pilot switching valve 126. In addition, the driving force of the input axle 42 is transmitted through the high-speed gear range shifting gear 64c, the inner tooth $64b_1$, and the first output axle 44 as the high speed driving force. The high-speed driving force on the first output axle 44 is transmitted through the route of the frictional clutch 66 engaged with the predetermined torque distribution ratio, the first sprocket 68, the chain 72, the second sprocket 70, and the second output axle 54 as the high-speed driving force. Consequently, the vehicle can run at the high-speed four-wheel drive state.

Then, when the 4L range is selected through the lever, the shift sleeve 64b is slided up to the low-speed gear range position L as shown in the lower portion of FIG. 7. At the same time when the low-speed shifting gear 64d is meshed with the outer tooth $64b_2$, the four-wheel driving gear 80 is meshed with the inner tooth $64b_1$. This four-wheel driving gear 80 is meshed with the inner tooth $64b_1$. The outer tooth $80b_1$ of the four-wheel driving gear 80 and the inner tooth $64b_1$ have the mutually reduced numbers of tooth. The probability of opposing the inner tooth $64b_1$ with outer tooth $80b_1$ are reduced so that the inner tooth $64b_1$ are smoothly inserted into the widened tooth spaces $80b_2$ between the outer tooth $80b_1$. Then, the outer tooth $80b_1$ are also smoothly inserted into the widened tooth groove $64b_2$. Thus, the meshing operation can be facilitated.

Since the revolution speed of low-speed gear range shifting gear 64d is reduced with respect to the input axle 42 by means of the planetary gear mechanism 62, the driving force of the input axle 42 is transmitted as the reduced speed driving force through the route of the low-speed gear shifting gear 64d, the outer tooth $64b_2$, the inner tooth $64b_1$, and the first output axle 44. At the same time, the low-speed revolving driving force of the first output axle 44 is transmitted as the reduced speed driving force through the route of the inner tooth $64b_1$, the four-wheel driving gear 80, the first sprocket 68, the chain 72, the second sprocket 70, and the second output axle 54. Consequently, the vehicle can run in the low-speed gear range four-wheel drive state.

Figure 17:
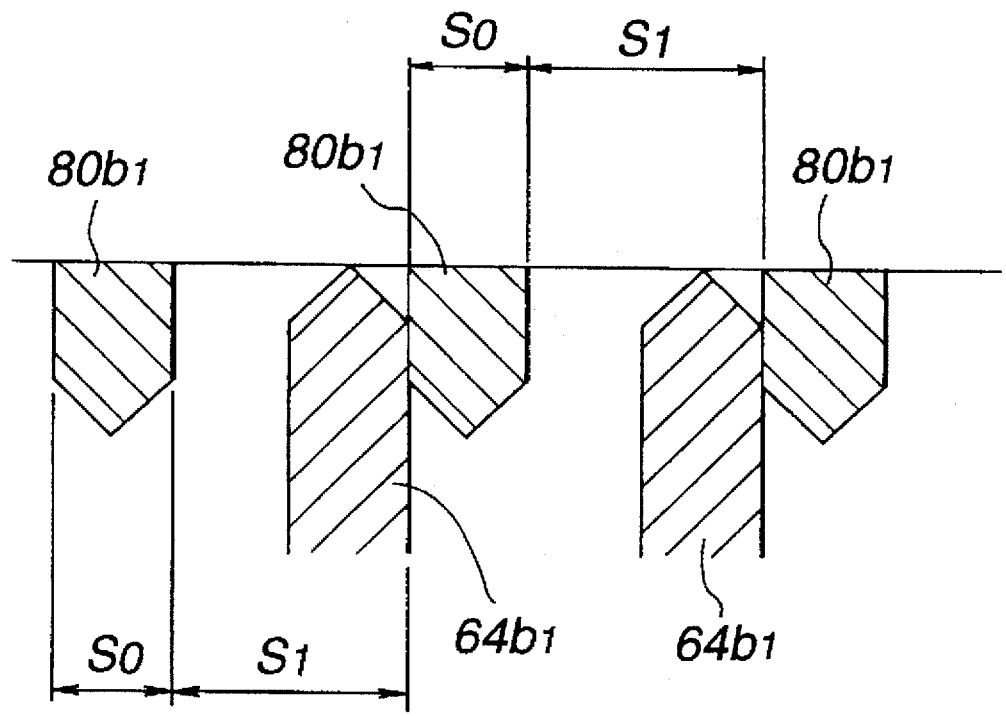
FIG. 17 is an explanatory view for explaining a meshed state of mutual dog tooth in the first embodiment in a case where a difference in revolution speed between a first output axle and a second output axle is relatively small.

Anyway, since a play of meshing is provided between the outer tooth $80b_1$ and inner tooth $64b_1$ of the four-wheel driving gear 80, as appreciated from the above-described explanation of the first embodiment shown in FIG. 17 when the 4L range is selected and the revolution speed difference is present between the first output axle 44 and second output axle 54, an asynchronous revolution (or meshing) of both of the first and second output axles 44 and 54 may occur, this asynchronous revolution due to the play causing axle vibration and shock to occur which is unpleasant to the vehicle driver.

However, the controller 18, as described above, outputs the control signal $CS_O$ corresponding to the instruction value according to the duty ratio $D_s$ to the solenoid 128d of the duty ratio control electromagnetic value 128 (at the step S9 shown in FIG. 16) when the present vehicle speed V is equal to or above the reference vehicle speed $V_O$. The clutch pressure $P_s$ according to the duty ratio $D_s$ is supplied to the input port 74 (frictional clutch 66) from the hydraulic (oil) pressure supply 16. The supply of the clutch pressure $P_s$ causes the mutually slightly pressurized state between the friction plates 66b and friction discs 66d of the frictional clutch 66. Then, since the revolution speed of the first output axle 44 is transmitted to the second output axle 54 via the frictional clutch 66, the first sprocket 68, the chain 72, and the second sprocket 70, the revolution speed difference between the first output axle 44 and the second output axle 54 becomes minor. Consequently, as shown in FIG. 17, no asynchronous (unsmooth) meshing would not occur between the outer tooth $80b_1$ of the meshing four-wheel driving gear 80 and the inner tooth $64b_1$ of the shift sleeve 64b occurs.

In addition, with the accelerator pedal of the vehicle released during the vehicular low speed run open, the revolution speed difference between the first output axle 44 and the second output axle 54 is easy to occur. However, the controller 18 when the present throttle opening angle TH is below the reference throttle opening angle $TH_O$ (at the step S11 shown in FIG. 16), the control signal $CS_O$ corresponding to the instruction value of the duty ratio $D_s$ is output to the solenoid 128d of the duty ratio control electromagnetic valve 128 (at the step S8 shown in FIG. 16), the clutch pressure $P_s$ according to the duty ratio $D_s$ is supplied to the input port 74 (frictional clutch 66) from the hydraulic (oil) pressure supply 16. Thus, since the revolution speed difference between the first output axle 44 and the second output axle 54 becomes minor, no asynchronous meshing between the outer tooth $80b_1$ and inner tooth $64b_1$ may not occur, as shown in FIG. 17.

Hence, in the first embodiment, the mutual numbers of tooth between the outer tooth $80b_1$ of the four-wheel driving gear 80 and the inner tooth $64b_1$ of the shift sleeve 64b are reduced so that the inner tooth $64b_1$ are smoothly inserted into the widened tooth spaces between the outer tooth $80b_1$ and the outer tooth $80b_1$ are smoothly inserted into widened tooth spaces $64b_3$, the meshing operation becomes facilitated. An operation performance of the 4L range through the lever can be improved.

In a case where due to a release from the accelerator pedal during the vehicular low speed running state, the revolution speed difference between the first output axle 44 and second output axle 54 is easy to occur, the clutch pressure $P_s$ under which the friction plates 66b and friction discs 66d of the frictional clutch 66 are mutually slightly pressed is supplied to the input port 74. Consequently, the revolution speed difference between the first output axle 44 and the second output axle 54 becomes minor (small) so that the asynchronous (unsmooth) meshing between the meshed four-wheel driving gear 80 and inner tooth $64b_1$ does not occur. Consequently, no unpleasant feeling such as vibration and shock is given to the driver.

Furthermore, even in a case where the revolution speed difference between the first output axle 44 and second output axle 54 is easy to occur during the high speed vehicle run, the controller 18 performs the hydraulic oil pressure control of the hydraulic (oil) pressure supply 16 so as to provide the clutch pressure Ps which renders the frictional clutch 66 in the slight pressed state. Therefore, the revolution speed difference between the first output axle 44 and second output axle 54 becomes minor. Thus, the asynchronous (unsmooth) meshed state between the four-wheel driving gear 80 and the inner tooth $64b_1$ does not occur. The vibration and shock described above are not generated.

(Second Embodiment)

Figure 18:
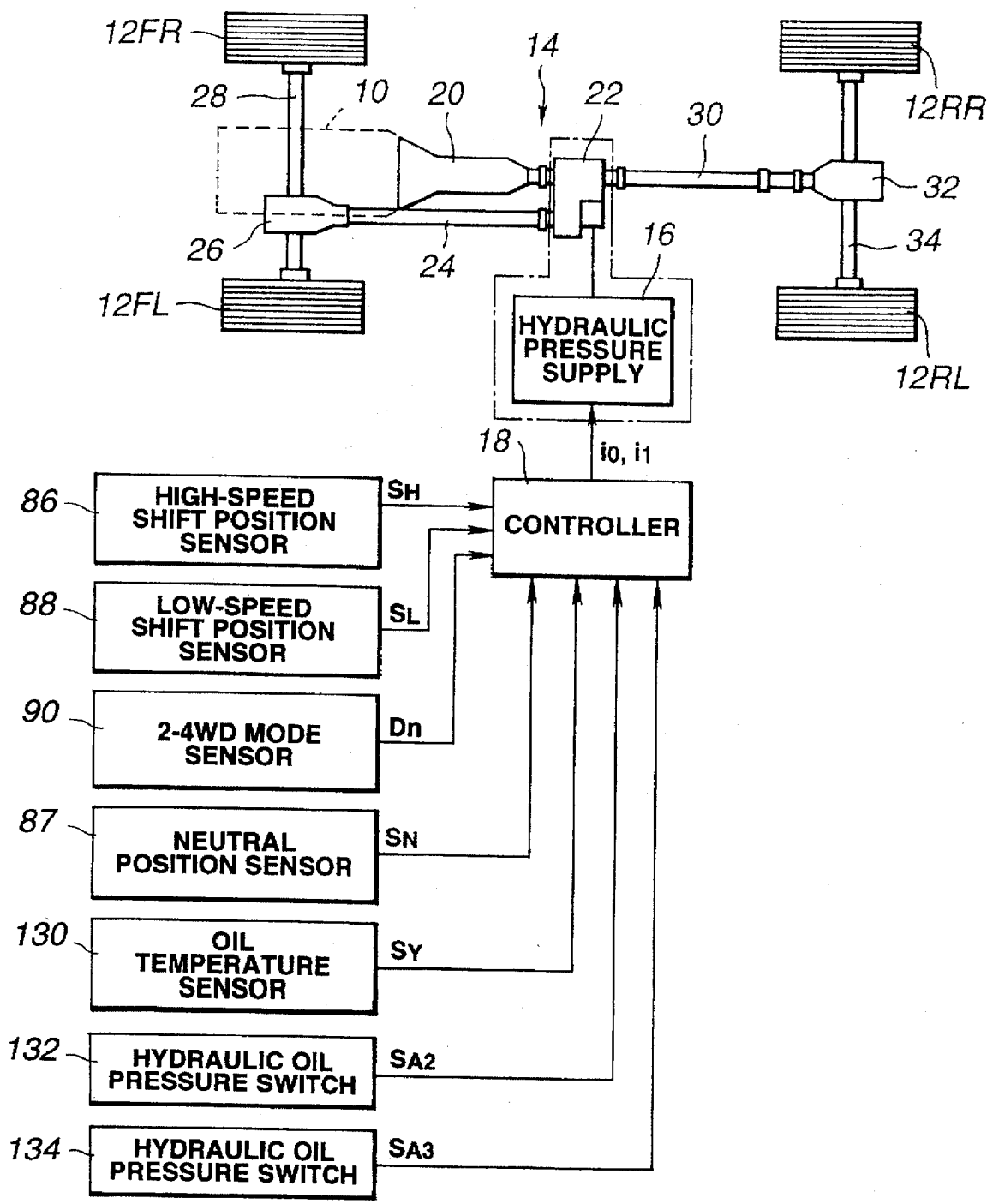
FIG. 18 is a schematic circuit block diagram of a vehicular driving force transfer apparatus in a second preferred embodiment according to the present invention applicable to the four-wheel drive vehicle.

FIG. 18 shows the four-wheel drive vehicle to which a second preferred embodiment of the vehicular driving force transfer apparatus according to the present invention is applicable.

As shown in FIG. 18, the difference between the vehicular driving force transfer apparatus in the first preferred embodiment and that in the case of the second preferred embodiment is, mainly, provision of the neutral position sensor 87 which serves to detect that the shift sleeve 64b is moved to the neutral position N (the position denoted by the phantom line shown in FIG. 7) and output the neutral position detection signal $S_N$ to the controller 18.

The driving force transmission system 14, in the second embodiment, includes: a fluid coupling type automatic power transmission 20 which is equipped with a fluid coupling such as a torque converter as the power transmission; and the transfer 22 which serves to distribute the driving force transmitted from the automatic power transmission 20 into the front road wheels 12FL and 12RR.

Figure 19:
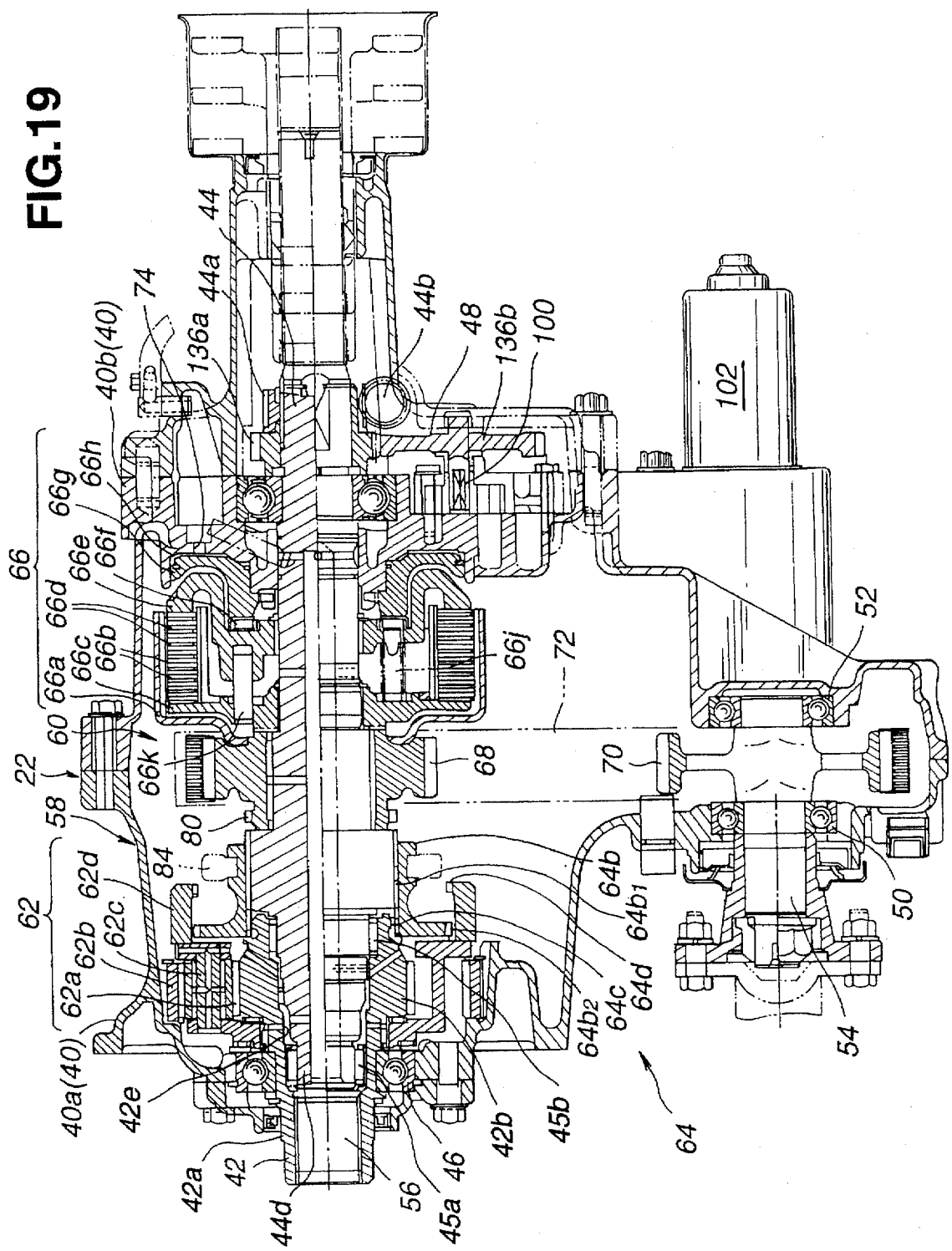
FIG. 19 is an explanatory view for explaining an internal structure of the transfer apparatus in the second preferred embodiment according to the present invention.

FIG. 19 shows the internal structure of the transfer 22.

Within the transfer casing 40, the input axle 42 and first output axle 44 are relatively revolvable with both of the input axle 42 and first output axle 44 coaxially faced against each other. That is to say, the input axle 42 is made of a cylindrical member whose outer diameter and inner diameter are expanded in a plurality of stage forms as the input axle 42 itself goes from one end 42a to the other end, the output axle 56 of the automatic power transmission 20 being fitted into its inner diameter portion 42e of the one end 42a and its outer diameter and the outer diameter portion being rotatably supported via a radial bearing 46 on the front casing 40a. The first output axle 44 has one end 44d inserted into the inner diameter portion 42e of the input axle 42 and is disposed via the bearings 45a and 45b. The other end of the first output axle 44 connected to the rear road wheel side output axle 30 is rotatably supported on the rear casing 40a via the radial bearing 48. The one end and the other end of the first output axle 44 are mutual revolvably disposed via the radial casing 48. The second out axle 54 is coupled to the front road wheel side output axle 24.

The first sprocket 68 is provided with the four-wheel driving gear 80 located against the outer periphery of the shift sleeve 64b. When the shift sleeve 64d is moved up to the low-speed gear range position L, the outer tooth $64b_2$ is meshed with the low-speed gear shifting gear 64d. Together with this meshing, the four-wheel driving gear 80 is meshed with the inner tooth $64b_1$. In this way, both of the shift sleeve 64b and the four-wheel driving gear 80 constitute the dog clutch such that the first output axle 44 and second output axle 54 are forcefully coupled to each other.

Figure 20:
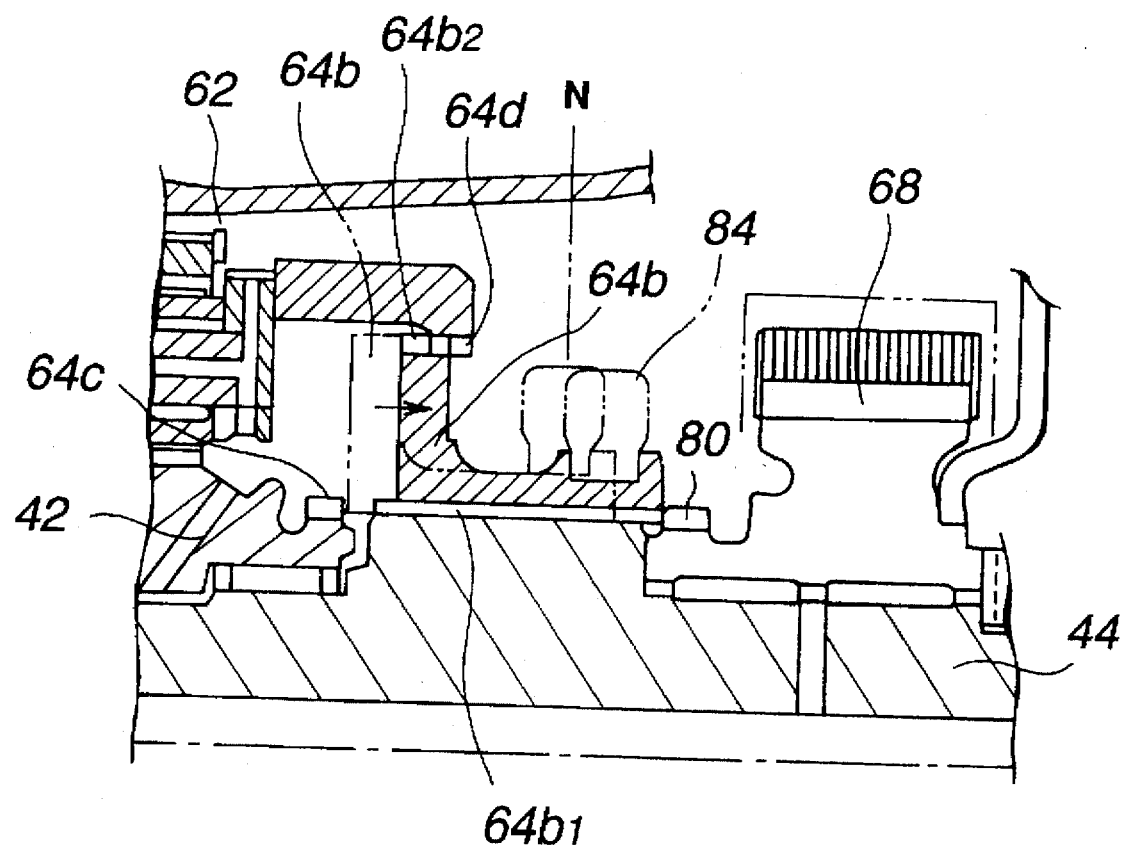
FIG. 20 is an explanatory view for explaining a meshed state between a low-speed gear and a shift sleeve in a case of the second embodiment.
Figure 21:
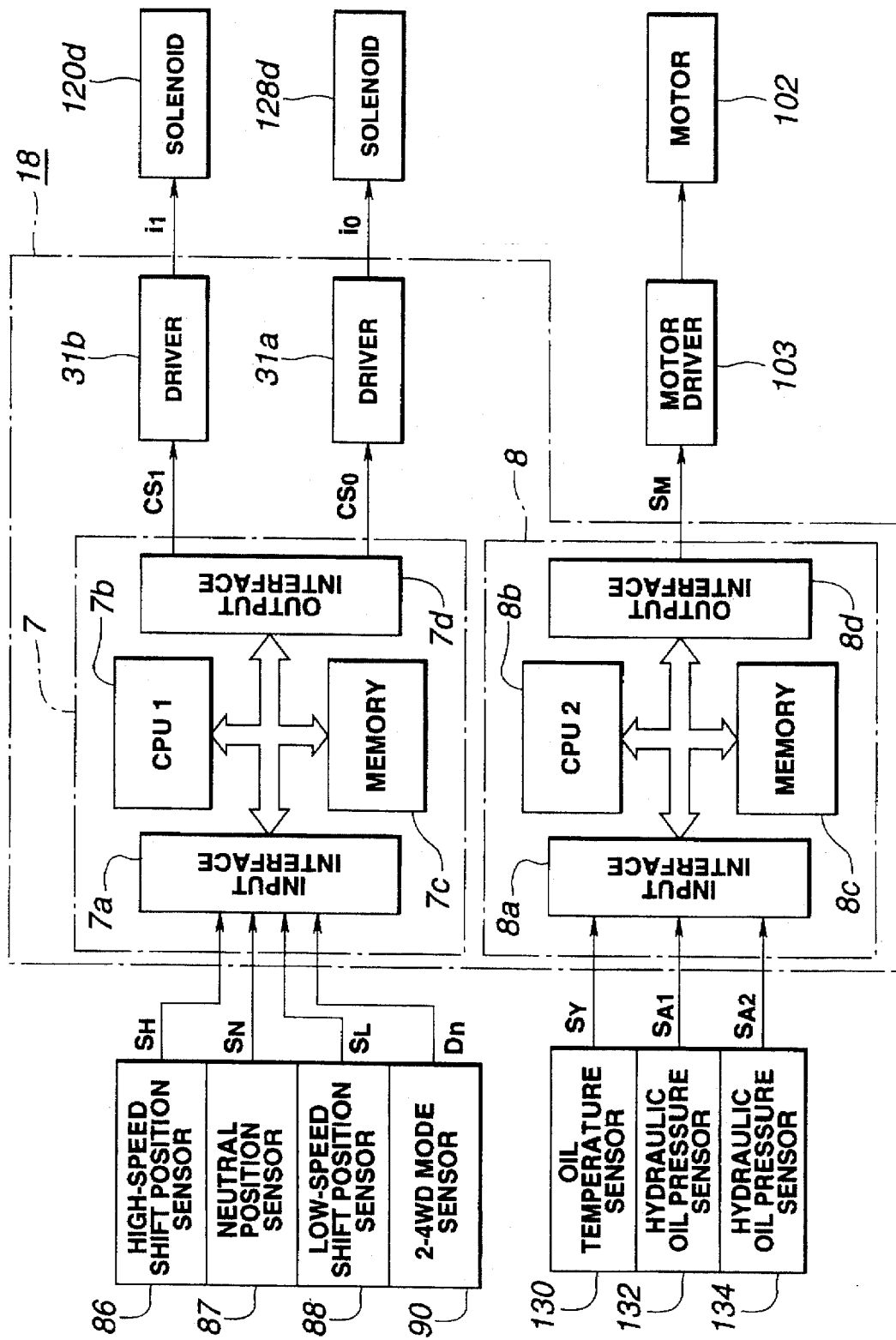
FIG. 21 is a circuit block diagram of the controller in the case of the second embodiment shown in FIG. 18.

As shown in FIG. 20, in the second embodiment, when the shift sleeve 64b is moved from the neutral position N (the position denoted by the phantom line of FIG. 20) to the low-speed gear shifting position L, the outer tooth $64b_2$ is first meshed with the low-speed gear shifting gear 64d before the mesh of the four-wheel driving gear 80 with the inner tooth $64b_1$ (hereinafter, the meshed state described above is called the low-speed gear range position two-wheel drive state). Thus, in the second embodiment, the mesh timing between the outer tooth $64b_2$ and low-speed shifting gear 64d can be earlier when the shift sleeve is switched from the high-speed gear range position H to the low-speed gear range position L, in the sub transmission mechanism 58 of the second preferred embodiment.

The shift sleeve 64b of the high-speed gear range position and low-speed gear range position switching mechanism 64 of the mesh clutch type is slided from the high-speed gear shift position H, neutral position N, or low-speed gear shift position L via the fork (its tip is denoted by 84 of FIG. 19) by means of the manual operation of the sub transmission lever. As shown in FIG. 20, the neutral position sensor 87 is disposed to detect that the shift sleeve 64b is moved to the neutral position N. The detection signals $S_H$, $S_L$, and $S_N$ of the high-speed gear shift position sensor 86, the low-speed gear shift position sensor 88, and the neutral position sensor 87 are output to the controller 18 according to the moved position of the shift sleeve 64b.

The other structure of the transfer 22 is generally the same in the case of the first embodiment shown in FIG. 6. Therefore, the detailed description is not made herein.

Figure 22:
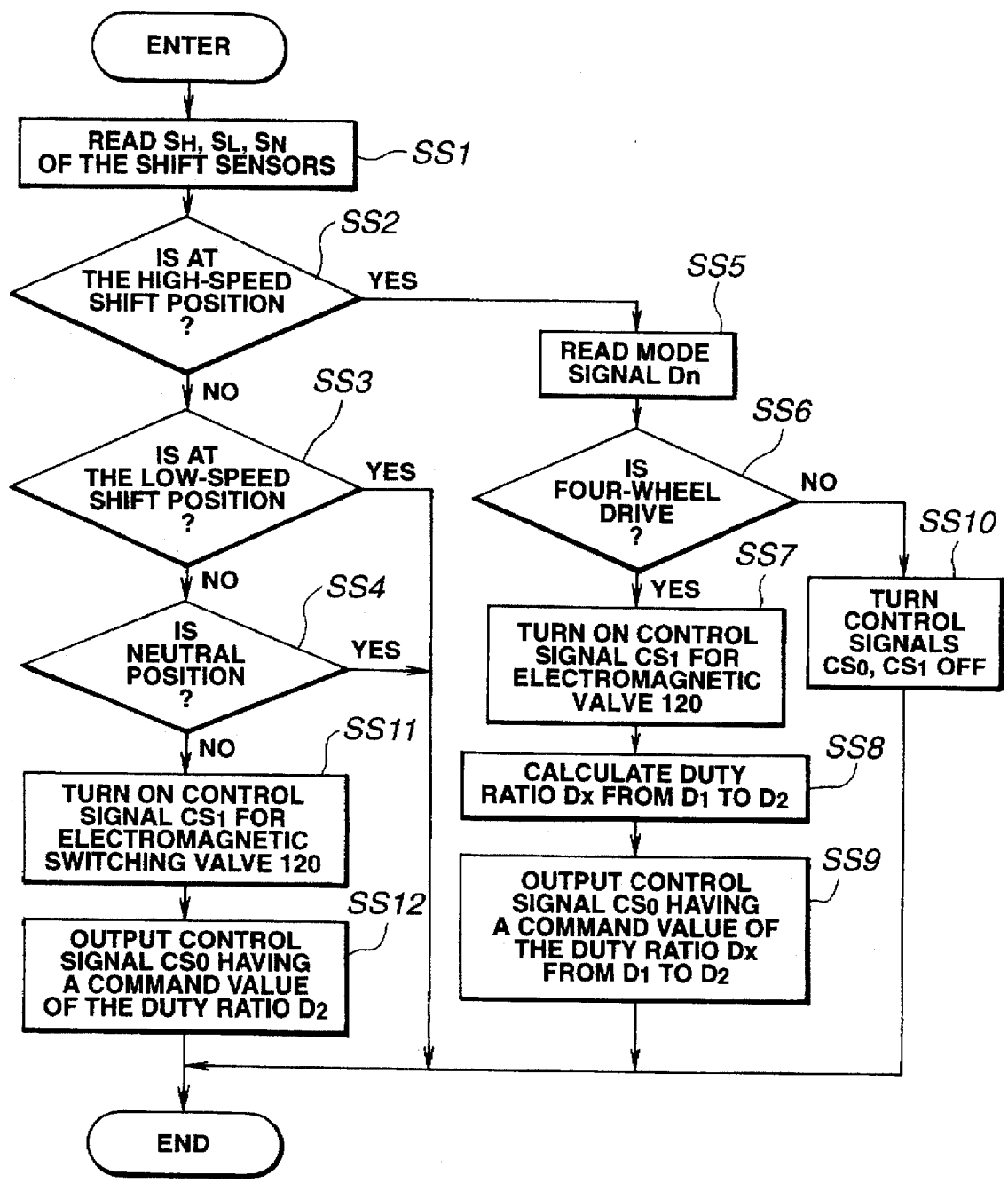
FIG. 22 is an operational flowchart of a hydraulic oil pressure control in the case of the second embodiment.

Next, the detailed description of the hydraulic (oil) pressure control procedure in the second embodiment will be described with reference to FIG. 22.

First, at a step SS1, the CPU 1 reads the detection signals $S_L$, $S_H$, and $S_N$ input from the high-speed gear shift position sensor 86, the low-speed gear range shift position sensor 88, and neutral position sensor 87. Then, the routine goes to a step SS2.

At the step SS2, the CPU 1 determines whether the shift sleeve 64b has moved to the high-speed (gear range shift) position H. If the CPU 1 determines that the shift sleeve 64b has moved to the high-speed position H (Yes) at the step SS2, the routine goes to a step SS5. If the CPU 1 determines that the shift sleeve 64b has not moved to the high-speed gear range shift position H (No) at the step SS2, the routine goes to a step SS3.

At the step SS3, the CPU 1 determines whether the shift sleeve 64 has moved to the low-speed (gear range shift) position L.

If the CPU 1 determines that the shift sleeve 64b has moved to the low-speed (gear range shift) position L, the present routine is ended.

If the CPU 1 determines that the shift sleeve 64b has not moved to the low-speed (gear range shift) position L at the step SS3, the routine goes to a step SS4.

At the step SS4, the CPU 1, in turn, determines whether the shift sleeve 64b has moved to the neutral position N.

If the CPU 1 determines that the shift sleeve 64b has moved to the neutral position N (Yes) at the step SS4, the present routine is ended. If the CPU 1 determines that the shift sleeve 64b has not moved to the neutral position (No) at the step SS4, the present routine goes to a step SS11.

On the other hand, at the step SS5, the CPU 1 reads the mode signal Dn input from the 2–4 WD mode sensor 90 and the routine goes to a step SS6.

At the step SS6, the CPU 1 determines whether the four-wheel drive mode is selected. If the CPU 1 determines that the two-wheel drive mode is selected (No) at the step SS6, the routine goes to a step SS10. If the CPU 1 determines that the four-wheel drive mode is selected (Yes) at the step SS6, the routine goes to a step SS7.

At the step SS10, the CPU 1 commands to turn off the control signal $CS_0$ (in the off state) for the duty ratio control electromagnetic valve 128 and the control signal $CS_1$ for the electromagnetic on-off switching valve 128. Then, the present interrupt routine is ended.

At the step SS7, the CPU 1 turns on the control signal $CS_1$ (in the on state) for the electromagnetic switching valve 120. Then, the routine goes to a step SS8 in which the CPU 1 sequentially refers to the memory tables from FIG. 12 through 14 on the basis of the derived revolution speed difference $\Delta N$, calculates the front road wheel torque distribution ratio $\Delta$ (delta) T corresponding to the revolution speed difference $\Delta N$, calculates the clutch pressure Pc of the frictional clutch 66 on the basis of the calculated front road wheel side torque distribution ratio delta T, and calculates the duty ratio Dx which corresponds to the clutch pressure Pc calculated thereat and which falls in the range from $D_1$ to $D_2$, the calculated duty ratio Dx being stored in the predetermined memory area of the memory 7c. Thereafter, the routine goes to a step SS9 in which the control signal $CS_0$ corresponding to the instruction value corresponding to the duty ratio Dx ranging from $D_1$ to $D_2$ is output to the driver 31a. Then, the present interrupt routine is ended.

On the other hand, at the step SS11, the CPU 1 turns on the control signal $CS_1$ for the electromagnetic on-off switching valve 120. Then, the routine goes to a step SS12 in which the CPU 1 refers to the memory tables shown in FIGS. 12 through 14 to determine the duty ratio $D_2$ for the clutch pressure $P_2$ for the frictional clutch 66 and outputs via the output interface 7d the control signal $CS_0$ corresponding to the instruction value for the duty ratio $D_2$ to the driver 31a. Thereafter, the present routine is ended.

Next, the relationship between the gear range selection of the lever of the sub transmission and the driving force transmission route in the transfer 22 will be described.

However, the detailed description of the relationship is omitted here since the detailed description is already described in the first embodiment.

However, since, in the second embodiment, the fluid coupling type automatic transmission 20 is used as the power transmission 20, the following description will be made.

That is to say, in a case where, with the automatic power transmission in the neutral state and the vehicle stopped, the switching operation is carried out from the 4H range (or 2H range) to the 4L range through the lever, the shift sleeve 64b is meshed with neither the high-speed gear range shifting gear 64c nor low-speed gear range shifting gear 64d. At this time, the input axle 42 is under no load state. In addition, the so-called creepy rotating force (torque) from the automatic power transmission 20 (the engine 10 is in an idling state) is transmitted to the input axle 42 via the output axle 56 so that revolutions of the high-speed gear range shifting gear 64c and the low-speed gear shifting gear 64d are started. In the second embodiment, at this time, the transfer 22 is in the low-speed two-wheel drive state (a state in which the outer tooth $64b_2$ of the shift sleeve 64b is meshed with the low-speed shifting gear 64d). In addition, the outer tooth $64_{b2}$ of the shift sleeve 64b is meshed with the low-speed shifting gear 64d at an earlier timing. Hence, at the revolution initial time of the low-speed shifting gear 64d, namely, during the low-speed revolution time, the outer tooth $64b_2$ is meshed with the low-speed shifting gear 64d. Consequently, the sound generated during the meshing operation on the shift sleeve 64d can be reduced at a time when the lever is operated to switch from the 4L range to the 4H range.

In addition, in the low-speed range two-wheel (2L) drive state, the controller 18 outputs the control signal $CS_0$ corresponding to the instruction value which accords with the duty ratio $D_2$ to the solenoid 128d of the duty ratio control electromagnetic valve 128 so as to control the clutch pressure regulating valve 122. Then, the predetermined clutch pressure $P_2$ is supplied from the hydraulic (oil) pressure supply 16 to the input port 74 (frictional clutch) so that the two-wheel-and-four-wheel drive switching mechanism 60 is changed in such a way that front road wheel-rear road wheel torque distribution ratio gives the ratio value of rear road wheels : front road wheels=50%:50%. Even though the transfer 22 is in the low-speed, two-wheel (2L) drive state, the driving force is not transmitted only to the rear road wheels. No harmful influence on the vehicular run is given.

Hence, during the switching operation from the 4H range (or 2H range) to the 4L range, the input axle 42 under the no-load state receives the creepy rotating force (torque) from the automatic power transmission 20. However, in the second embodiment, the shift sleeve 64b becomes in the low-speed two-wheel drive state while the shift sleeve 64b is moved up to the low-speed gear range shift position L so that the outer tooth $64b_2$ of the shift sleeve 64b is meshed with the low-speed gear shifting gear 64d at the earlier timing. Thus, while the outer tooth $64b_2$ of the shift sleeve 64b is meshed with the low-speed (shifting) gear 64d during the low-speed revolution of the gear 64d. Consequently, the gear meshing sound generated during the meshing therebetween can be reduced. Thus, the smooth meshing of the outer tooth $64b_2$ can be achieved.

At the same time, since the controller 18 controls the clutch pressure $P_2$ to be supplied to the frictional clutch 66 so that the front road wheel to rear road wheel torque distribution ratio is modified to the four-wheel drive state such as rear road wheel: front road wheel=50%:50%, the driving force is not transmitted only to rear road wheels 12RL and 12RR even in the low-speed two-wheel drive state. No harmful influence on the vehicular run is given.

(Third Embodiment)

FIGS. 23 through 28 show the four-wheel drive vehicle to which a third preferred embodiment of the vehicular driving force transfer apparatus according to the present invention is applicable.

In the third embodiment, the fluid coupling automatic power transmission is used as the power transmission 20.

In addition, the output axle 56 of the automatic power transmission 20 is linked to the input axle 42 of the transfer 22, the first output axle 44 is linked to the rear road wheel side output axle 30, and the second output axle 54 is linked to the front road wheel side (conected) output axle 24. The sub transmission mechanism 58 is interposed between the input axle 42 and the first output axle 44 and the two-wheel-and-four-wheel drive switching mechanism 60 is disposed between the first output axle 44 and second output axle 54. The sub transmission mechanism 58 has been described in the first embodiment. The hydraulic (oil) pressure supply 16 has already been described in the first embodiment.

Figure 24:
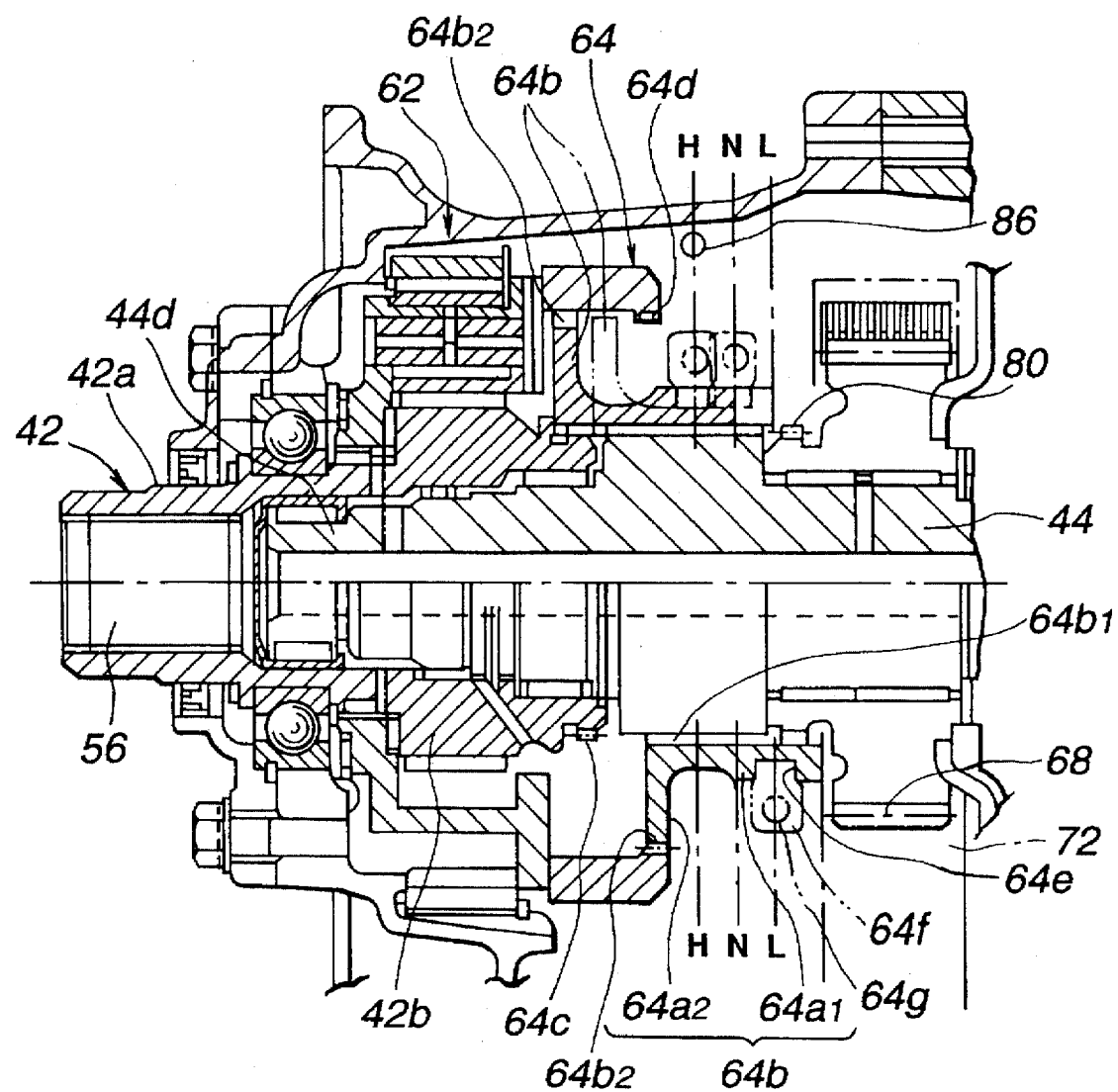
FIG. 24 is an explanatory view for explaining a slide motion of the shift sleeve in the case of the third embodiment.

The structure of the shift sleeve 64b in the case of the third embodiment will be described below with reference to FIG. 24.

The shift sleeve 64b is engaged with the fork 64g integrally formed on a fork rod 64f. The fork rod 64f is disposed in a peripheral groove 64e formed on an outer periphery located on a right-handed side of a cylindrical portion $64a_1$ so as to be slidable in both of the right and left-handed directions. The fork rod 64f is linked to the lever of the sub transmission mechanism 58 via a link mechanism (not shown in FIG. 24). The lever is mounted on a near position to the vehicular driver's seat. The lever is straight selectable from among the 2H range, 4H range, the 4H range, the neutral range (N range), and four-wheel drive low-speed gear range position (4L range) as described in the first embodiment. When the 2H range or 4H range is selected through the lever, the spline hole $64b_1$ is meshed with the high-speed shifting gear $64c$ so that shift sleeve $64b$ is slided to the high-speed gear range shift position H at which the driving force transmitted from the input axle 42 is directly transmitted to the first output axle 44. From this state, when the N range is selected through the lever, the spline hole $64b_1$ is spaced apart from both of the high-speed shifting gear $64c$ and the four-wheel driving gear 80. Then, the shift sleeve $64b$ is moved (slided) to the neutral position N at which the linked state between the input axle 42 and the first output axle 44 is released. Then, furthermore, when the sub transmission lever is operated to select the 4L range, the meshed state in which the spline hole $64b_1$ is meshed with the high-speed shifting gear $64c$ is released. In place of the release of the meshed state, the outer tooth $64b_2$ is meshed with the low-speed shifting gear $64d$ and the spline hole $64b_1$ is moved to the low-speed shifting position L at which the spline hole $64b_1$ is meshed with the four-wheel driving gear 80 formed on the first sprocket 68.

The hydraulic oil pressure supply 16 has already described in the first embodiment shown in FIG. 9A.

Figure 25:
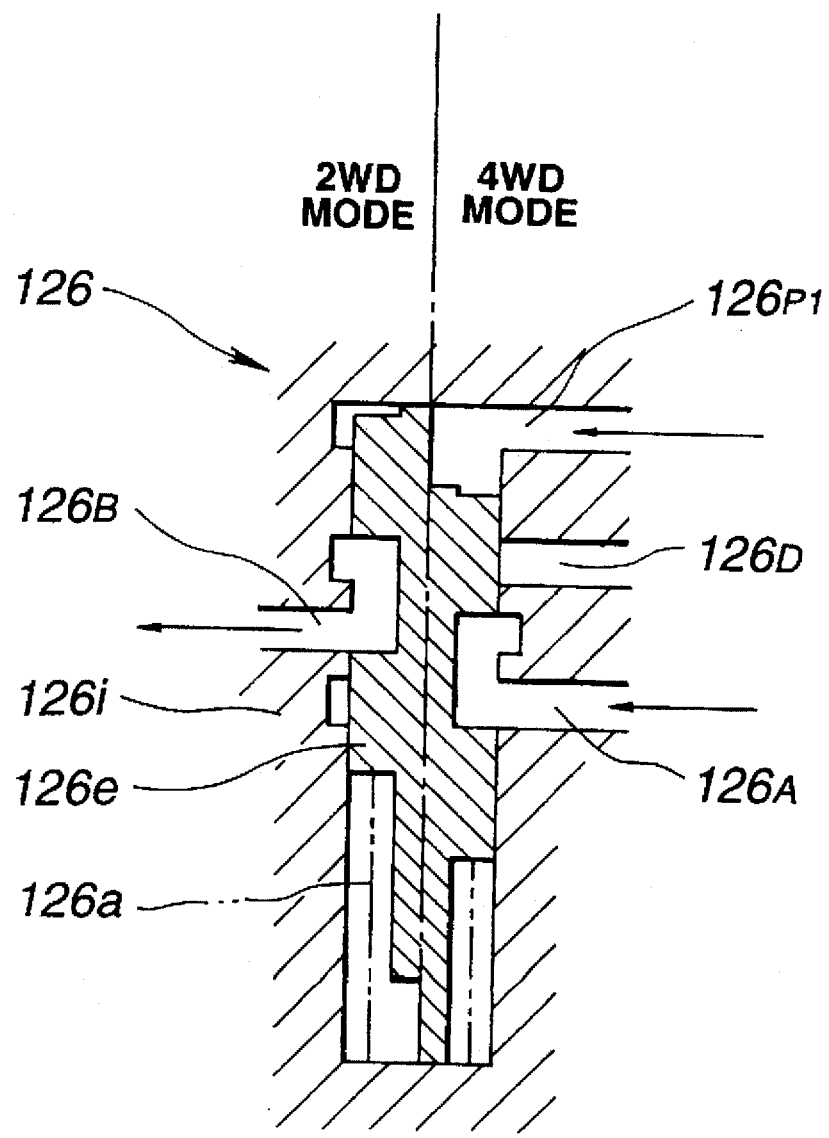
FIG. 25 is an explanatory view for explaining the switching valve (126) in the case of the third embodiment.

Therefore, the operation of the spool $126e$ in the pilot switching valve 126 will be omitted here although FIG. 25 shows the 2 WD mode and the 4 WD mode in the pilot switching valve 126.

In the third embodiment, the sensors connected to the controller 18 is slightly different from those described in the first embodiment, as shown in FIG. 23.

The controller 18 is a control unit: which receives the detection signals from the high speed (gear range shifting) sensor 86, 2-to-4 WD mode sensor 90 which is turned on when the 2H range is selected through the lever, an inhibitor switch 91 which turns on when the parking range (P) or neutral range (N) is selected through a selection lever of the automatic power transmission 20, the vehicle speed sensor 94, a front road wheel revolution speed sensor 96 which detects the revolution speed of the front wheel side output axle 24, and rear road wheel revolution speed sensor 98 which detects the revolution speed of the input axle 42 linked to the output axle 56 of the automatic power transmission 20 as the revolution speed of the rear road wheels; and which outputs the exciting currents $i_0$ and $i_1$ to the hydraulic (oil) pressure supply 16 on the basis of the detection signals. In the third embodiment, the same controller 18 carries out the maintenance of the predetermined line pressure in the hydraulic (oil) pressure supply 16. Therefore, the required oil temperature sensor 130, the oil pressure switches 132 and 134 are connected to the controller 18.

Figure 26:
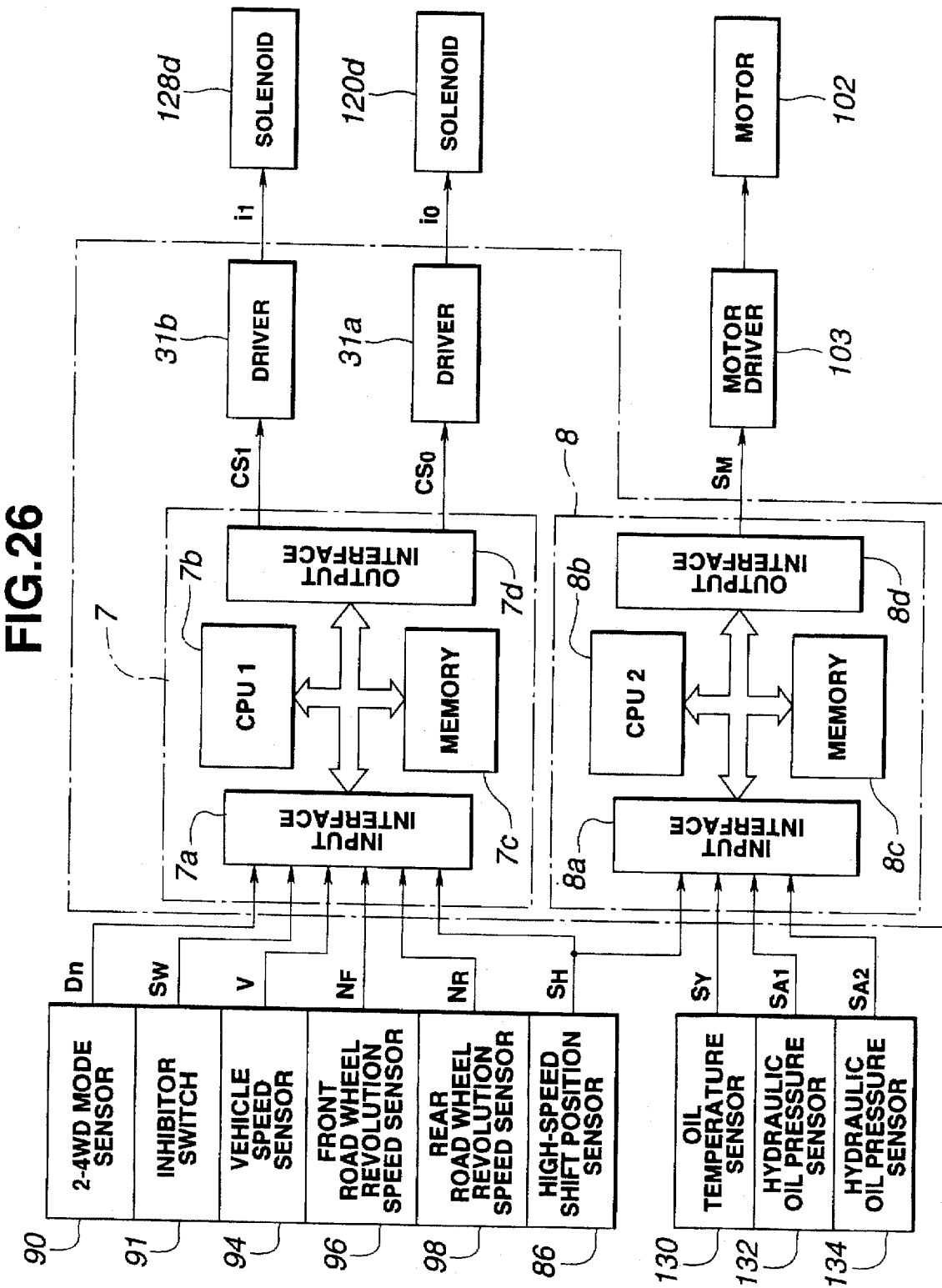
FIG. 26 is a circuit block diagram of the controller in the case of the third embodiment.

FIG. 26 shows the circuit block diagram of the controller 18 and its peripheral circuits in the case of the third embodiment. The same reference numerals shown in FIG. 26 designate corresponding elements shown in FIG. 23 and FIGS. 11 and 22 described in the first and second embodiments.

Figure 28:
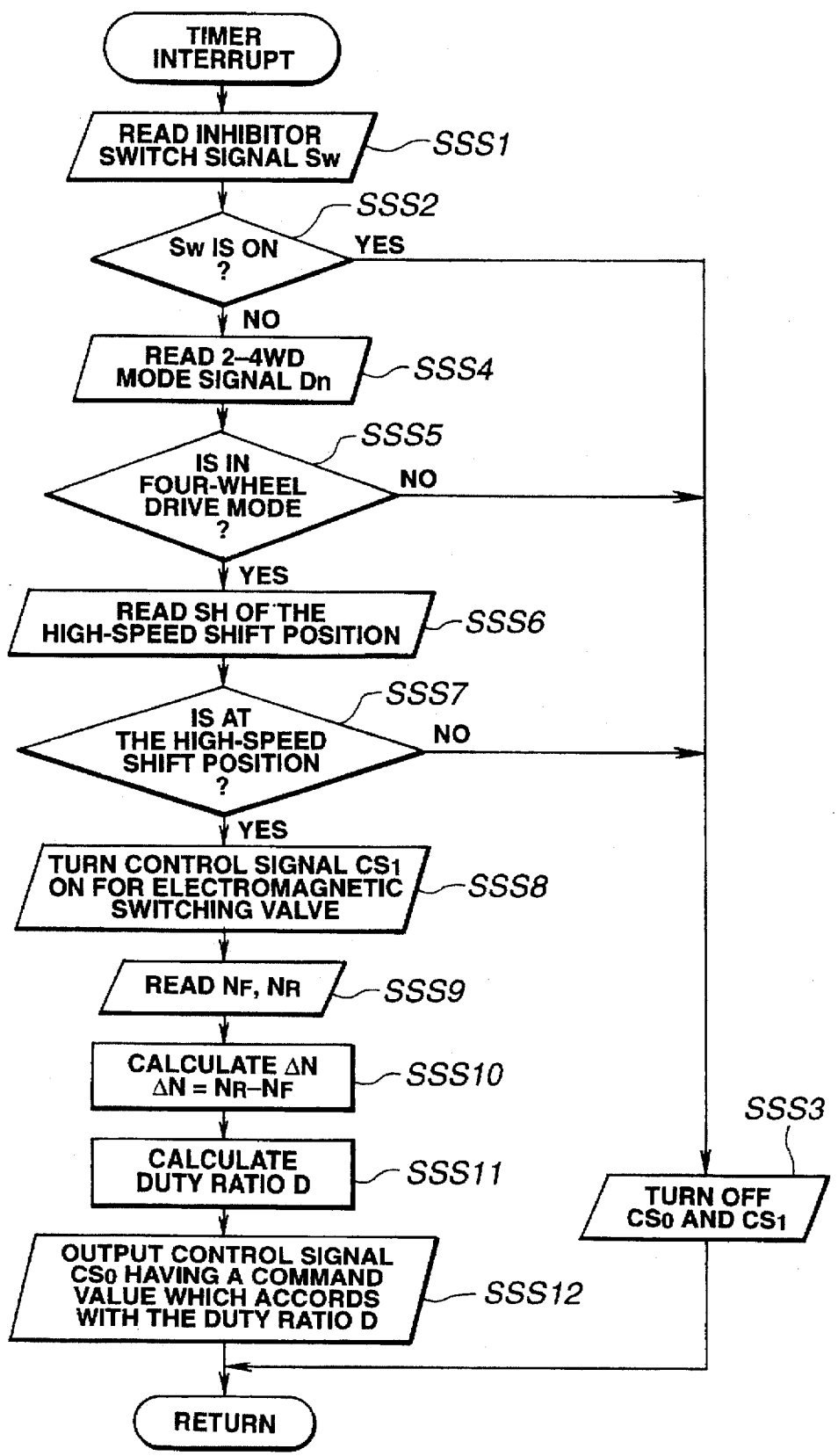
FIG. 28 is an operational flowchart for explaining a hydraulic oil pressure control procedure executed in a microcomputer of the controller shown in FIG. 26.

The microcomputer 7 executes the program flowchart shown in FIG. 28.

That is to say, the microcomputer 7 sets the front road wheel side torque distribution ratio instruction value $T_2$ when the high-speed gear range shifting position detection signal $S_H$ is turned on on the basis of the mode signal Dn from the two-to-four wheel drive mode sensor 90, the vehicle speed signal V of the vehicle speed sensor 94, the revolution speed signal $N_F$ from the front road wheel revolution speed sensor 96, and the revolution speed signal $N_R$ from the rear road wheel revolution speed sensor 96, calculates the pulse duty ratio D instructing the clutch pressure Pc corresponding to the front road wheel side torque distribution instruction value $T_2$, and outputs the control signal $CS_0$ of the instruction value corresponding to the duty ratio D when the switch signal $S_W$ from the inhibitor switch 91 is in the off state. When the control signal $CS_1$ is output, the microcomputer 7 controls the control signal $CS_1$ to be turned on. When the switch signal $S_W$ of the inhibitor switch 91 is turned on, the detection signal of the two-to-four wheel drive switch 91 is turned on so that the vehicle is in the two wheel drive state, the detection signal $S_H$ of the high-speed shifting position sensor 86 is turned off, the microcomputer 7 turns off both of the control signals $CS_0$ and $CS_1$ and outputs the turned off control signals to the drivers $31a$ and $31b$.

It is noted that when the microcomputer 7 issues a warning signal when the detection signal $S_H$ of the high-speed shifting position signal 86 is in the on state, the oil (hydraulic) pressure switch 134 detects that the clutch pressure Pc output from the pilot switching valve 126 is zero.

Figure 27:
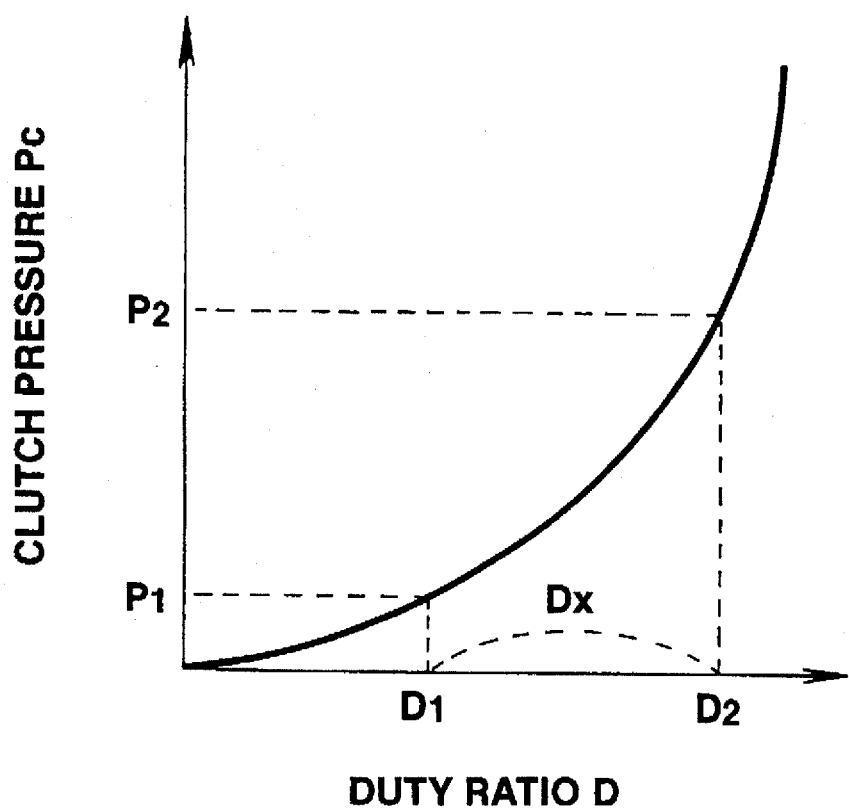
FIG. 27 is a control characteristic graph representing a relationship between a clutch pressure (Pc) and a pulse duty ratio (D) in the case of the third embodiment.

FIG. 27 shows one of the memory tables stored in the memory $7c$ representing the value of the clutch pressure Pc of the clutch pressure regulating valve 122 which increases nonlinearly and in the form of parabola with respect to the increase in the duty ratio D of the exciting current $i_0$ supplied to the solenoid $128d$ of the duty ratio controlling electromagnetic valve 128.

The hydraulic (oil) pressure control by means of the microcomputer 7 is executed in accordance with the reference calculation (arithmetic) processing shown in FIG. 28.

The interrupt routine shown in FIG. 28 is executed for each predetermined period of time $\Delta T$(, for example, 20 milliseconds) in the same way as that shown in FIG. 16 in the first embodiment.

The CPU 1 reads the inhibitor switch signal Sw from the inhibitor switch 91 at a step SSS1.

The CPU 1 determines whether the switch signal Sw of the inhibitor switch 91 is in the on state at a step SSS2. When the CPU 1 determines that the inhibitor switch signal Sw is in the on state indicating that the selection lever of the automatic power transmission 20 is placed at the parking range P or neutral range N, the output axle of the automatic power transmission 20 is not revolved at the step SSS2. At this time, since the CPU 1 determines that the transfer selection lever $64i$ may be operated manually by the driver (vehicular occupant), the routine goes to a step SSS3. At the step SSS3, the CPU 1 determines that the control signal $CS_1$ for the electromagnetic (on-off) switching valve 120 and the control signal $CS_0$ for the duty ratio control electromagnetic valve 128 are turned off and the present routine is ended to return a main program (not shown). If the inhibitor switch signal Sw is in the off state, the routine goes to a step SSS4 since the CPU 1 determines that the transfer speed-gear range selection lever $64i$ may not be operated.

At the step SSS4, the CPU 1 reads the mode signal Dn input from the two-to-four wheel mode sensor 90, determines whether the four-wheel drive mode is selected according to the two-to-four wheel mode sensor 90. If the transfer speed gear range selection lever $64i$ is placed at the two wheel drive mode (No) at the next step SSS5, the routine goes to the step SSS3 in which, in this case, only the control signal $CS_1$ for the electromagnetic switching valve 120 is in the off state.

If the CPU 1 determines that the four-wheel drive mode is selected at the step SSS5 (Yes) at the step SSS5, the routine goes to a step SSS6. At the step SSS6, the CPU 1 reads the detection signal read from the high-speed shift position sensor 86.

Next, at the next step SSS7, the CPU 1 determines whether the shift sleeve 64b is moved to the high-speed gear range position H. When determining that the shift sleeve 64b is not moved to the high-speed gear range shift position H (No) at the step SSS7, the routine goes to the step SSS3 in which, in this case, the control signal $CS_1$ for the electromagnetic on-off switching valve 120 is turned off and the present interrupt routine is ended.

Upon the determination that the shift sleeve 64b is moved to the high-speed gear range shifting position H (Yes at the step SSS7), the routine goes to a step SSS8.

At the step SSS8, the control signal $CS_1$ for the electromagnetic on-off switching valve 120 is turned on. Next, the routine goes to a step SSS9, the CPU 1 reads the revolution speed detected values $N_F$ and $N_R$ from the front road wheel revolution speed sensor 86 and from the rear road wheel revolution speed sensor 88. Then, the routine goes to a step SSS10.

At the next step SSS10, the CPU 1 calculates the revolution speed difference $\Delta N$ ($=N_R-N_F$) which is the subtraction result of the front road wheel revolution speed $N_R$ from the rear road wheel revolution speed $N_F$. Then, the routine goes to a step SSS11.

At the step SSS11, the CPU 1 sequentially refers to the memory tables of FIGS. 12, 13, and 14 described in the first embodiment (FIG. 27 is generally the same as FIG. 14) to calculate the front road wheel side torque distribution ratio $\Delta T$ corresponding to the difference in the revolution speed $\Delta N$, calculates the clutch pressure Pc of the frictional clutch 66 on the basis of the front road wheel side torque distribution $\Delta T$, and calculates the duty ratio Dx which falls in the range from $D_1$ to $D_2$ corresponding to the clutch pressure Pc. Then, the routine goes to a step SSS12 in which the microcomputer 7 outputs the control signal $CS_O$ of the instruction value which accords with the determined duty ratio Dx to the driver 31a.

Next, the operation in the case of the third embodiment will be described below.

Suppose now that the vehicle is stopped, the selection lever of the automatic power transmission 20 is placed at the parking range position, the lever of the sub transmission mechanism 58 is placed at the 2H range, and the engine 10 is stopped. In this state, an engine ignition switch is turned on to start the engine 10. A power supply to the controller 18 is turned on and the microcomputers 7 and 8 start predetermined arithmetic processing.

At this time, the vehicle is stopped and the selection lever of the automatic power transmission 20 is placed at the parking range position P. Then, the driving force of the engine 10 is not transmitted to the output axle of the automatic power transmission 20. The input axle 42 of the transfer 22 linked to the output axle 56 and first output axle 44 are stopped. Then, the main pump 100 of the hydraulic (oil) pressure supply 16 is stopped. The line pressure in the hydraulic (oil) is supply 16 is approximately zeroed. Thus, the hydraulic oil pressure switch 132 is turned on so that the switch signal $S_1$ of the switch 132 is supplied to the microcomputer 8. The microcomputer 8 then determines the revolution speed of the motor 102 on the basis of the oil temperature detection value $S_Y$ of the oil temperature sensor 130, the motor drive control signal $S_M$ being output to the motor driver 103. Thus, the motor driver 103 is driven to revolve at the set revolution speed. The sub pump 104 is driven to drain the working oil under the predetermined pressure, this being supplied to the converging pipe 110a via the check valve 110a. Thus, the line pressure $P_L$ is boosted. When the line pressure $P_L$ reaches to the set pressure, the hydraulic oil switch 132 is turned off so that the revolution speed of the motor 102 is stopped.

On the other hand, the microcomputer 7 executes the interrupt processing shown in FIG. 27. Since the shift lever is in the parking range position (P), the inhibitor switch 91 is turned on. Therefore, the routine shown in FIG. 27 is transferred to the step SSS3 from the step SSS2 so that the control signal $CS_1$ of the solenoid 120d of the electromagnetic valve 120 and the control signal $CS_O$ for the duty ratio control electromagnetic valve 128 are turned off. Therefore, the electromagnetic one-off switching valve 120 maintains its normal position (refer to FIG. 9B) such that the input port $120_A$ is blocked and its input port $120_A$ is communicated with the drain port $120_D$. The pilot control pressure for the pilot switching valve 126 gives approximately the atmospheric pressure. Hence, since the pilot switching valve 126 also maintains its normal position (refer to FIG. 9B) such that its input port $126_A$ is blocked and its output port $126_B$ is communicated with its drain port $126_D$. The clutch pressure Pc supplied to the frictional clutch 66 gives the atmospheric pressure. In addition, the duty ratio control electromagnetic valve 128 also maintains its normal position (refer to FIG. 9B) so that the pilot control pressure output therefrom is also in the atmospheric pressure. Thus, the clutch pressure Pc output from the clutch pressure regulating valve 122 gives also zero. Hence, the frictional clutch 66 is maintained at the non-engagement (noclutching) state so that the driving force transmission route between the first output axle 44 and the first sprocket 68 is interrupted. Thus, the vehicle maintains the two-wheel drive state only for the rear road wheels.

In this way, with the selection lever of the transmission 20 in the parking range position and with the vehicle stopped, the first output axle is separated from the first sprocket 68. Therefore, both first output axle and first sprocket 68 are enabled to be relatively revolved. At this time, if the transfer lever 64i is shifted from the high-speed shifting position (High) to the low-speed shifting position (Low), the shift sleeve 64b is moved toward the right-handed direction as viewed from FIG. 24 via the link mechanism 64h, the control rod 64g, and the fork 64f. First, the right-handed end of the spline hole $64b_1$ is meshed with the four-wheel driving gear 80 formed on the first sprocket 68. Next, the outer tooth $64b_2$ formed on the flange $64a_2$ is meshed with the low-speed shifting gear 64d formed on the pinion carrier 62d of the sub transmission mechanism 80 so as to be shifted at the low-speed gear range position L. At this time, since the first output axle 44 to which the shift sleeve 64b is spline coupled is relatively revolvable to the first sprocket 68 on which the four-wheel driving gear 80 is formed, the meshing of the dog clutch constituted by the spline hole $64b_1$ and the four-wheel driving gear 80 can be facilitated. In addition, since the driving force is not transmitted to the output axle of the automatic power transmission 20, the pinion carrier 62d is freely revolvable via the input axle 42, sun gear 62a, and pinion 62c. Hence, the outer tooth 64b 1 can smoothly be meshed with the low-speed shifting gear 64d. (Refer to FIG. 24).

Thereafter, in a case where the vehicle runs on a good road (paved road, not rough), the vehicle can be started with the sub transmission lever maintained at 2H range, the main transmission lever selected in the D range, the brake system released, and the accelerator pedal depressed. When the processing of FIG. 27 is executed, the CPU 1 transfers from the step SSS2 to the step SSS3 of FIG. 27. Since the 2-to-4 WD mode sensor 90 indicates its on state (i.e., in the two-wheel drive mode), the CPU 1 goes to the step SSS5 to the step SSS3 so that the control signal $CS_1$ for the electromagnetic on-off switching valve 120 is in the on state. Thus, the clutch pressure Pc for the frictional clutch 66 is maintained at the atmospheric pressure and the frictional clutch 66 is continued at the interrupted (disengaged) state. On the other hand, since the sub transmission lever is placed at the 2H range, in the high-speed and low-speed gear range position switching mechanism of the sub transmission mechanism 62, the spline hole $64b_1$ of the shift sleeve 64b is meshed with the high-speed shifting gear 64c formed on the input axle 42 so that the shift sleeve 64b is rested at the high-speed shift position H. When the driving force from the automatic power transmission 20 is transmitted to the input axle 42 of the transfer 22, the driving force is transmitted directly via the shift sleeve 64b to the first output axle 44. Consequently, the driving force is transmitted to the rear right and left road wheels 12RL and 12RR via the propeller shaft 30, the rear differential gear 32, and drive shaft 34. These rear left and right road wheels 12RL and 12RR are rotated so that the vehicle can be forwarded.

In this way, when the vehicle is started, the first output axle 44 is driven so that the mechanically linked main pump 100 is driven to rotate. Thus, the working oil from the main pump 100 is drained so that the working oil is supplied to the converging pipe 110a via the check valve 106d as the line pressure $P_L$. When the drain pressure through the main pump 100 causes the line pressure $P_L$ to be maintained at the set pressure, the hydraulic (oil) pressure switch 132 is in the off state. Thus, the drive of the motor 102 using the microcomputer 8 is halted.

On the other hand, when the vehicle in which the vehicular driving force transfer apparatus in the third embodiment is mounted runs on low frictional road such as a snowy road or frozen road, the driver generally changes the sub transmission mechanism lever from the 2H range to the 4H range. The shift change from the 2H range to the 4H range of the sub transmission lever by the driver can be carried out even if the vehicle runs at the low speed, for example, 40 Km/h or less. It is of course that that shift change is carried out with the vehicle stopped.

Then, if the lever of the sub transmission mechanism is switched to the 4H range, the mode signal Dn of the two-wheel-and-four-wheel drive mode sensor 90 indicates the four-wheel drive mode signal. Thus, the interrupt routine shown in FIG. 27 goes from the step SSS5 to the step SSS6 so that the microcomputer 7 receives the on state of the detection signal $S_H$ of the high-speed gear range shift position sensor 86. At this time, the routine shown in FIG. 27 goes from the step SSS7 to the step SSS8. Thus, the electromagnetic on-off switching valve 120 is switched from the normal position 120b to the normal position 120c so that the line pressure $P_1$ is directly supplied to the pilot switching valve 126 as the pilot control pressure. Thus, the pilot switching valve 126 is switched from the normal position 126b to the operation position 126c (refer to FIG. 9B), thus the clutch pressure Pc output from the clutch pressure regulating valve 122 being enabled to be supplied to the frictional clutch 66.

Next, at the step SSS9, the microcomputer 7 reads the detection values $N_F$ and $N_R$ of the front road wheel revolution speed sensor 96 and of ther rear road wheel revolution speed sensor 98. Then, the present routine goes to the step SSS10 in order to calculate the front and rear road wheel revolution difference ΔN. Then, at the next step SSS11, the duty ratio Dx of the control signal $CS_0$ for the duty ratio control electromagnetic valve 128 is determined and output to the driver 31a. Thus, the driver 31a supplies the exciting current $i_0$ having the determined duty ratio Dx to the duty ratio control electromagnetic valve 128. The duty ratio control electromagnetic valve 128, then, outputs the pilot control pressure which accords with the duty ratio Dx to the pilot control pressure to the clutch pressure regulating valve 122. The clutch pressure regulating valve 122 outputs the clutch pressure Pc which accords with this pilot control pressure so that the clutch pressure Pc is supplied to the frictional clutch 66 via the pilot switching valve 126. Consequently, the clutching force of the frictional clutch 66 is controlled.

Hence, as described above, since the duty ratio Dx becomes approximately zero when the front and rear road wheel revolution speed difference ΔN is relatively small, the time interval during which the exciting current $i_0$ output from the driver 31a is in the on state becomes shorter than the remaining time interval during which the exciting current $i_0$ is in the off state. Thus, the pilot control pressure output from the duty ratio control electromagnetic valve 128 gives approximately zero and accordingly the clutch pressure Pc output from the clutch pressure regulating valve 122 gives approximately zero. Consequently, the clutching force on the frictional clutch is controlled to give small value. The driving force transmitted from the first output axle 44 to the first sprocket 68 via the frictional clutch 66 becomes approximately zero so that the driving force is not transmitted to the front road wheel side and the vehicle is in the rear-road wheel drive, two-wheel drive state.

However, from this state, as the front and rear road wheel revolution speed difference ΔN becomes large, the duty ratio Dx becomes accordingly large. Thus, the clutch pressure Pc output from the clutch pressure regulating valve 122 is increased so that the clutching force of the frictional clutch 66 is increased. In this state, the driving force is transmitted through the frictional clutch 66, the first sprocket 68, the chain 72, the second sprocket 70, the second output axle 54, the front road wheel side output axle 24, front differential gear 26, and drive shaft 28 to the front left and right road wheels 12FL and 12FR so that the vehicle is in the four-wheel drive state. Consequently, the front and rear road wheel driving force (torque) distribution (split) ratio is modified according to the front and rear road wheel revolution speed difference ΔN from 0 (front):100 to 50 (front) :50. Then, the preferable vehicular running condition can be assured.

On the other hand, if a road wheel stack (the definition of stack will be described later) occurs during the vehicular run with the lever of the sub transmission mechanism selected at the 4H range or the vehicle runs on a sandy road on which the road wheel stacking is easy to occur, it is necessary for the vehicle driver to switch the position of the lever of the sub transmission mechanism to the 4L range. In this situation, with the vehicle stopped, the selection lever is shifted to N or P range. At this time, the inhibitor switch 91 is in the on state.

When the interrupt routine shown in FIG. 27 is executed, the routine goes from the step SSS2 to the step SSS3 so that the control signal $CS_1$ for the electromagnetic switching valve 120 and the control signal $CS_0$ for the duty ratio control electromagnetic valve 128 are turned off. Therefore, the flow of the exciting current $i_1$ from the driver 31b is halted so that the electromagnetic switching valve 120 is returned from the operation position 120c to the normal position 120b by means of the biasing force of the return spring 126a and the pilot control pressure output from the duty ratio control electromagnetic valve 128 is reduced to the atmospheric pressure. Thus, the clutch pressure Pc output from the clutch pressure regulating valve 122 is reduced to zero. Hence, the clutch pressure Pc supplied to the frictional clutch 66 is immediately reduced to the atmospheric pressure. Accordingly, the frictional clutch 66 is returned to the non-clutched state (disengaged state). The first output axle 44 and first sprocket 68 are relatively revolvable so that, as described above, the spline hole $64b_1$ of the shift sleeve 64b can smoothly be meshed with the high-speed gear range shifting gear 80 of the first sprocket 68 and the smooth slide of the shift sleeve 64b from the high-speed gear range position H to the low-speed gear range position L can be achieved.

As described above, with the lever of the sub transmission mechanism selected at the 4L range, the driving force of the output axle of the automatic power transmission 20 is reduced by means of the sub transmission mechanism 62 via the input axle 42 of the transfer 22. The speed-reduced driving force is transmitted to the shift sleeve 64b via the low-speed shifting gear 64d formed on the pinion carrier 62d and the outer tooth $64b_2$ of the shift sleeve 64b. The speed-reduced driving force is, thereafter, transmitted from the shift sleeve 64b to the spline coupled first output axle 44 and to the second output axle 54 via the four-wheel driving gear 80 meshed with the spline hole $64b_1$ of the shift sleeve 64b, via the first sprocket 68, chain 72, and second sprocket 70. The driving force transmitted to the input axle 42 is forcefully distributed to both of the first output axle 44 and second output axle 54. Consequently, the vehicle is in the four-wheel drive state.

It is noted that, at this time, the shift sleeve 64b is slided to the low-speed gear range position L and the detection signal $S_H$ of the high-speed shifting position sensor 88 is in the off state. Hence, when the microcomputer 7 executes the interrupt routine shown in FIG. 27, the interrupt routine goes from the step SSS7 to the step SSS3. The control signal $CS_1$ for the electromagnetic (on-off) switching valve 120 and the control signal $CS_0$ for the duty ratio control electromagnetic valve 128 are continued to be in the off states and the supply of the clutch pressure Pc for the frictional clutch 66 is maintained at the stopped state.

It is also noted that the operation of the third embodiment is described when the vehicular driving force transfer apparatus in the third embodiment is applied to the vehicle in which the automatic power transmission 20 is mounted. The present invention is applicable to the vehicle in which the power transmission of the manual type is used. In the latter case, the revolution stop of the output axle revolution of the manual power transmission may be detected by such a way that the vehicle speed is zero (vehicle is stopped) and the shift lever of the manual transmission is positioned at the neutral position or a clutch pedal is released (disengaged state). At this time, the steps of SSS1 and SSS2 may be changed in such a way that the microcomputer reads the vehicle speed signal V, reads the shift position signal indicating that the manual transmission is in the neutral state, and reads the signal that the clutch pedal is released and determines whether the vehicle speed V is zero, the shift lever position is neutral, and/or the clutch pedal is released.

In addition, although the revolution halt of the output axle of the automatic power transmission is indirectly detected, the revolution halt of the output axle thereof may directly detected from the revolution speed detected value $N_R$ of the rear road wheel revolution speed sensor 96.

In the third embodiment, when the revolution halt of the output axle of the automatic transmission 20 is detected by the on state of the signal Sw of the inhibitor switch, the control signal $CS_1$ for the electromagnetic switching valve 120 is set in the off state so that the pilot switching valve 120 is switched to the normal position and the clutch pressure Pc supplied to the frictional clutch 66 is zeroed. However, alternatively, the clutch pressure Pc output from the clutch pressure regulating valve 122 may be zeroed or may be set to a value near to zero such that the driving force is not transmitted through the frictional clutch 66.

Furthermore, in the third embodiment, the high-and-low speed switching mechanism 64 in the sub transmission mechanism 62 is mechanically operated through the lever of the sub transmission mechanism. A mode selection switch may be disposed in the vicinity to the driver's seat which has switching contacts corresponding to the 2H range, the 4H range, and the 4L range of the lever of the sub transmission mechanism 62 and a motor to slide the shift sleeve 64b may be installed so that the electric motor may be driven corresponding to the mode selected through the mode selection switch.

In the third embodiment, the pilot control pressure of the clutch pressure regulating valve 122 is formed by applying the duty ratio control electromagnetic valve 128 to the hydraulic pressure supply 16. In place of the duty ratio control electromagnetic valve 128, an electromagnetic proportional pressure control valve may be applied whose output pressure is adjustable according to the value of the exciting current supplied to the duty ratio control electromagnetic valve 128. In this case, the driver 31a may be constituted by a floating type constant voltage supply circuit which outputs the exciting current $i_0$ whose current value is in accordance with a voltage value of the input control signal $CS_0$.

In the third embodiment, the present invention is exemplified as the driving force transfer apparatus applicable to the four-wheel drive vehicle based on the rear wheel drive vehicle (FR type). The present invention is applicable to the four-wheel vehicle based on a front-engine, front-wheel drive vehicle (FF type).

It is noted that a combination of features in the first, second, and third embodiments can be achieved as the driving force transfer apparatus according to the present invention.

(Fourth Embodiment)

FIGS. 29 through 35 show a fourth preferred embodiment of the vehicular driving force transfer apparatus.

In the fourth embodiment, the automatic transmission of the fluid coupling type 20 is connected to the engine 10.

Since such structures of the vehicular driving force transfer apparatus as in transfer 22, the hydraulic (oil) pressure control apparatus 16, and electrical circuit are generally the same as those described in the previous first through third embodiments, different structure points from those in the first through third embodiments will be described below.

Figure 29:
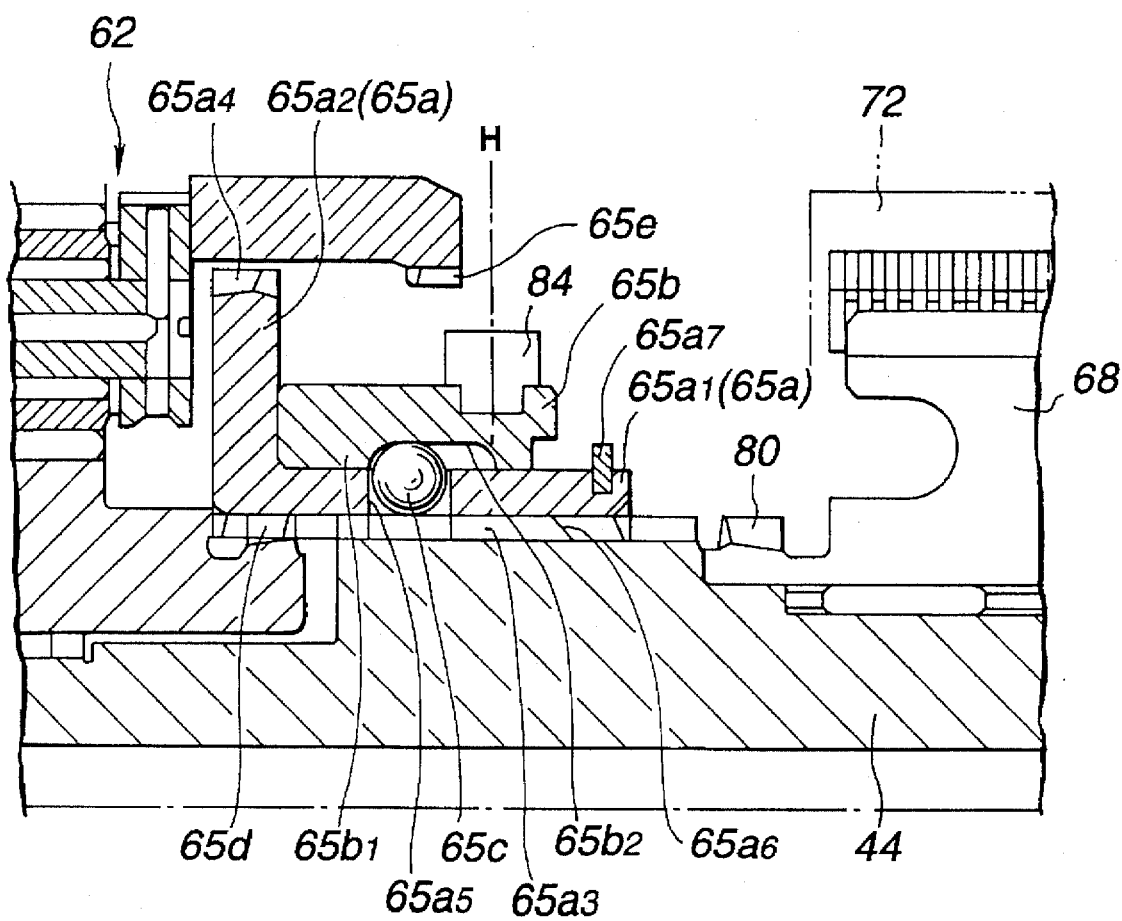
FIG. 29 is an explanatory view for explaining a high-speed and low-speed gear range position switching mechanism switched into a high-speed gear range position in a sub transmission mechanism of the vehicular driving force transfer apparatus in a fourth preferred embodiment according to the present invention.
Figure 30:
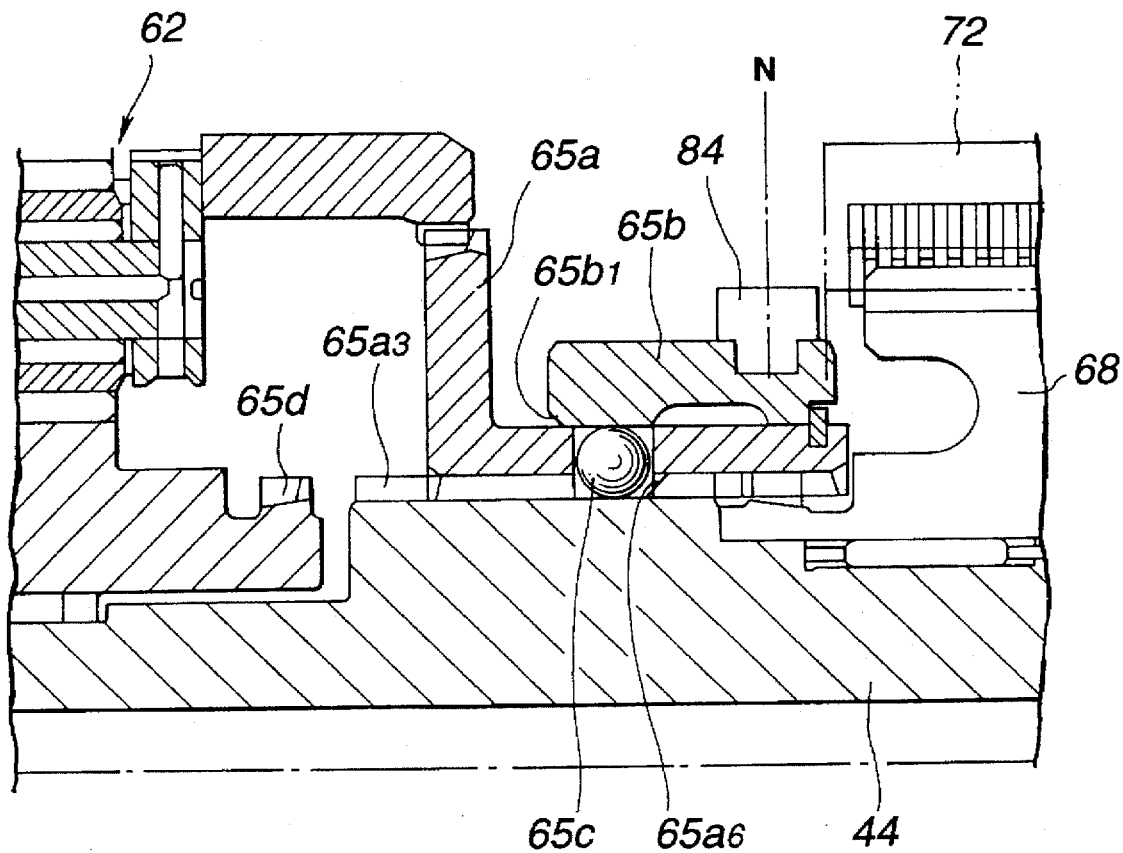
FIG. 30 is an explanatory view for explaining the high-speed and low-speed gear range position switching mechanism switched into a low-speed gear range position in the sub transmission mechanism in the fourth embodiment.

FIG. 29 mainly shows the structure of the high-speed gear range position and low-speed gear range position switching mechanism 65 in the fourth embodiment.

The high-speed and low-speed gear range position switching mechanism 65 includes: a coupling sleeve 65a which is slidable in the axial direction of the first output axle 44; a shift sleeve 65b outwardly fitted onto a diameter shortened portion $65a_1$ of the coupling sleeve $65a$; a sleeve limiting spherical ball $65c$ housed in a part of the diameter shortened portion $65a_1$ for limiting or releasing the coupling sleeve $65a$; the high-speed gear range shifting sleeve $65d$ formed on the outer peripheral position of the input axle 42; the low-speed gear shifting gear $65e$ formed on the inner peripheral portion of the pinion carrier $62d$ for meshing with the coupling sleeve $65a$; and the four-wheel driving gear 80 disposed within the first sprocket 68 and constituting the two-wheel-and-four-wheel drive switching mechanism 60.

As shown in FIG. 29, the coupling sleeve $65a$ includes: a cylindrical diameter shortened portion $65a_1$; and a diameter expanded portion $65a_2$ integrally formed on the diameter shortened portion $65a_1$ at one end of the planetary gear mechanism 62. The inner tooth $65a_3$ is formed on its inner periphery of the diameter shortened portion $65a_1$. The outer periphery of the diameter expanded portion $65a_2$ is formed with the outer tooth $65a_4$. In addition, a plurality of guided holes $65a_5$ are penetrated in the circumferential direction of the diameter shortened portion $65a_1$ with each predetermined interval of distance. The sleeve limiting ball $65c$ is housed in the guide hole $65a_5$. The inner tooth $65a_2$ are spline coupled to the plurality of key grooves provided on the outer periphery of the first output axle 44. Then, when the coupling sleeve $65a$ is slided in the axial direction of the first output axle 44 so that the inner tooth $65a_3$ is meshed with the high-speed shifting gear $65d$ and the outer tooth $65a_4$ is enabled to be meshed with the low-speed shifting gear $65e$. The outer periphery of the other end of the diameter shortened portion $65a_1$ is provided with a limiting member $65a_7$ which limits the movement of the shift sleeve $65b$. A circular engagement groove $65a_6$ into which the sleeve limiting spherical ball $65c$ housed in the guide hole $65a_1$ is fitted is formed on the outer periphery of the first output axle 44 on which the diameter shortened portion $65a_1$ is to be slided.

It is noted, as shown in FIG. 29, the fork tip portion 84 of the lever of the sub transmission mechanism is engaged on its outer peripheral surface of the shift sleeve $65b$. The operation of the lever of the sub transmission mechanism permits the shift sleeve $65b$ ($65b$ in the fourth embodiment) to slide between the high-speed gear range shifting position H, the neutral gear range shifting position N, and the low-speed gear range shifting position L. A circular (ring-shaped) projection $65b_1$ is formed on the inner peripheral surface of the shift sleeve $65b$ which enables the sleeve limiting spherical ball $65c$ to be pressed into the engagement groove $65a_6$ when the shift sleeve $65b$ is moved to the low-speed gear range shifting position L and which slides on the outer peripheral surface of the diameter shortened portion $65a_1$. A housing portion $65b_2$ which houses a part of the sleeve limiting spherical ball $65c$ in its inner portion and which enables the movement of the coupling sleeve $65a$ is continuously formed on the projection $65b_1$.

Then, when the operation of the lever of the sub transmission mechanism causes the shift sleeve $65b$ to move from the high-speed gear range position H to the low-speed gear range position (movement in the right-handed direction from the state shown in FIG. 29), the coupling sleeve $65a$ is moved in the same direction as the shift sleeve $65b$, pressed against the sleeve limiting spherical ball $65c$ rolled within the guide hole $65a_5$. Then, as appreciated from FIG. 30, the movement of the coupling sleeve $65a$ is stopped at a time at which the sleeve limiting spherical ball $65c$ has just been inserted into the engagement groove $65a_6$. When the projection $65b_1$ of the shift sleeve $65b$ presses the sleeve limiting spherical ball $65c$ from its upward direction, the insertion operation such that the sleeve limiting spherical ball $65c$ is pressed into the engagement groove $65a_6$ is carried out. When the sleeve limiting spherical ball $65c$ is pressed into the engagement groove $65a_6$, a slip out of the coupling sleeve $65a_6$ can be prevented. In this state, the low-speed shifting gear $65e$ is meshed with the outer tooth $65a_4$ and the inner tooth $65a_3$ is meshed with the four-wheel drive gear 80.

In addition, when the operation of the lever of the sub transmission mechanism causes the shift sleeve $65b$ to move from the low-speed gear range position L to the high-speed gear range position H (movement into the left-handed direction from the state of FIG. 30), the shift sleeve $65b$ is slided to the left-handed direction so that the pressed and inserted states of the sleeve limiting spherical ball $65c$ with the projection $65b_1$ are released according to the left-handed movement of the shift sleeve $65b$ so that the coupling sleeve $65a$ is in its movable state. Then, the contact of the shift sleeve $65b$ on the diameter expanded portion $65a_2$ causes the coupling sleeve $65a$ to be moved in the same direction, thus, the inner tooth $65a_3$ being meshed with the high-speed shifting gear $65d$.

Figure 31:
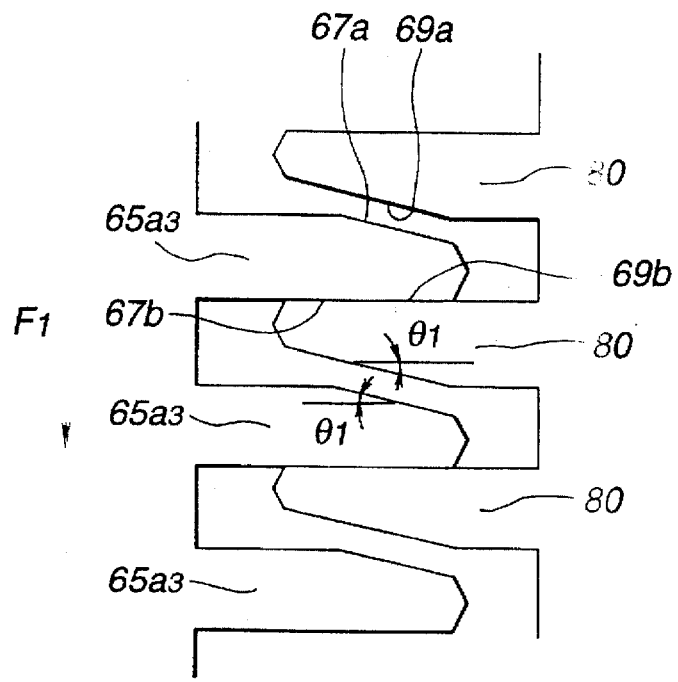
FIG. 31 is an explanatory view for explaining a meshed state in which a low-speed shifting gear is meshed with a coupling sleeve in the case of the fourth embodiment.

It is noted that both inner tooth $65a_3$ and the four-wheel driving gear 80 to be meshed mutually when the shift sleeve $65b$ is placed at the low-speed gear range position L (refer to FIG. 4) have structures as shown in FIG. 31. Suppose that the direction at which the forward driving force of the vehicle is transmitted to the transfer 22 is denoted by $F_1$ with the arrow mark. Mutual side surfaces of the respective outer tooth $65a_3$ and four-wheel driving gear 80 which are opposite to the revolution drive sides provide tapered surfaces 67a and 69a intersected to axial lines (axial lines of both shift sleeve $65b$ and first output axle 44) through predetermined angles $\theta_1$ On the other hand, mutual side surfaces in the revolution transmission sides 67b and 69b are formed along the axial surfaces.

Figure 32:
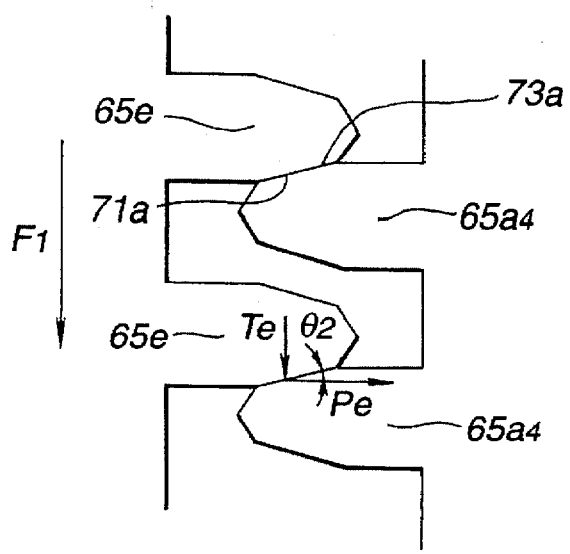
FIG. 32 is an explanatory view for explaining a meshed state in which a high-speed shifting gear is meshed with the coupling sleeve in the case of the fourth embodiment.

Furthermore, both low-speed shifting gear $65e$ and outer tooth $65a_4$ meshed with each other at the same time of the above-described meshing with the shift sleeve $65b$ placed at the low-speed gear range position L have tapered surfaces 71a and 73a intersected to the axial lines through $\theta_2$ at their mutual side surfaces in the side of the revolution transmission, supposing that the forward driving force transmission is carried out in the direction denoted by $F_1$ shown in FIG. 32.

Next, the high-speed gear range position and low-speed gear range position switching mechanism 65 in the fourth embodiment will be described in more details with reference to FIGS. 29 through 34.

When the shift sleeve $65b$ is moved to the low-speed gear position L by means of the operation of the lever of the sub transmission, the movement of the coupling sleeve $65a$ is halted at the time when the sleeve limiting spherical ball $65c$ is inserted into the engagement groove $65a_6$. The projection $65b_1$ of the shift sleeve $65b$ causes the sleeve limiting spherical ball $65c$ to be pressed from the upward direction, the insertion and pressing operations of the sleeve limiting spherical ball $65c$ for the engagement groove $65a_6$ being carried out so that the movement of the coupling sleeve $65a$ is limited (refer to FIG. 30). Consequently, the low-speed shifting gear $65e$ is meshed with the outer tooth $65a_4$ and a prevention of the coupling sleeve $65a$ on which the inner tooth $65a_3$ is meshed with the four-wheel driving gear 80 from being slipped out can be assured.

Figure 33:
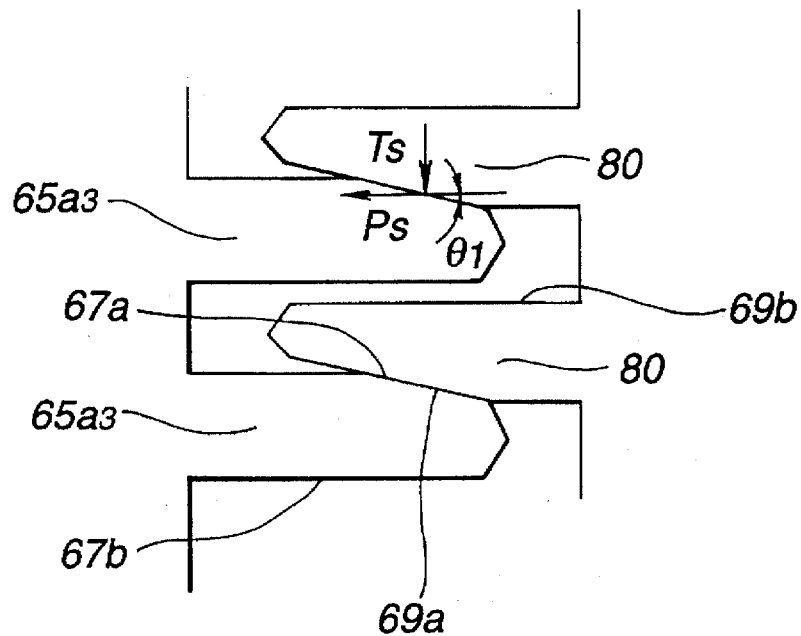
FIG. 33 is an explanatory view for explaining a meshed state in which the high-speed gear is meshed with the coupling sleeve, a meshed part generating an, so-called, enclosed torque in the case of the fourth embodiment.

In addition, in a case where the vehicle is turned during the vehicular run with the 4H range selected through the lever of the sub transmission mechanism, the front road wheel revolution speeds generally exceed the rear road wheel revolution speeds. Hence, the meshed part between the inner tooth $65a_3$ and four-wheel driving gear 80 generates an enclosed torque Ts due to the difference in revolution speed between the front and rear road wheels. Consequently, an influence may be given to the switching operation from the 4L range to the 4H range. However, as shown in FIG. 33, due to the generation of the enclosed torque Ts, both of the tapered surfaces 67a and 69a are mutually meshed for the inner tooth $65a_3$ and the four-wheel driving gear 80, the tapered surfaces being intersected to the axial line through the predetermined included angles. Therefore, a moving force in a thrust direction (sleeve slipping out force) Ps is generated so as to release the meshed state between the inner tooth $65a_3$ and four-wheel driving gear 80. In this way, even if the enclosed torque Ts is generated in the meshed part between the inner tooth $65a_3$ and four-wheel driving gear 80, the switching from the 4L range to the 4H range can smoothly be operated by a slight operating force such that the pressing and inserting operations of the sleeve limiting spherical ball 65c are released by utilizing the sleeve slipping-out force Ps generated by the meshing between the tapered surfaces 67a and 69a even if the enclosed torque Ts is generated in th meshed part between the inner tooth $65a_3$ and four-wheel driving gear 80.

Furthermore, in the fourth embodiment, during the run with the lever of the sub transmission mechanism being placed at the 4L range, a sleeve slip-out prevention force Pe in the thrust direction is generated in the meshed part between the outer tooth $65a_4$ and low-speed shifting gear 65e against the sleeve slip-out force Ps so that the sleeve slip-out prevention force Ps which is the burden on the sleeve limiting spherical ball 65c is reduced. In addition, during the switching operation for the lever from the 4L range to the 4H range, the operating force becomes facilitated without generation of the sleeve slip-out prevention force Pe.

Figure 34:
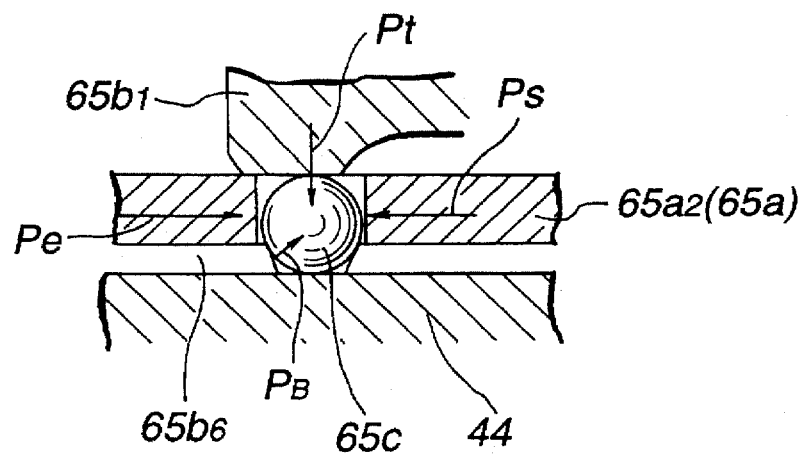
FIG. 34 is an explanatory view for explaining a sleeve limiting spherical ball pushed by means of a shift sleeve into an engagement groove in the case of the fourth embodiment.

That is to say, during the vehicular run with the lever selected at the 4l range, a slip-out prevention force $P_B$ is generated on the sleeve limiting spherical ball 65c which prevents the slip-out of the coupling sleeve 65a against the sleeve slip-out force Ps in the thrust direction described above, the sleeve limiting spherical ball 65c being held by the pressure $P_t$ (pressing force) from the projection $65b_1$, as shown in FIG. 34.

It is noted that although the engine torque Te is transmitted from the output axle 56 of the automatic transmission 20 to the input axle 42 via the output axle 56, the tapered surfaces 71a and 73a intersected to the axial line through the predetermined angles $\theta_2$ are meshed with each other, as shown in FIG. 32, for the outer tooth $65a_4$ and low-speed shifting gear 65e due to the selection of the lever at the 4L range. Therefore, a movement force (sleeve slip-out prevention force) in the thrust direction is generated so as to maintain the meshed state of the inner tooth $65a_3$ and four-wheel driving gear 80. Thus, since the sleeve slip-out prevention force Pe is generated in the thrust direction against the sleeve slip-out force Ps, the sleeve slip-out prevention force $P_B$ with which the sleeve limiting spherical ball 65c is burdened.

In addition, since the switching operation from the 4L range to the 4H range is carried out with the automatic power transmission 20 in the neutral state (N range) and the vehicle stopped, the engine torque Te is not transmitted to the input axle 42. At this time, no sleeve slip-out prevention force Pe is generated in the meshing part between the outer tooth $64a_4$ and low-speed shifting gear 65e. Hence, the above-described switching operation from the 4L range to the 4H range can be carried out by the operating force to a degree such that the pressing and inserting operations of the sleeve limiting spherical ball 65c are released only by utilizing the sleeve slip-out force Ps.

Next, a setting method of the taper angle $\theta_1$ of the tapered surfaces 67a and 69a of the inner tooth $65a_3$ and four-wheel driving gear 80 and the tapered angle $\theta_2$ of the tapered surfaces 71a and 73a of the outer tooth $65a_4$ and low-speed shifting gear 65e will be described below.

First, suppose that a radius of revolution in the case of the inner tooth $65a_3$ or four-wheel driving gear 80 is $r_1$, a frictional resistance of the tapered surfaces 67a and 69a in the thrust direction is $\mu_1$, and the enclosed torque is Ts. Then, the sleeve slip -out force Ps is expressed as follows:

$$Ps=Ts/r_1 \cdot (\tan \theta_1 - \mu_1) \cdot \cos^2 \theta_1.$$

In addition, suppose that the radius of revolution in the outer tooth $65a_4$ and low-speed shifting gear 65e is $r_2$, the frictional resistance of the tapered surfaces 71a and 73a in the thrust direction is $\mu_2$, and the engine torque is Te. Then, the sleeve slip-out prevention force Pe is expressed as follows:

$$Pe=Te/r_2 \cdot (\tan \theta_2 - \mu_2) \cdot \cos^2 \theta_2.$$

Thereafter, the taper angels $\theta_1$ and $\eta_2$ are properly set so as to give an inequality of Pe>Ps.

Thus, during the vehicular run with the lever of the sub transmission mechanism selected at the 4L range in the state of which the engine torque Te is transmitted from the automatic power transmission 20 to the input axle 42, the sleeve slip-out prevention force Pe is generated. Therefore, the slip-out prevention force $P_B$ with which the sleeve limiting spherical ball 65c is burdened can be reduced. On the other hand, since the engine torque Te is not transmitted to the input axle 42 from the automatic power transmission 20 during the switching operation of the lever from the 4L range to the 4H range, the sleeve slip-out prevention force Pe=0 so that the selection operation of the lever into, for example, the 4L range with a low operating force can be carried out.

Although, in the fourth embodiment, the torque converter equipped automatic transmission is used as the power transmission 20 which constitutes the driving force transmission system 14, the same actions and advantages can be achieved when the power transmission 20 is a transmission which shifts the gear range at a selected gear ratio or when a variably continuous transmission may be applied as the power transmission.

FIG. 35 shows the circuit block diagram of the controller 18 in the fourth embodiment. The structure and operation of the controller 18 are generally the same as those already described in one of the first through third embodiments.

The term stack (stacking) used in the specification is defined as follows: When the vehicle runs on the low-friction-coefficient road surface (,e.g, the sandy road), any one or more of the road wheels are slipped (though the driving force is transmitted to any two road wheels) so that the vehicle cannot move or be continued to run. This is called a stacking phenomenon.

What is claimed is:

1. A driving force transfer apparatus for a four-wheel drive vehicle having mainly driven road wheels and secondarily driven road wheels, and a vehicular power transmission with an output axle, comprising:

a) an input axle connected to said output axle of said vehicular power transmission;

b) a first output axle operatively connected to said mainly driven road wheels;

c) a second output axle operatively connected to said secondarily driven road wheels;

d) a sub transmission mechanism, having mesh clutching means for operatively switching at least between a relatively high-speed gear range position and a relatively low-speed gear range position, said sub transmission mechanism being arranged and constructed to transmit a driving force from said power transmission via said input axle to said first output axle according to the switched position set through said mesh clutching means;

e) a two-wheel-and-four-wheel drive switching mechanism having frictional clutching means and working fluid pressure varying means, a clutching force of said frictional clutching means being varied according to a working fluid pressure applied thereto from said working fluid pressure varying means so that the driving force transmitted to said first output axle is distributed to the second output axle at a torque distribution ratio determined according to the clutching force of the frictional clutching means;

f) detecting means for detecting a running condition of the vehicle, wherein said detecting means includes a throttle valve opening angle sensor for detecting an opening angle of an engine throttle valve and a vehicle speed sensor for detecting a vehicle running speed;

g) controlling means for outputting a control signal to said working fluid pressure varying means to vary the working fluid pressure applied to said frictional clutching means on the basis of a result of the detection of the vehicle running condition, wherein said controlling means comprises determining means for determining a region in the vehicle speed where the difference between the revolution speeds of said first and second output axles is relatively small on the basis of a variation in the throttle valve opening angle detected by the throttle valve opening angle sensor during a relatively low speed run of the vehicle and a relatively high speed run of the vehicle, wherein said controlling means outputs the control signal so that the pressure of the working fluid in said working fluid varying means is relatively low so that a relatively slight junction in the frictional clutching means occurs according to the detected running condition of said detecting means and the determined region where the difference between revolutions speeds of said first and second output axles becomes relatively small when said sub transmission mechanism is switched into the low-speed gear range position;

h) first and second dog clutches for forcefully connecting the first output axle to the second output axle so that the four road wheels are forced into a four-wheel drive state during the low-speed gear range position switched through said sub transmission mechanism, said first dog clutch having first teeth operatively provided at a side of said first output axle and said second dog clutch having second teeth operatively provided at a side of said second output axle; and i) smoothly meshing means for smoothly meshing said first and second dog clutches to lower the chance of impinging the tips of said first and second teeth, wherein at least one of said first and second dog teeth has a width that is narrower than a teeth spacing formed between two adjacent teeth in a peripheral direction of said one of said first and second teeth to provide a play in each tooth spacing when first and second dog teeth are meshed into each other to provide smooth meshing.

2. A driving force transfer apparatus for a four-wheel drive vehicle as claimed in claim 1, wherein said sub transmission mechanism further comprises high-speed gear means formed on said input axle, a speed-reduction mechanism interlocked with said input axle, and low-speed gear means for transmitting the driving force from said input axle to said first output axle with a revolution speed of said input axle reduced by means of said speed-reduction mechanism interlocked with said input axle, and a shift sleeve, said first and second dog clutches being provided on a shift sleeve, said shift sleeve being in a spline coupling to said first output axle, being meshed with said high-speed gear means when said mesh clutch means is switched to the high-speed gear range position, and being meshed with said low-speed gear means and meshed with four-wheel drive gear means for transmitting the driving force of said input axle to both of said first and second output axles so that the four road wheels of the vehicle is forced into the four-wheel drive state when said mesh clutch means is switched to the low-speed gear range position, and wherein said smoothly meshing means further includes timing means for meshing first said shift sleeve with said low-speed gear and, thereafter, meshing said shift sleeve with said four-wheel drive gear means during the switching of said mesh clutching means from said high-speed gear range position to said low-speed gear range position.

3. A driving force transfer apparatus for a four-wheel drive vehicle as claimed in claim 2, further comprising frictional clutch temporary junctioning means for temporarily junctioning said frictional clutch so that the driving force transmitted to said first output axle is transmitted to the second output axle at a predetermined torque distribution ratio via the frictional clutching means when said shift sleeve is not meshed with the four-wheel drive gear means but only meshed with the low-speed gear means.

4. A driving force transfer apparatus for a four-wheel drive vehicle as claimed in claim 2, further comprising revolution stopped state detecting means for detecting whether a revolution of said output axle of the power transmission is halted and wherein said smoothly meshing means includes clutching force suppressing means for reducing the clutching force of said frictional clutching means through said controlling means by a predetermined value when said revolution stopped state detecting means detects that the output axle of said power transmission is stopped to help the meshing of said first and second dog clutch.

5. A driving force transfer apparatus for a four-wheel drive vehicle as claimed in claim 4, wherein said power transmission is a fluid coupling type automatic power transmission and wherein said revolution stopped state detecting means comprises a sensor for detecting whether a shift selection lever of said automatic power transmission, whose output axle is connected to said input axle, is placed at either a parking position or a neutral position.

6. A driving force transfer apparatus for a four-wheel drive vehicle as claimed in claim 4, wherein said power transmission is a manual power transmission and wherein said revolution stopped state detecting means comprises a first sensor for detecting whether a shift lever position of said manual power transmission is placed at a neutral position with the vehicle stopped and a second sensor for detecting whether a manual clutch associated with said manual power transmission is in a disengaged state.

7. A driving force transfer apparatus for a four-wheel drive vehicle as claimed in claim 4, wherein said predetermined value is approximately zero.

8. A driving force transfer apparatus for a four-wheel drive vehicle having mainly driven road wheels and secondarily driven road wheels, and a vehicular power transmission with an output axle, comprising:

a) an input axle connected to said output axle of said vehicular power transmission;

b) a first output axle operatively connected to said mainly driven road wheels;

c) a second output axle operatively connected to said secondarily driven road wheels;

d) a sub transmission mechanism having mesh clutching means for operatively switching at least between a relatively high-speed gear range position and a relatively low-speed gear range position, said sub transmission mechanism being arranged and constructed to transmit a driving force from said power transmission via said input axle to said first output axle according to the switched position set through said mesh clutching means;

e) a two-wheel-and-four-wheel drive switching mechanism having frictional clutching means and working fluid pressure varying means, a clutching force of said frictional clutching means being varied according to a working fluid pressure applied thereto from said working fluid pressure varying means so that the driving force transmitted to said first output axle is distributed to the second output axle at a torque distribution ratio determined according to the clutching force of the frictional clutching means;

f) detecting means for detecting a running condition of the vehicle;

g) controlling means for outputting a control signal to said working fluid pressure varying means to vary the working fluid pressure applied to said frictional clutching means on the basis of a result of the detection of the vehicle running condition;

h) first and second dog clutches for forcefully connecting the first output axle to the second output axle so that the four road wheels are forced into a four-wheel drive state during the low-speed gear range position switched through the sub transmission mechanism;

i) smoothly meshing means for smoothly meshing said first and second dog clutches to lower the chance of impinging said first and second dog clutches, wherein said mesh clutching means of said sub transmission mechanism comprises:

j) a high-speed shifting gear formed on the input axle;

k) a low-speed shifting gear arranged and constructed to transmit the driving force with a revolution of said input axle reduced through a speed-reduction mechanism interlocked with said input axle;

l) a four-wheel driving gear arranged and constructed to forcefully set the four road wheels into a four-wheel drive state; and m) a shift sleeve coupled to said first output axle in a spline coupling form to mesh with the high-speed shifting gear at the high-speed gear range position and to mesh with the low-speed shifting gear and with the four-wheel driving gear at the low-speed gear range position so that the vehicle is forced into the four-wheel drive state, wherein when said sub transmission mechanism is switched from the high-speed gear range position to the low-speed gear range position through said mesh clutching means, said shift sleeve is meshed with the low-speed shifting gear and, thereafter, is meshed with the four-wheel driving gear;and n) revolution stopped state detecting means for detecting whether a revolution of said output axle of the power transmission is halted and wherein said smoothly meshing means includes clutching force suppressing means for reducing the clutching force of said frictional clutching means through said controlling means by a predetermined value when said revolution stopped state detecting means detects that the output axle of said power transmission is stopped to help the meshing of said first and second dog clutches.

9. A driving force transfer apparatus for a four-wheel drive vehicle as claimed in claim 8, wherein said power transmission is a fluid coupling type automatic power transmission and said shift sleeve is arranged and constructed to slide between said high-speed gear range shift position, a neutral position at which said shift gear is not meshed with any one of the gears, and the low-speed gear range shift position.

10. A driving force transfer apparatus for a four-wheel drive vehicle as claimed in claim 9, further comprising frictional clutch temporary junctioning means for temporarily junctioning said frictional clutch so that the driving force transmitted to said first output axle is transmitted to the second output axle at a predetermined torque distribution ratio via said frictional clutch while said shift sleeve is shifted toward the low-speed gear range position and is meshed with the low-speed shifting gear, but not meshed with the four-wheel driving gear.

11. A driving force transfer apparatus for a four-wheel drive vehicle as claimed in claim 8, wherein said first and second dog clutches comprises a plurality of inner teeth formed on said shift sleeve and a plurality of outer teeth formed on said four-wheel driving gear, wherein each of said inner teeth has a width that is narrower than a tooth spacing between two adjacent teeth in a peripheral direction of said inner teeth and each of said outer tooth has the width that is narrower than a spacing between two adjacent teeth in the peripheral direction of said outer teeth so that a play is provided in each tooth spacing of said inner and outer teeth when said shift sleeve is meshed with said four-wheel driving gear, said play constituting said smoothly meshing means.

12. A driving force transfer apparatus for a four-wheel drive vehicle as claimed in claim 11, wherein said controlling means outputs the control signal so that the pressure of the working fluid in said working fluid pressure varying means is relatively low so that a relatively slight junction in the frictional clutching means occurs according to the detected running condition of said detecting means so that a difference between revolution speeds of said first and second output axles becomes relatively small when said sub transmission mechanism is switched into the low-speed gear range position.

13. A driving force transfer apparatus for a four-wheel drive vehicle as claimed in claim 12, wherein said detecting means comprises a throttle valve opening angle sensor for detecting an opening angle of an engine throttle valve and a vehicle speed sensor for detecting a vehicle running speed, and wherein said controlling means comprises determining means for determining a region in the vehicle running speed in which the difference between the revolution speeds of said first and second output axles is relatively small on the basis of a variation in the throttle valve opening angle detected by the throttle valve opening angle sensor during a relatively low speed run of the vehicle and during a relatively high speed run of the vehicle.

14. A driving force transfer apparatus for a four-wheel drive vehicle as claimed in claim 8, wherein said power transmission is a fluid coupling type automatic power transmission and wherein said revolution stopped state detecting means comprises a sensor for detecting whether a shift selection lever of said automatic power transmission, whose output axle is connected to said input axle, is placed at either a parking position or a neutral position.

15. A driving force transfer apparatus for a four-wheel drive vehicle as claimed in claim 8, wherein said power transmission is a manual power transmission and wherein said revolution stopped state detecting means comprises a first sensor for detecting whether a shift lever position of said manual transmission is placed at a neutral position with the vehicle stopped and a second sensor for detecting whether a manual clutch associated with said manual power transmission is in a disengaged state.

16. A driving force transfer apparatus for a four-wheel drive vehicle as claimed in claim 8, wherein said predetermined value is approximately zero.

17. A driving force transfer apparatus for a four-wheel drive vehicle having mainly driven road wheels and secondarily driven road wheels, comprising:

a) a power transmission associated with a vehicular engine, said power transmission having an output axle;

b) an input axle connected to said output axle of said power transmission;

c) a first output axle connected operatively to said mainly driven road wheels;

d) a second output axle connected operatively to said secondarily driven road wheels;

e) a sub transmission having a low-speed and high-speed gear range position switching mechanism arranged and constructed to transmit a driving force transmitted from said power transmission to said first output axle through mesh clutching means provided in said switching mechanism;

f) a two-wheel-and-four-wheel drive switching mechanism having a frictional clutch arranged and constructed to provide a suitable clutching for said frictional clutch so that said second output axle is coupled to said first output axle at a required torque distribution ratio, wherein said sub transmission further includes:

g) a high-speed shifting gear formed on said input axle, h) a low-speed shifting gear arranged and constructed to transmit a speed-reduced revolution of said input axle through a speed reduction mechanism interlocked with said input axle, and i) a shift sleeve spline coupled to said first output axle, which is meshed with the high-speed shifting gear when moved to a predetermined high-speed gear range position, and meshed with said low-speed shifting gear and a four-wheel driving gear when moved to a predetermined low-speed gear range position so that the vehicle is forced into a four-wheel drive state and wherein, when said shift sleeve is moved from the high-speed gear range position to the low-speed gear range position through said switching mechanism, said shift sleeve is meshed with said four-wheel driving gear after said shift sleeve has meshed with the low-speed shifting gear; and j) frictional clutch temporary junctioning means for temporarily junctioning said frictional clutch so that the driving force transmitted to said first output axle is transmitted to said second output axle at a predetermined torque distribution ratio via said frictional clutching means when said shift sleeve is not meshed with the four-wheel drive gear means but only meshed with the low-speed gear means.

\* \* \* \* \*